(12) United States Patent
Lee

(10) Patent No.: US 12,128,263 B2
(45) Date of Patent: Oct. 29, 2024

(54) NOSE-FITTING ADJUSTER

(71) Applicant: KOREATECH CO., LTD., Seoul (KR)

(72) Inventor: Dong Yol Lee, Seoul (KR)

(73) Assignee: KOREATECH CO., LTD., Seoul (KR)

( * ) Notice: Subject to any disclaimer, the term of this patent is extended or adjusted under 35 U.S.C. 154(b) by 167 days.

(21) Appl. No.: 17/796,198

(22) PCT Filed: Dec. 23, 2020

(86) PCT No.: PCT/KR2020/018968
§ 371 (c)(1),
(2) Date: Jul. 28, 2022

(87) PCT Pub. No.: WO2021/153911
PCT Pub. Date: Aug. 5, 2021

(65) Prior Publication Data
US 2023/0080434 A1    Mar. 16, 2023

(30) Foreign Application Priority Data

Jan. 29, 2020  (KR) .................. 10-2020-0010696
Nov. 25, 2020  (KR) .................. 10-2020-0159634

(51) Int. Cl.
*A62B 9/06*    (2006.01)
(52) U.S. Cl.
CPC ..................... *A62B 9/06* (2013.01)
(58) Field of Classification Search
CPC ........................................ A62B 9/06
See application file for complete search history.

(56) References Cited

U.S. PATENT DOCUMENTS

| | | |
|---|---|---|
| 5,558,089 A | 9/1996 | Castiglione |
| 5,727,544 A | 3/1998 | Miura |
| 2007/0044803 A1 | 3/2007 | Xue et al. |
| 2007/0148409 A1 | 6/2007 | Rios et al. |
| 2010/0018545 A1* | 1/2010 | Franklin ............ A45D 40/30 132/319 |
| 2010/0267659 A1 | 10/2010 | Sasaki et al. |
| 2016/0037836 A1 | 2/2016 | Tuan |
| 2018/0250483 A1 | 9/2018 | Olsen et al. |

FOREIGN PATENT DOCUMENTS

| | | |
|---|---|---|
| CN | 107048532 A | 8/2017 |
| JP | 7-328135 A | 12/1995 |
| JP | 10-507117 A | 7/1998 |
| JP | 2001-566 A | 1/2001 |
| JP | 3222972 B2 | 10/2001 |
| JP | 2002-325855 A | 11/2002 |
| JP | 3121403 U | 5/2006 |

(Continued)

*Primary Examiner* — Khaled Annis
(74) *Attorney, Agent, or Firm* — Birch, Stewart, Kolasch & Birch, LLP

(57) ABSTRACT

The present invention relates to a nose-fitting adjuster. Particularly, the present invention relates to a nose-fitting adjuster, which can seal, without directly and intensely compressing the nose and a peripheral portion thereof, the corresponding portion, for a device, such as masks, goggles, gas masks, and VR headsets, that includes a portion coming in close contact with the nose region.

18 Claims, 74 Drawing Sheets

(56) References Cited

FOREIGN PATENT DOCUMENTS

| | | |
|---|---|---|
| JP | 2009-505734 A | 2/2009 |
| JP | 2011-430 A | 1/2011 |
| JP | 2011-30880 A | 2/2011 |
| JP | 5011294 B2 | 8/2012 |
| JP | 2013-188281 A | 9/2013 |
| JP | 2015-156972 A | 9/2015 |
| JP | 2019-30698 A | 2/2019 |
| KR | 20-0430144 Y1 | 11/2006 |
| KR | 10-2011-0009652 A | 1/2011 |
| KR | 10-2012-0123843 A | 11/2012 |
| KR | 10-2017-0000048 A | 1/2017 |
| KR | 10-2017-0072094 A | 6/2017 |
| KR | 10-2019-0032897 A | 3/2019 |
| KR | 10-2012157 B1 | 8/2019 |
| KR | 10-2019-0122511 A | 10/2019 |
| KR | 10-2019-0122516 A | 10/2019 |
| WO | WO 98/11594 A1 | 4/1996 |
| WO | WO 2022/035007 A1 | 2/2022 |

\* cited by examiner

[FIG. 1]
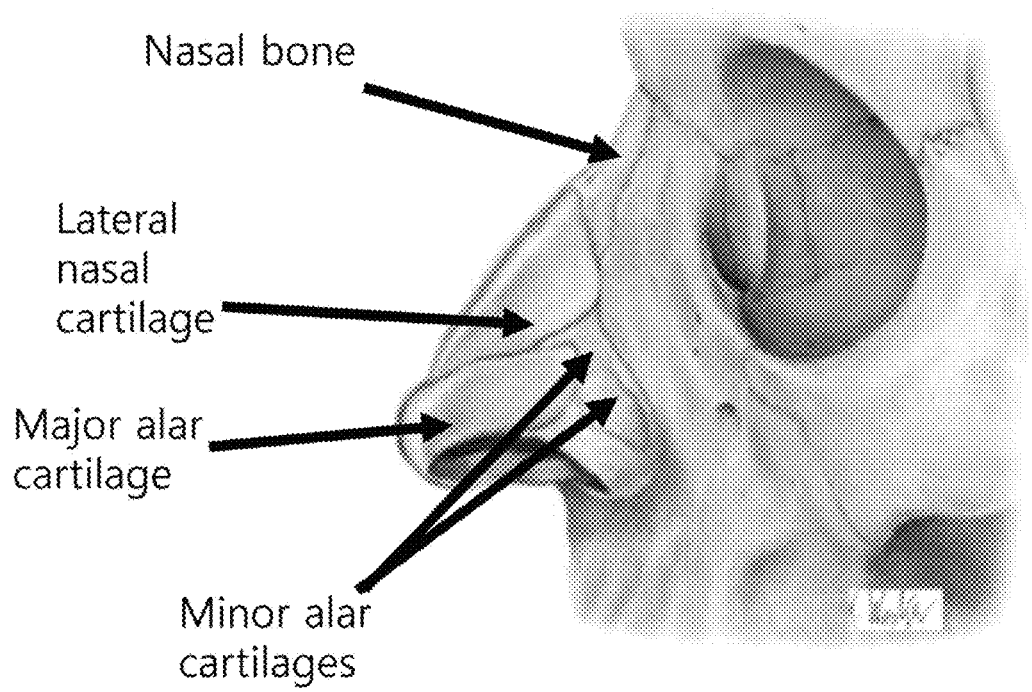

[FIG. 2]
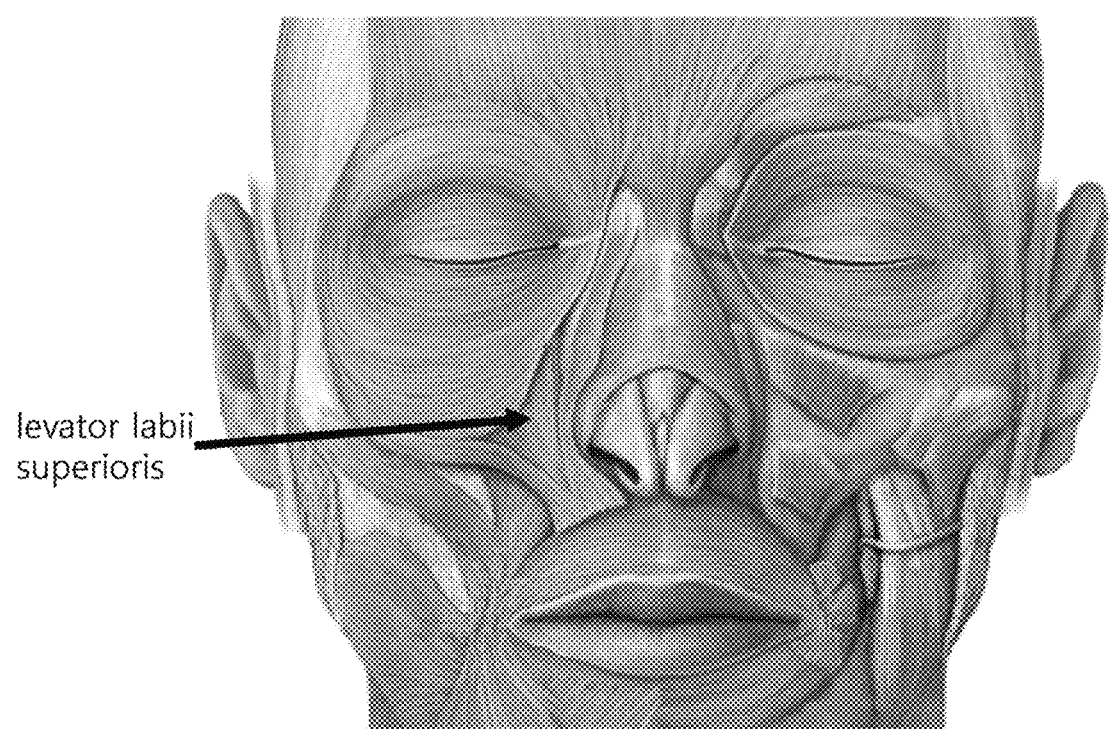

[FIG. 3]
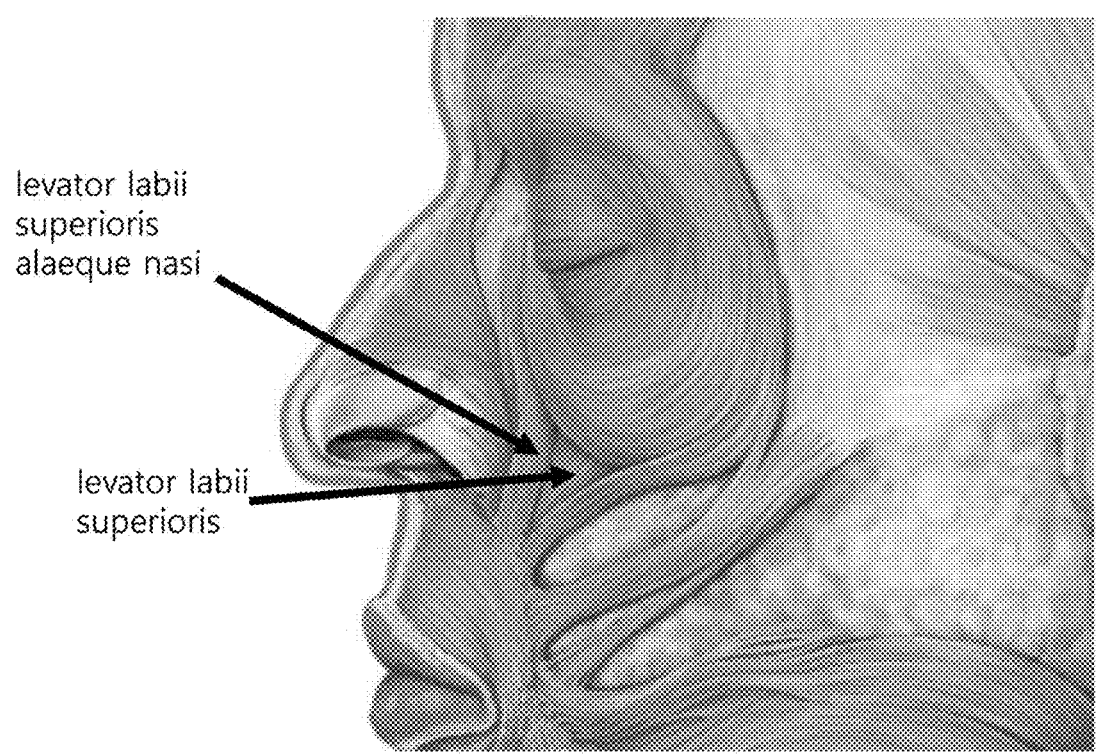

[FIG. 4]
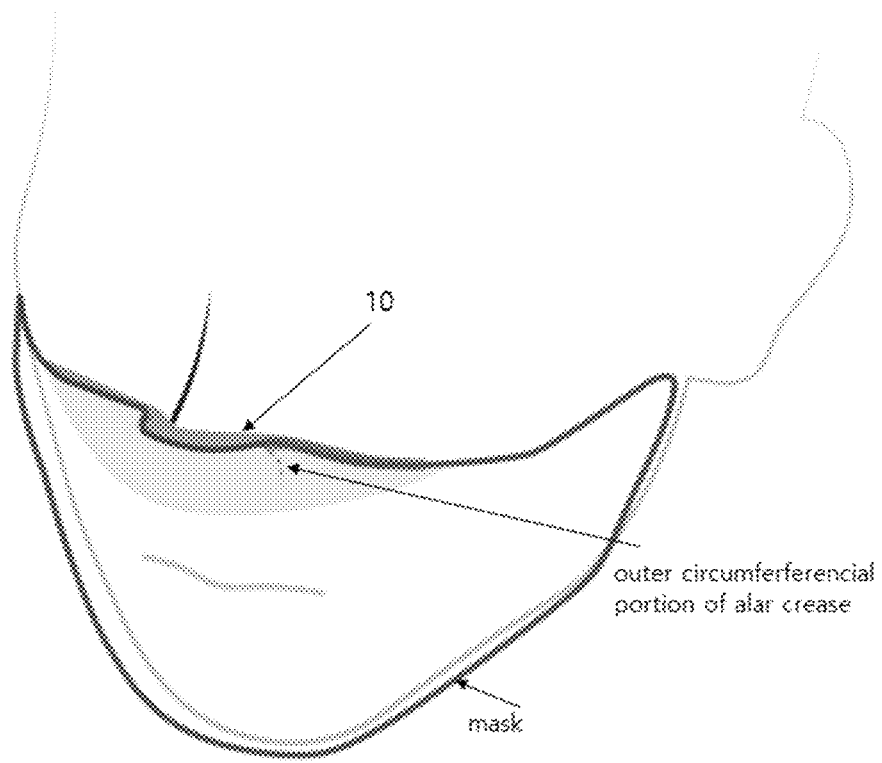

[FIG. 5]
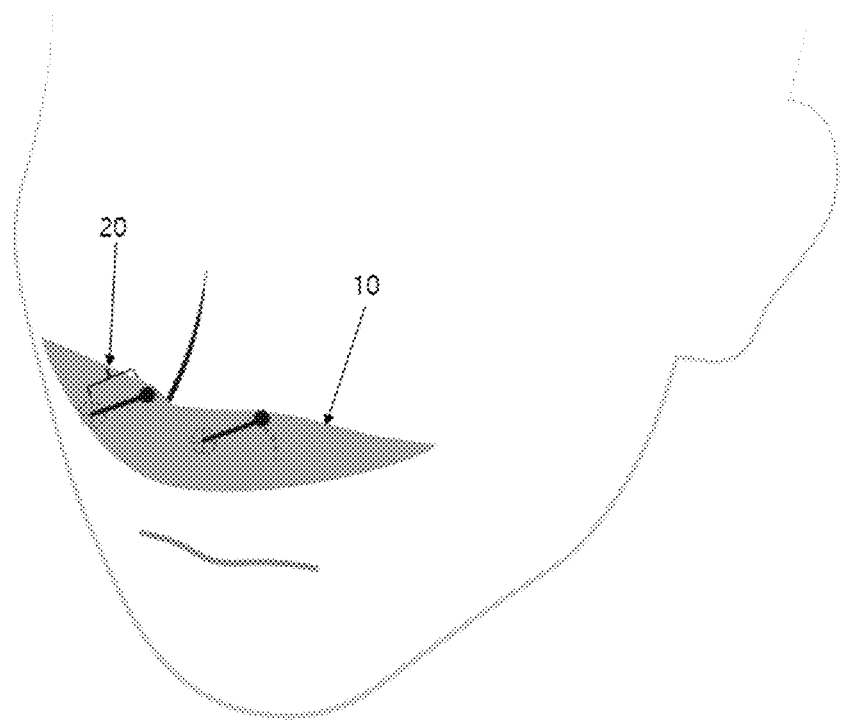

[FIG. 6]
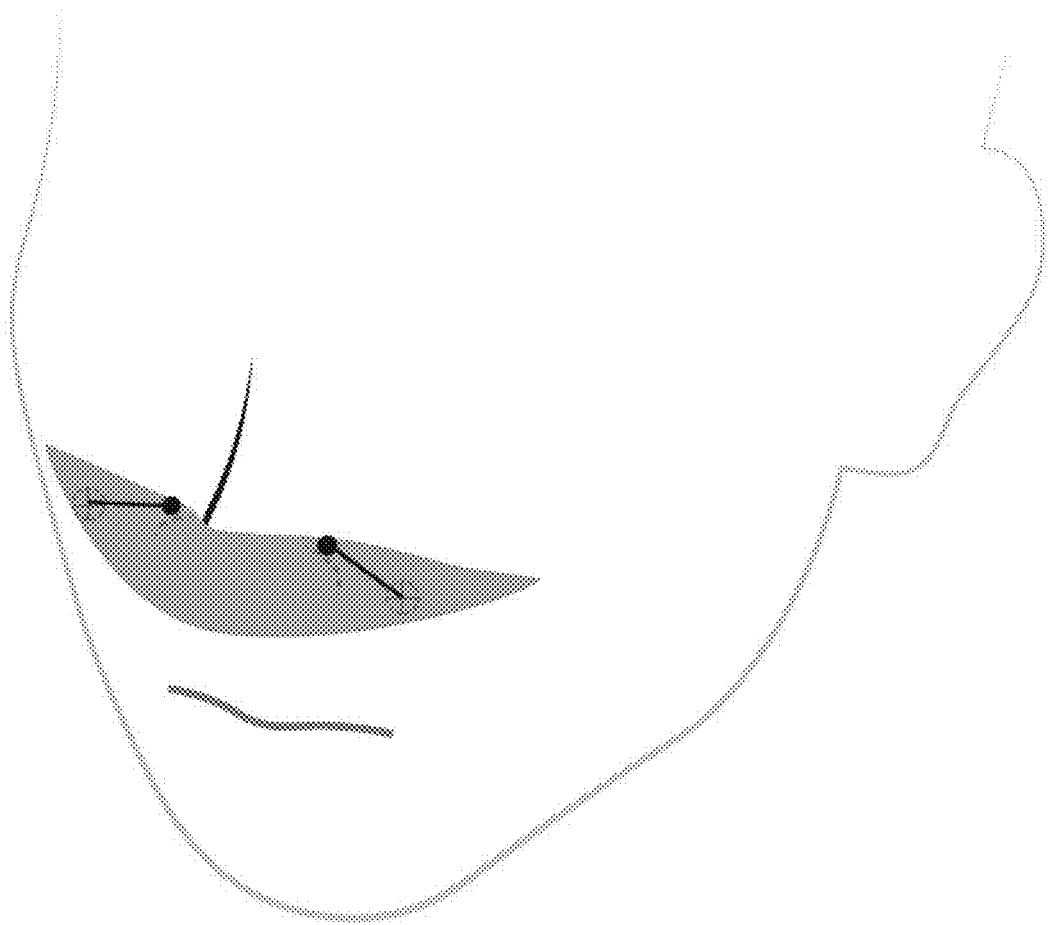

[FIG. 7]
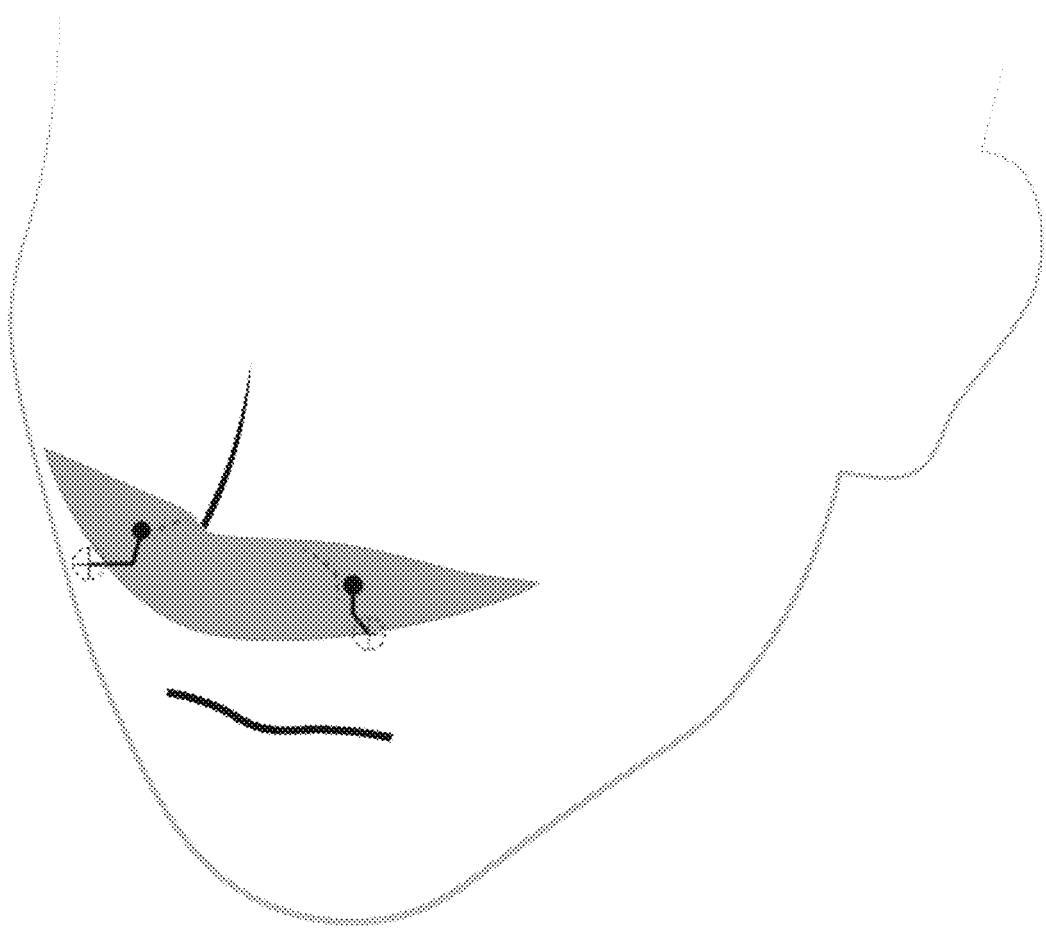

[FIG. 8]
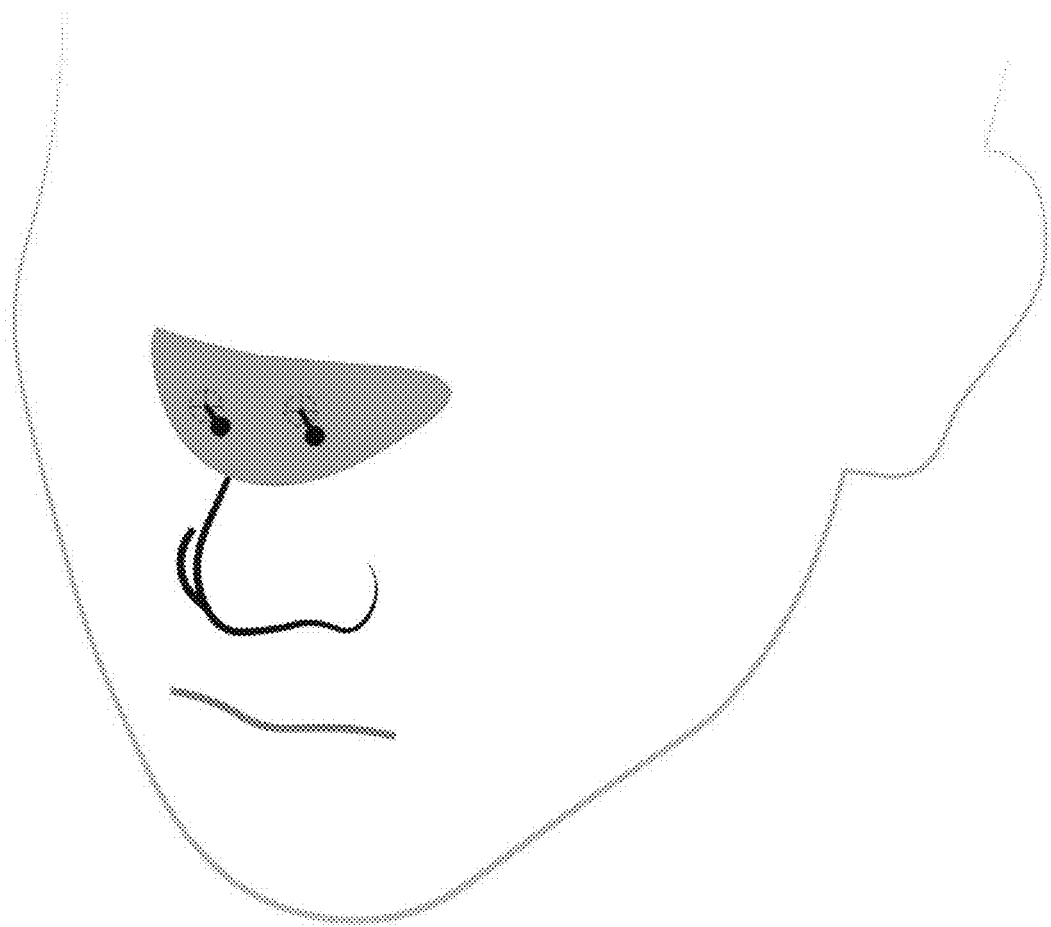

[FIG. 9]
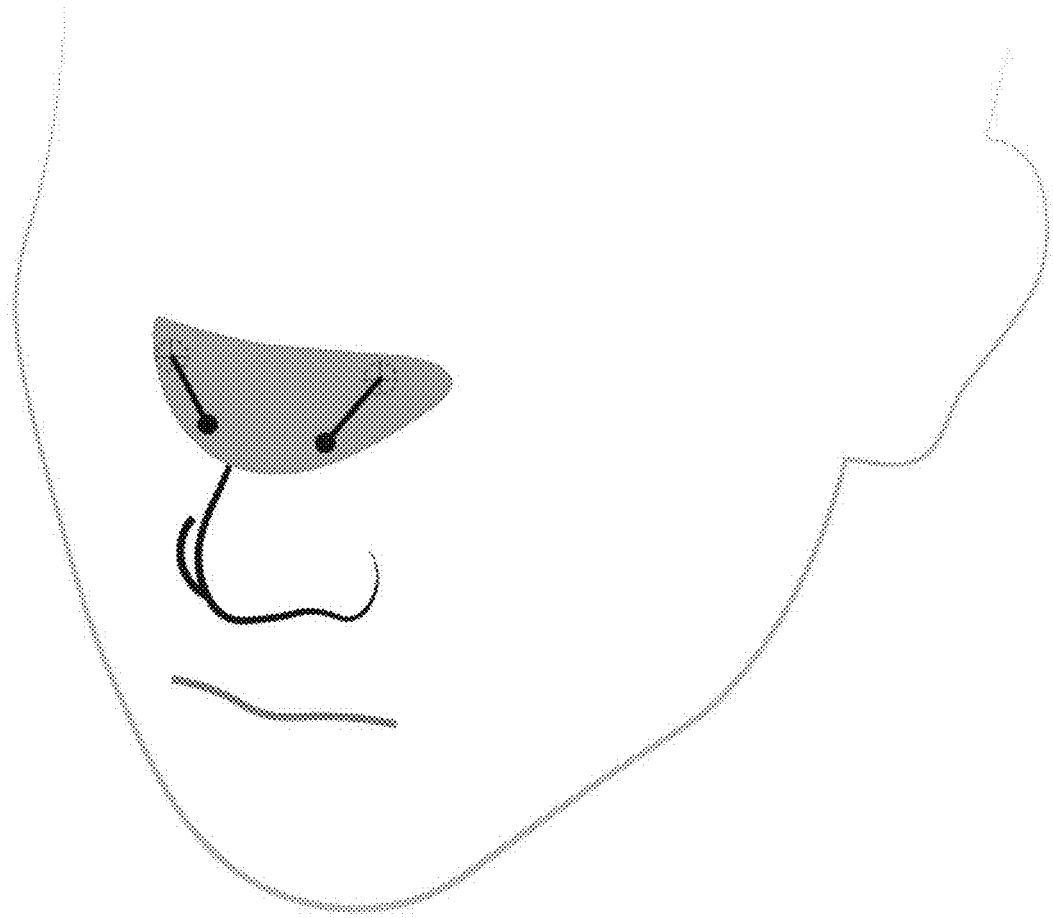

[FIG. 10]
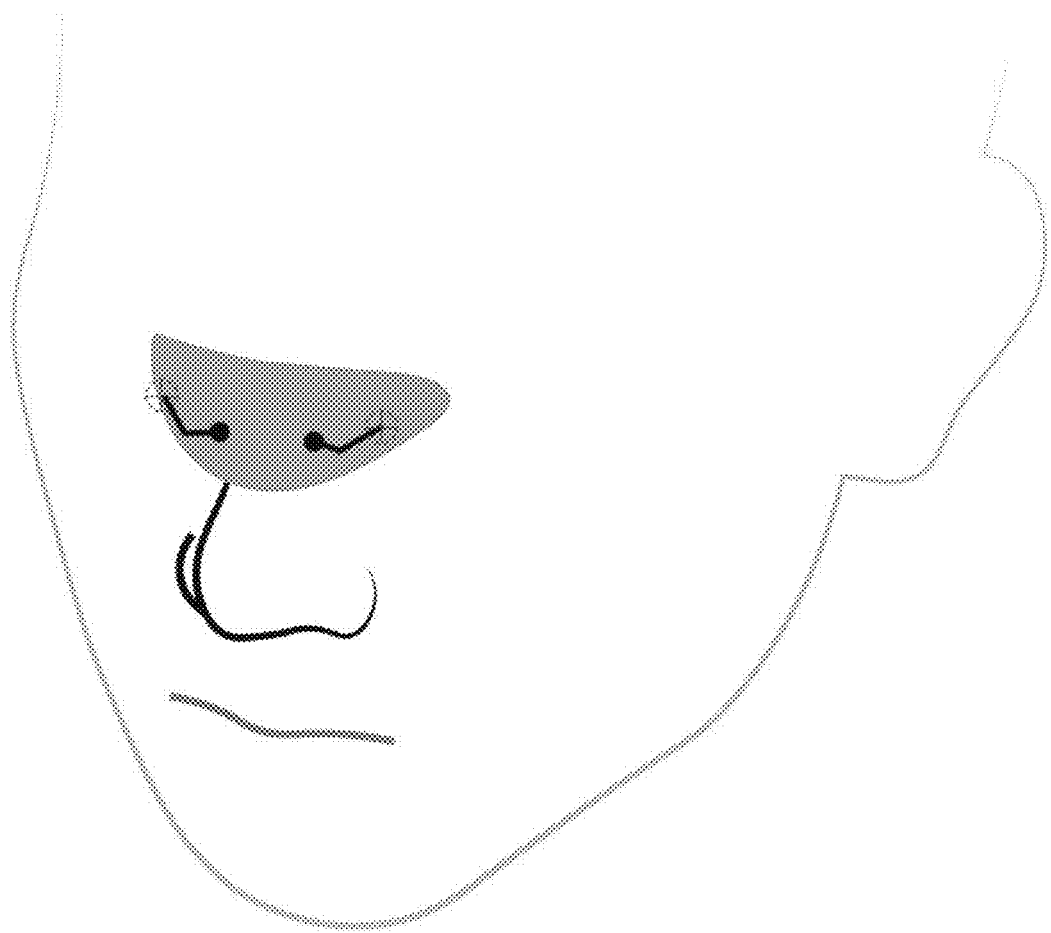

【FIG. 11】
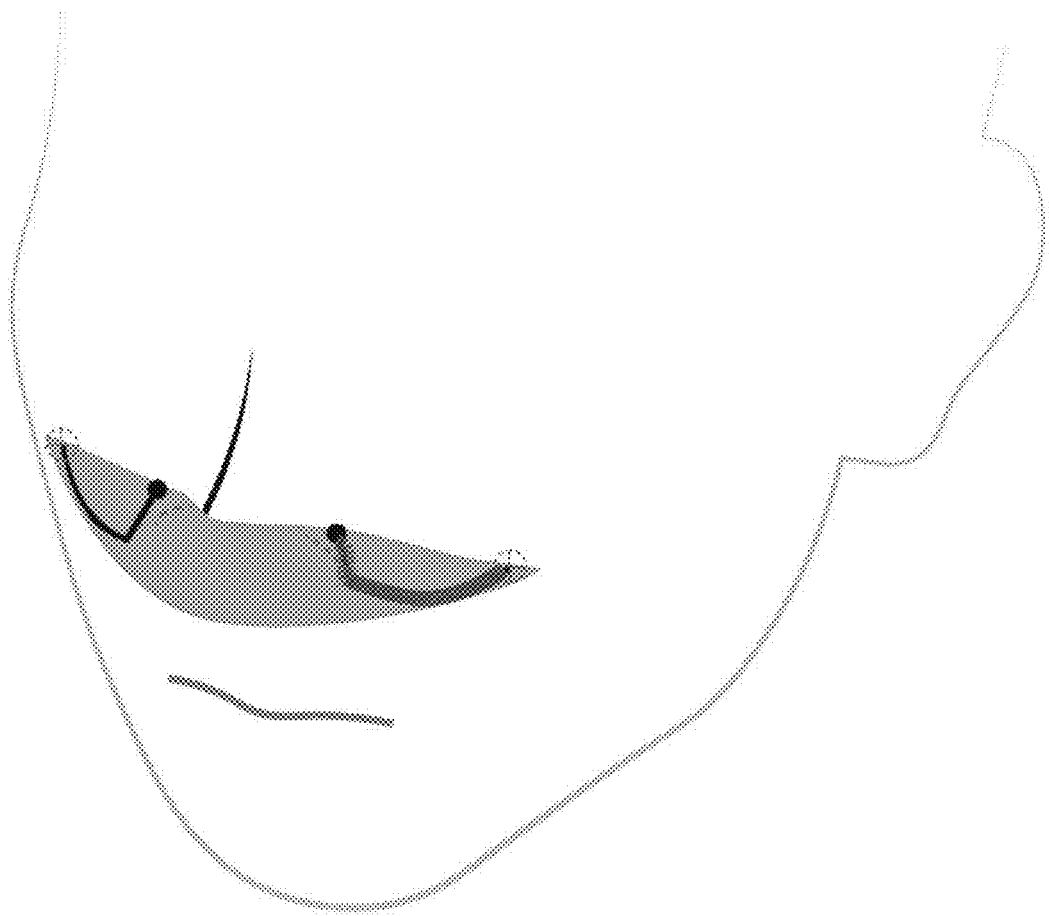

[FIG. 12]
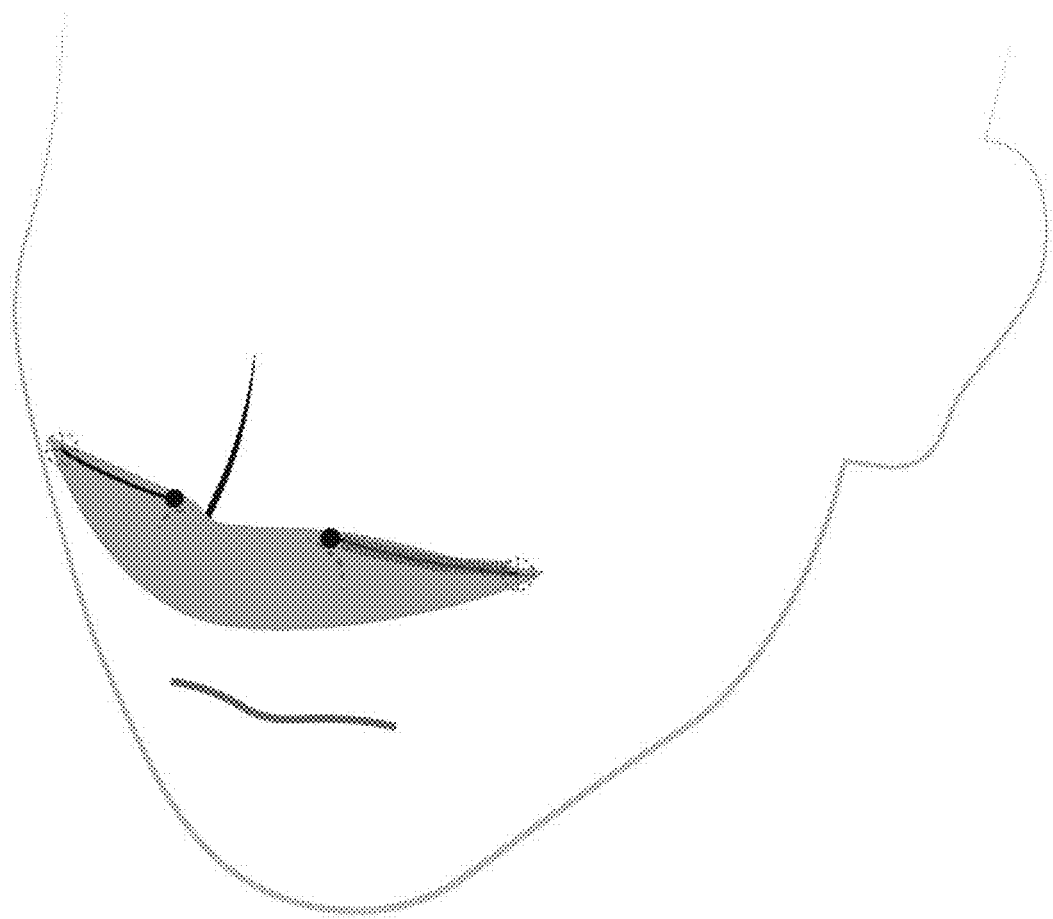

[FIG. 13]
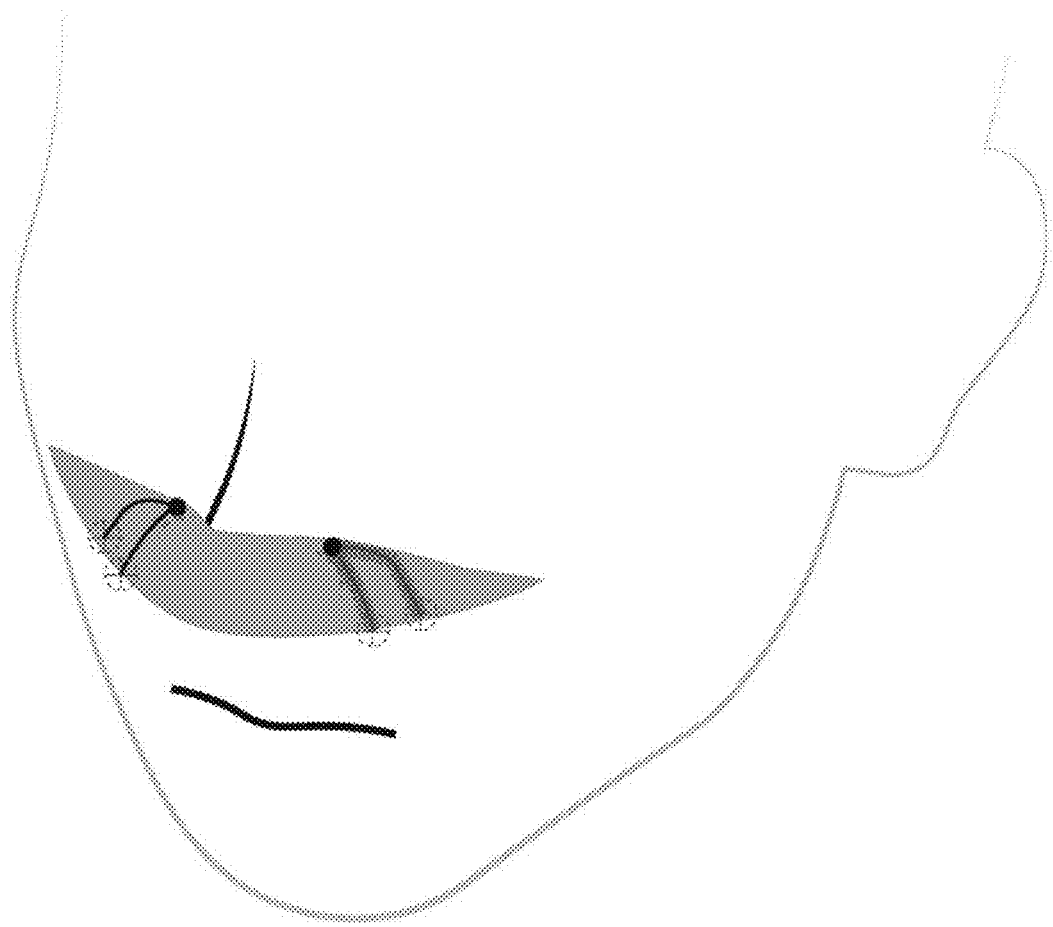

【FIG. 14】
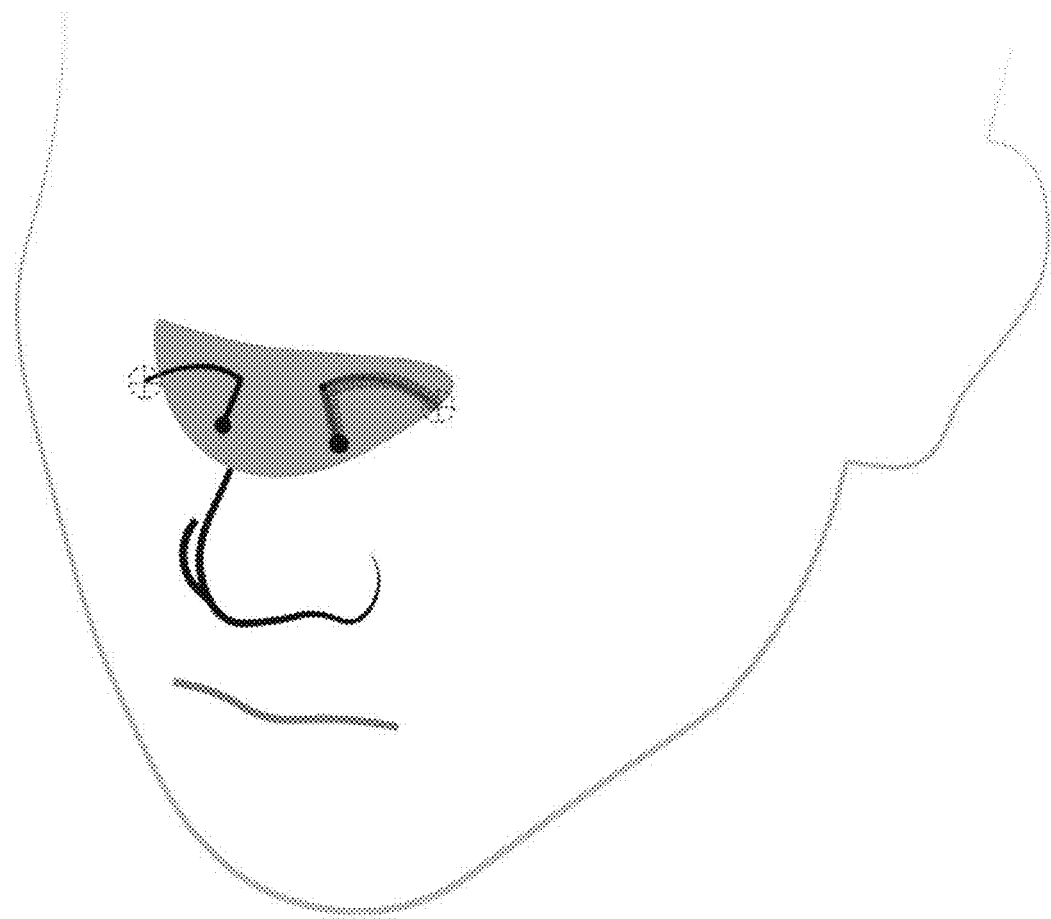

【FIG. 15】
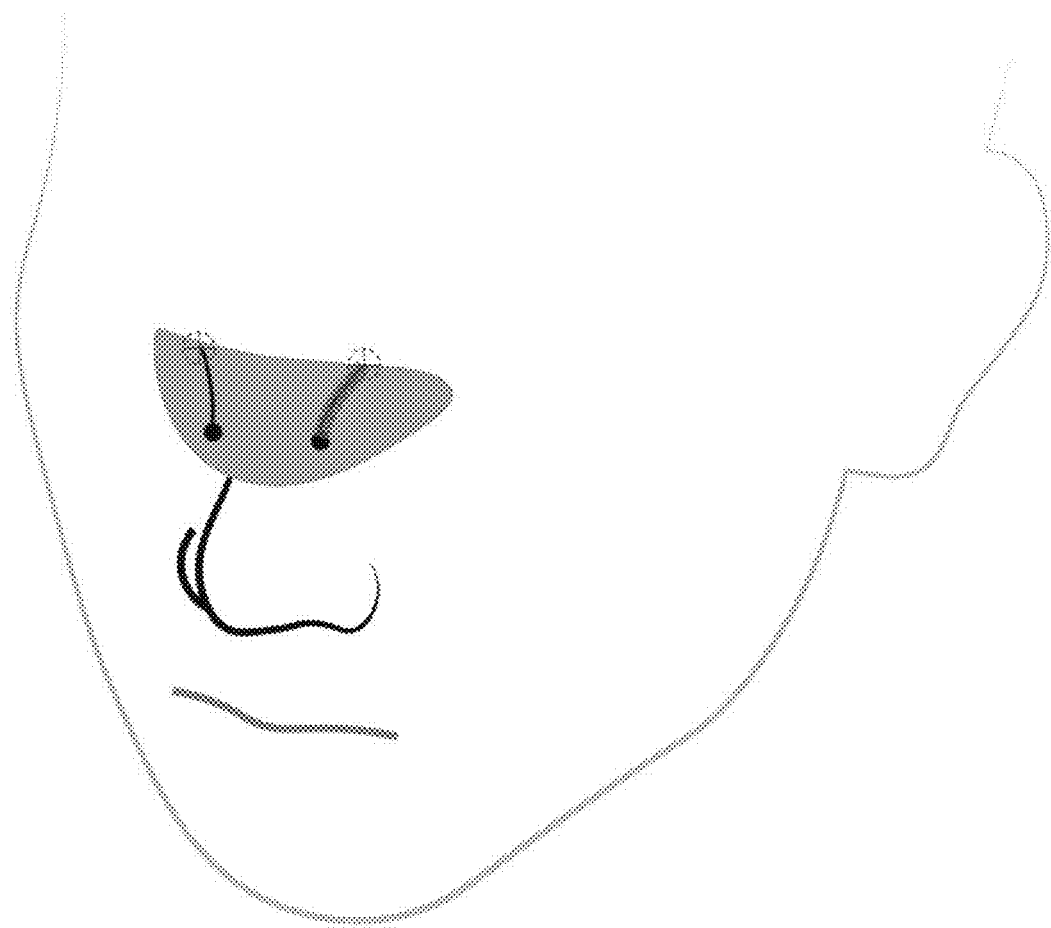

[FIG. 16]
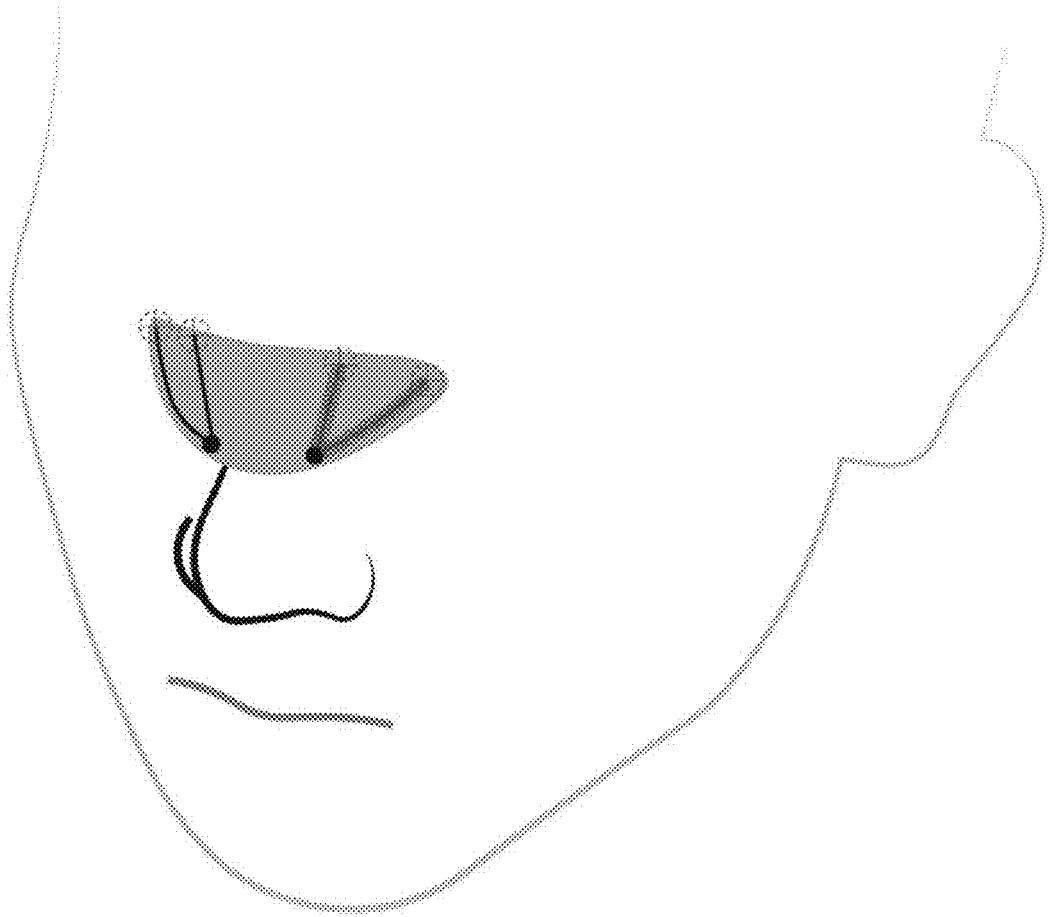

[FIG. 17]

[FIG. 18]
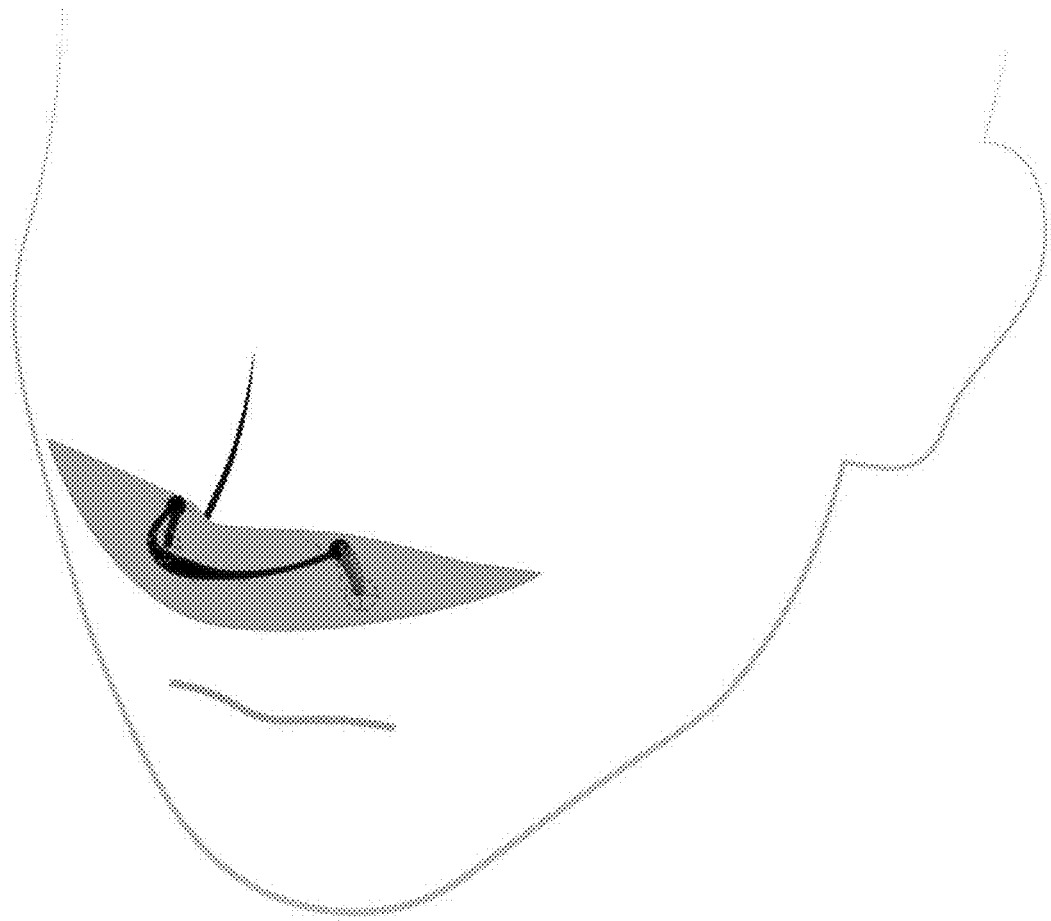

[FIG. 19]
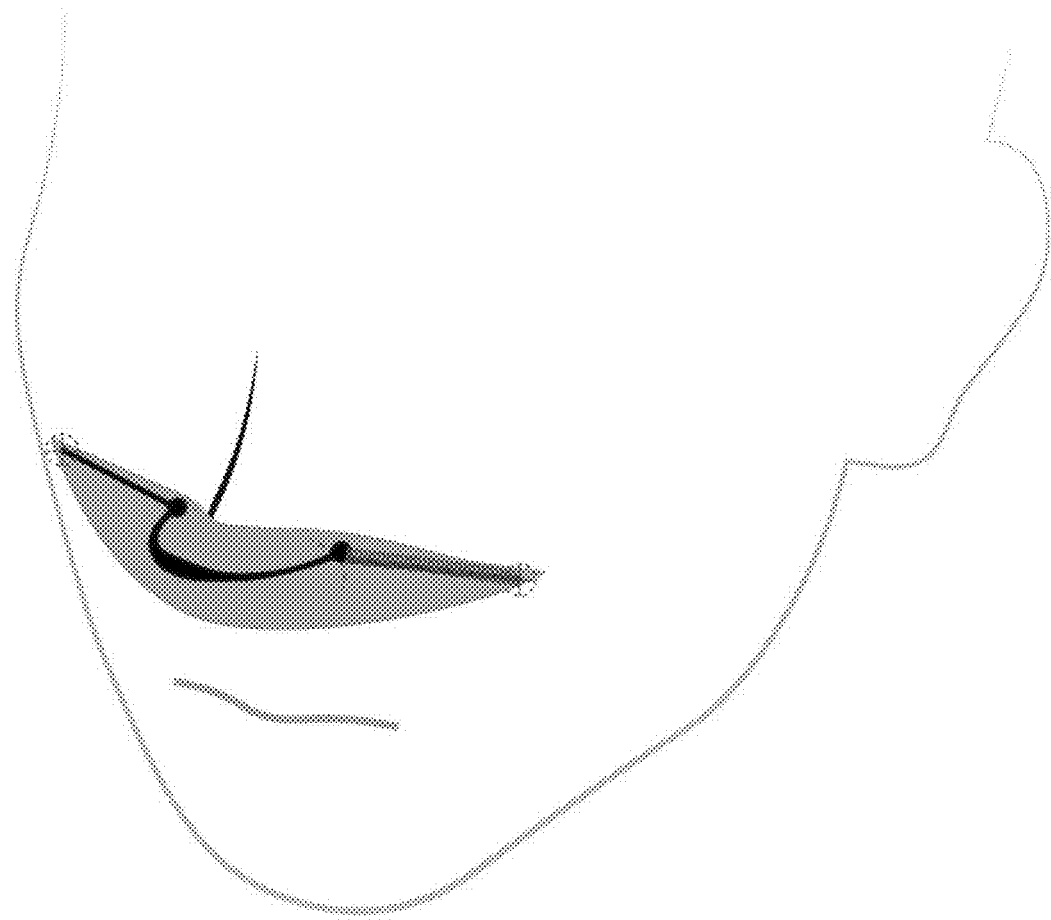

[FIG. 20]

【FIG. 21】
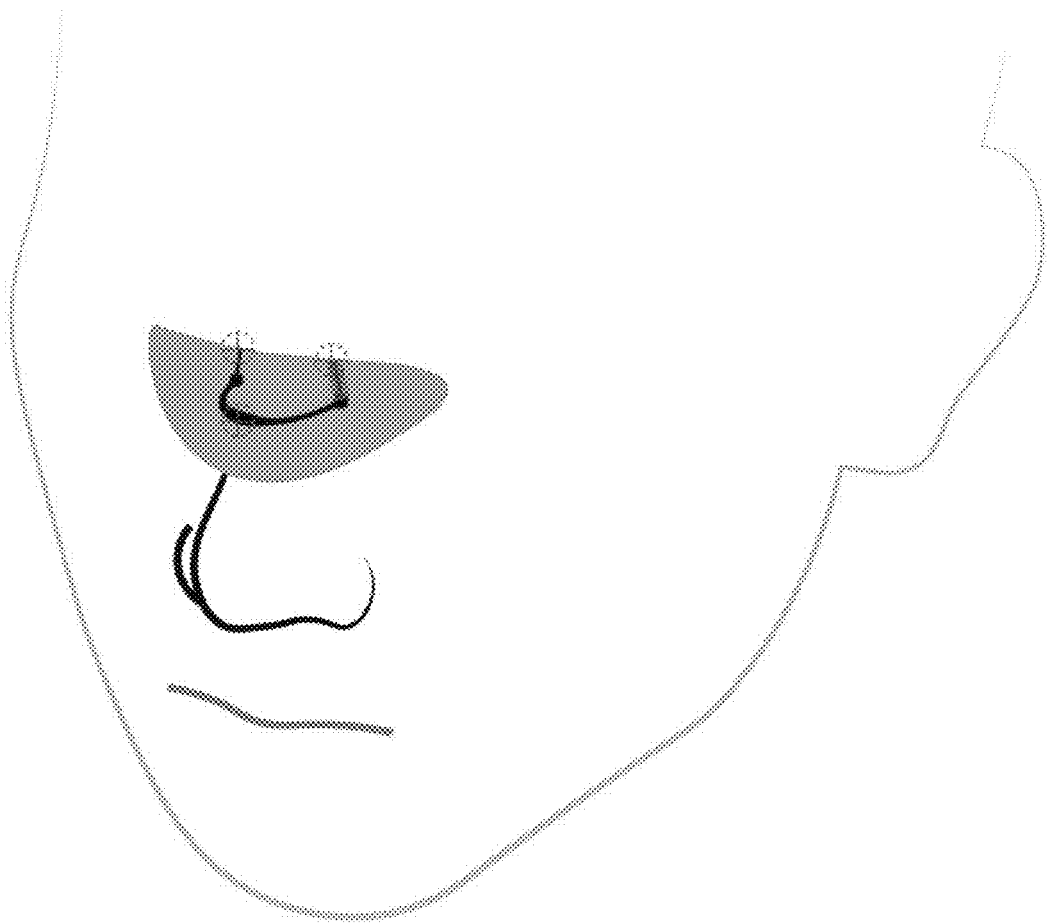

[FIG. 22]
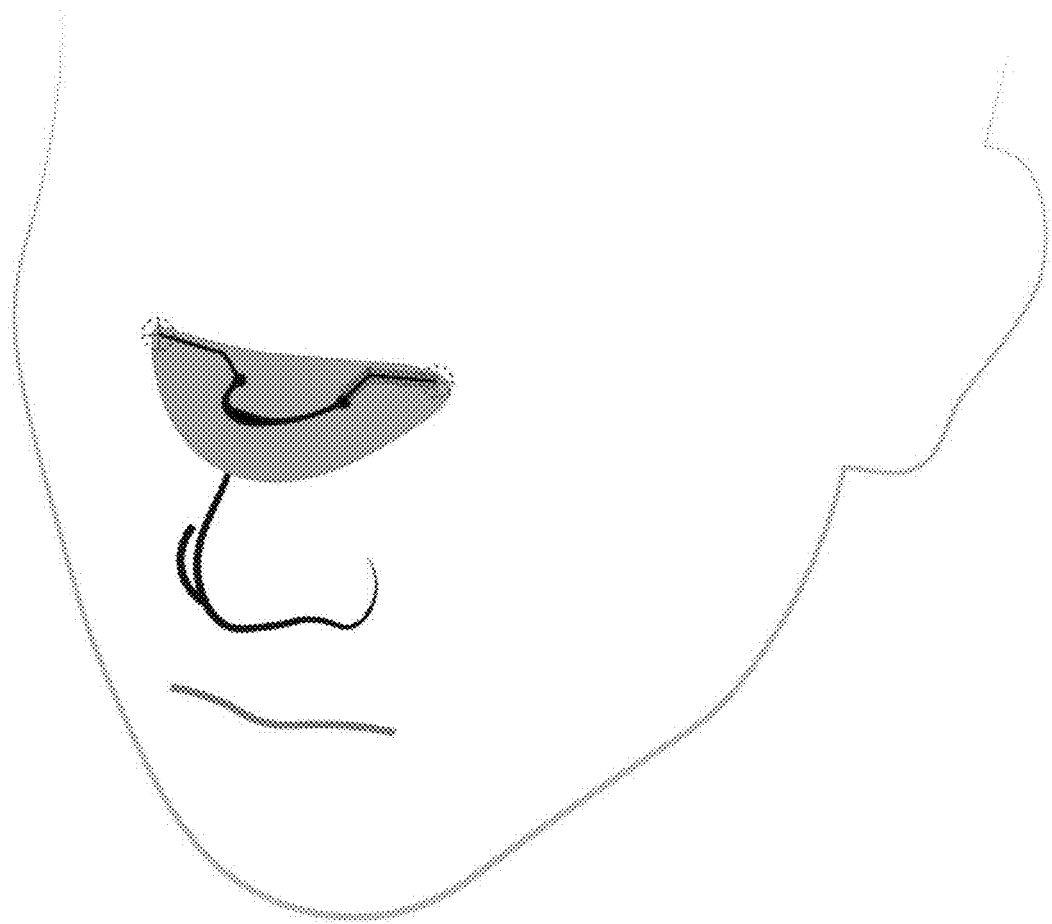

[FIG. 23]
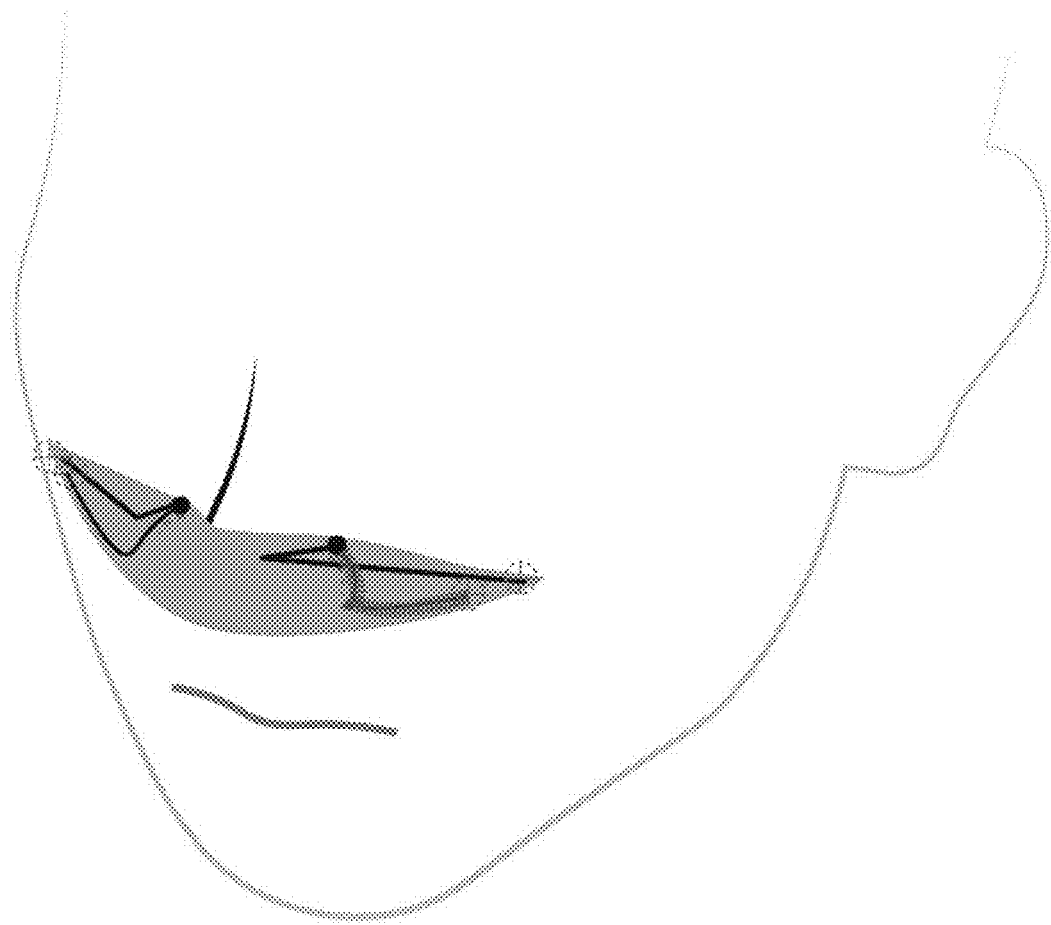

[FIG. 24]
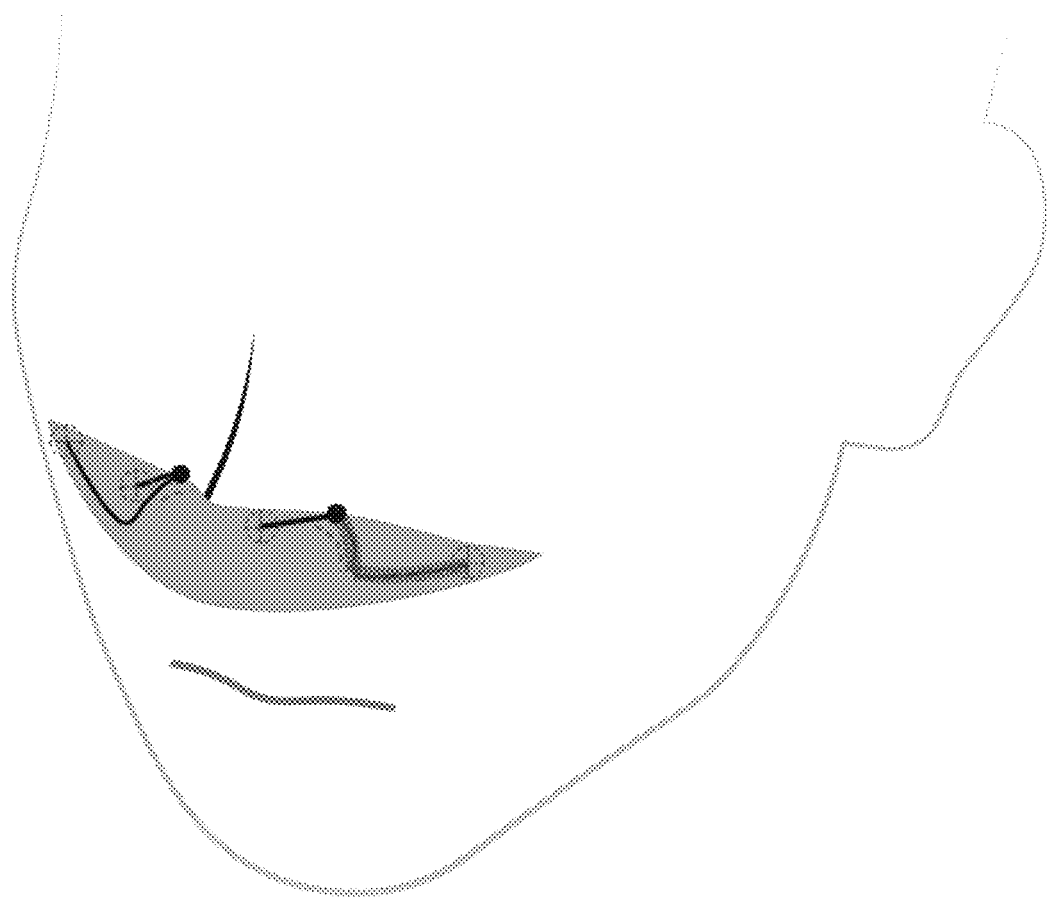

【FIG. 25】
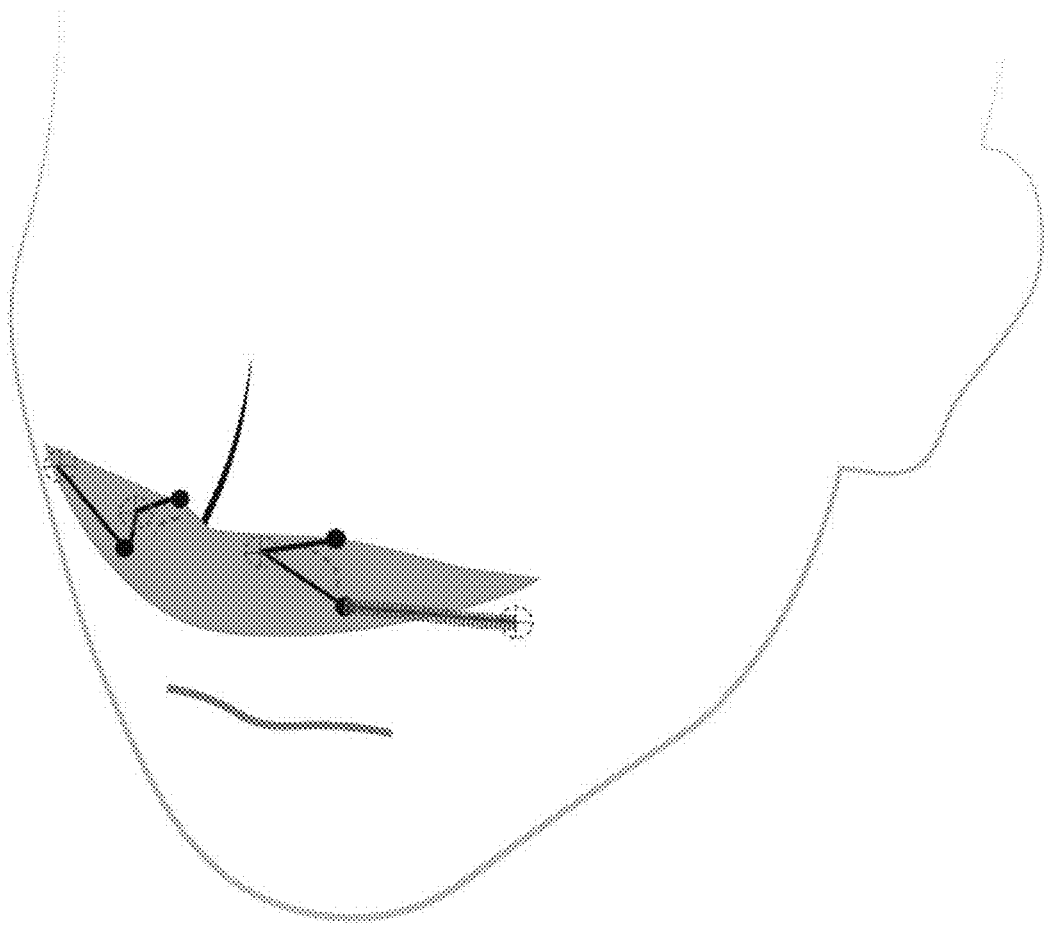

[FIG. 26]
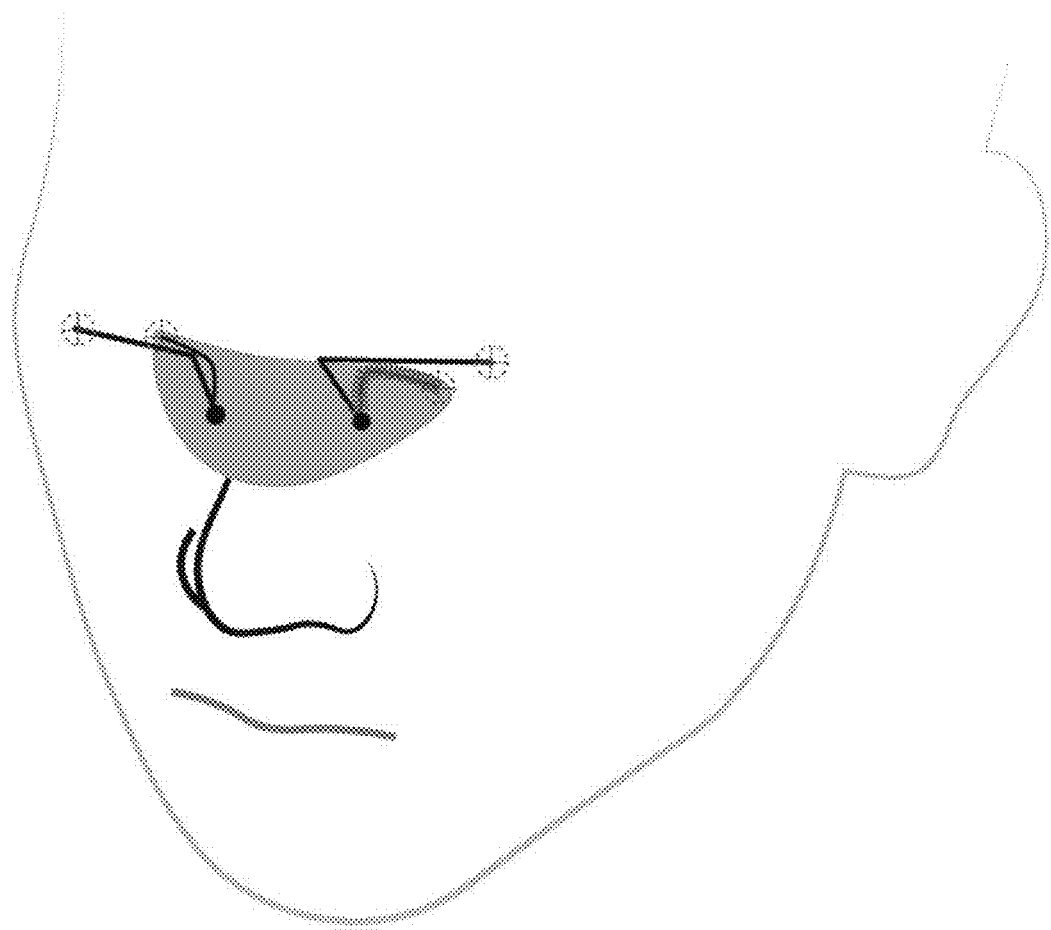

[FIG. 27]
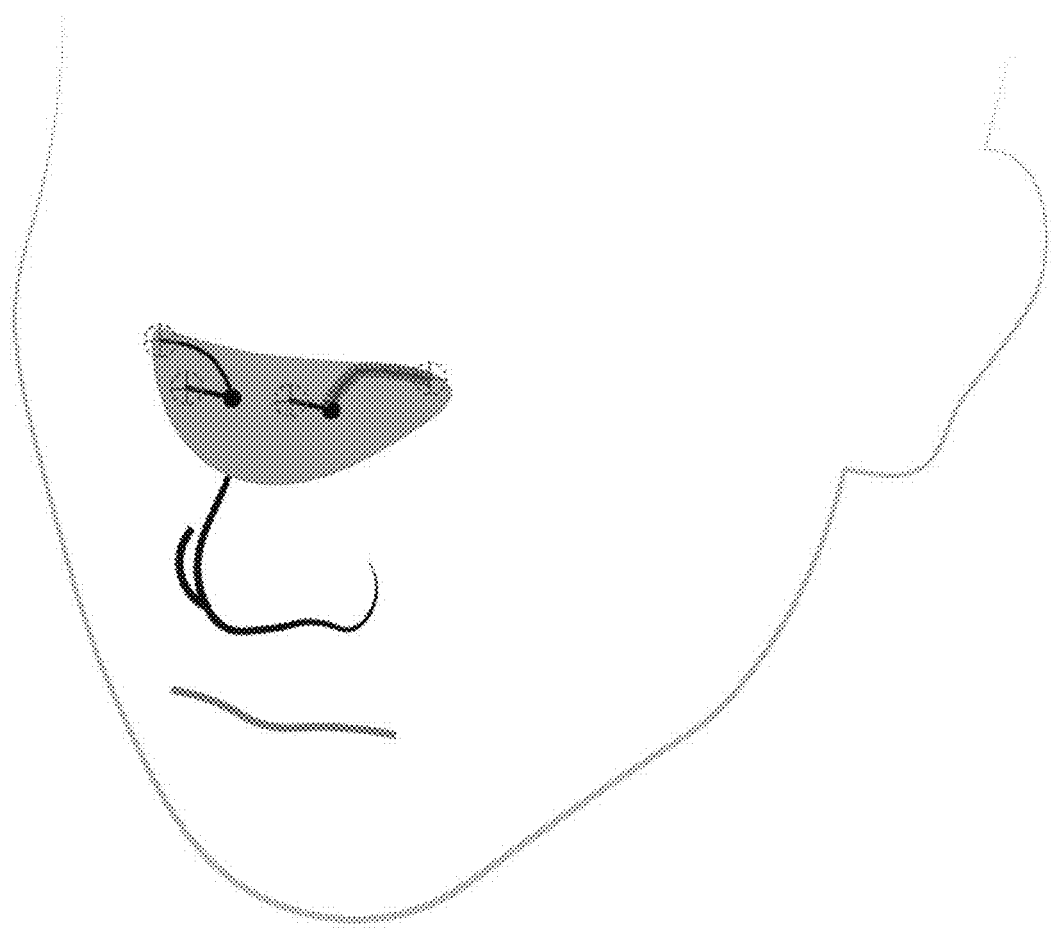

【FIG. 28】
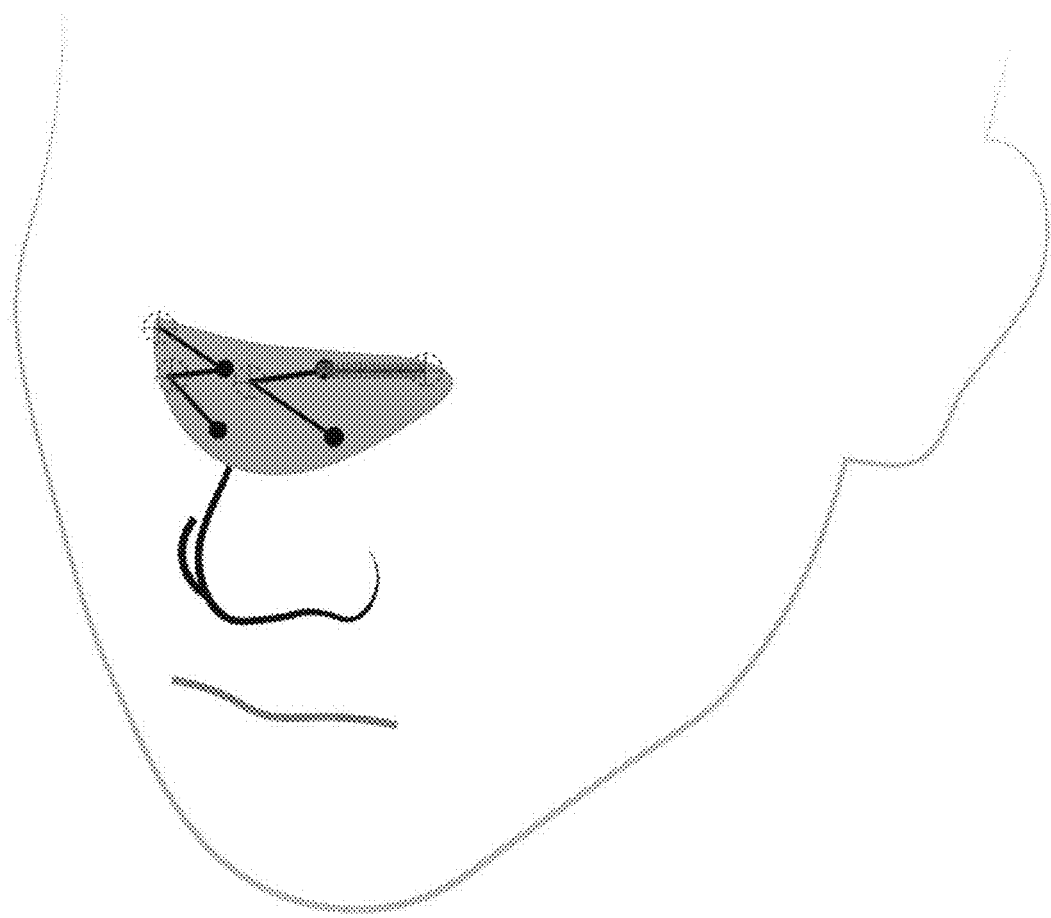

[FIG. 29]
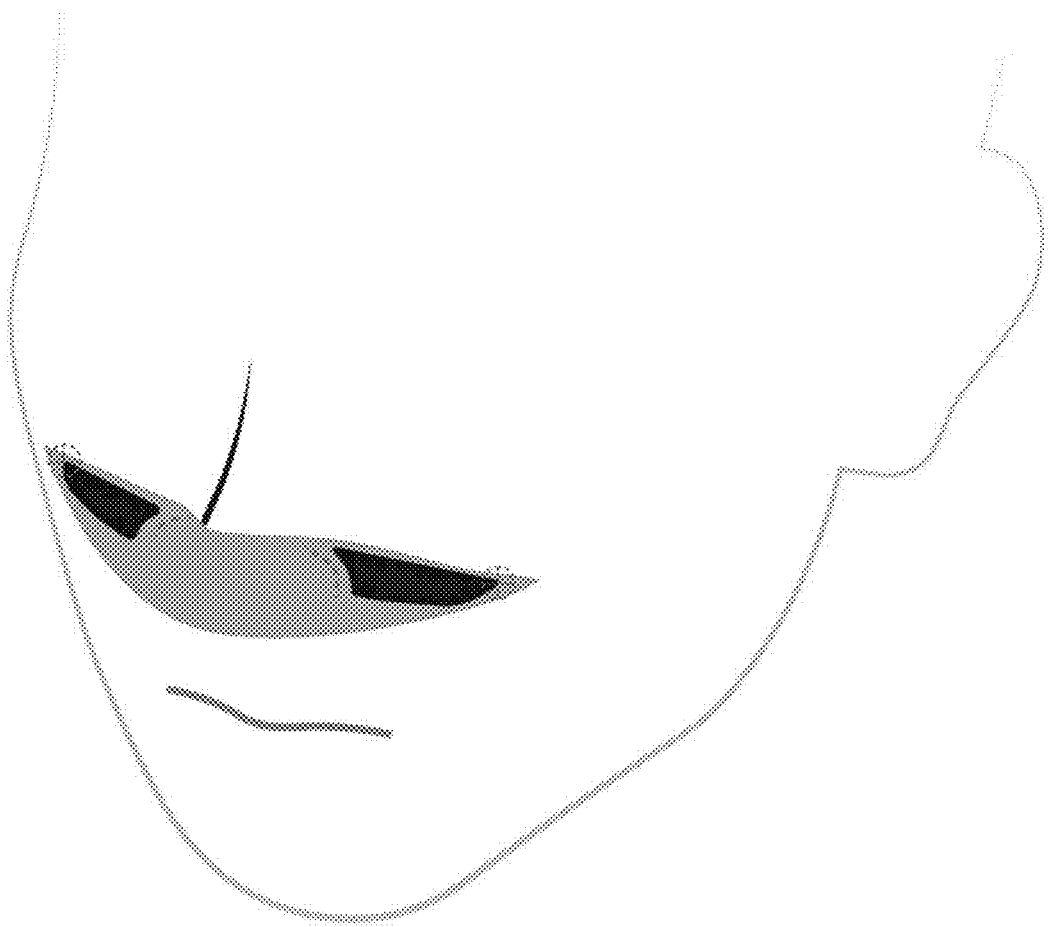

[FIG. 30]
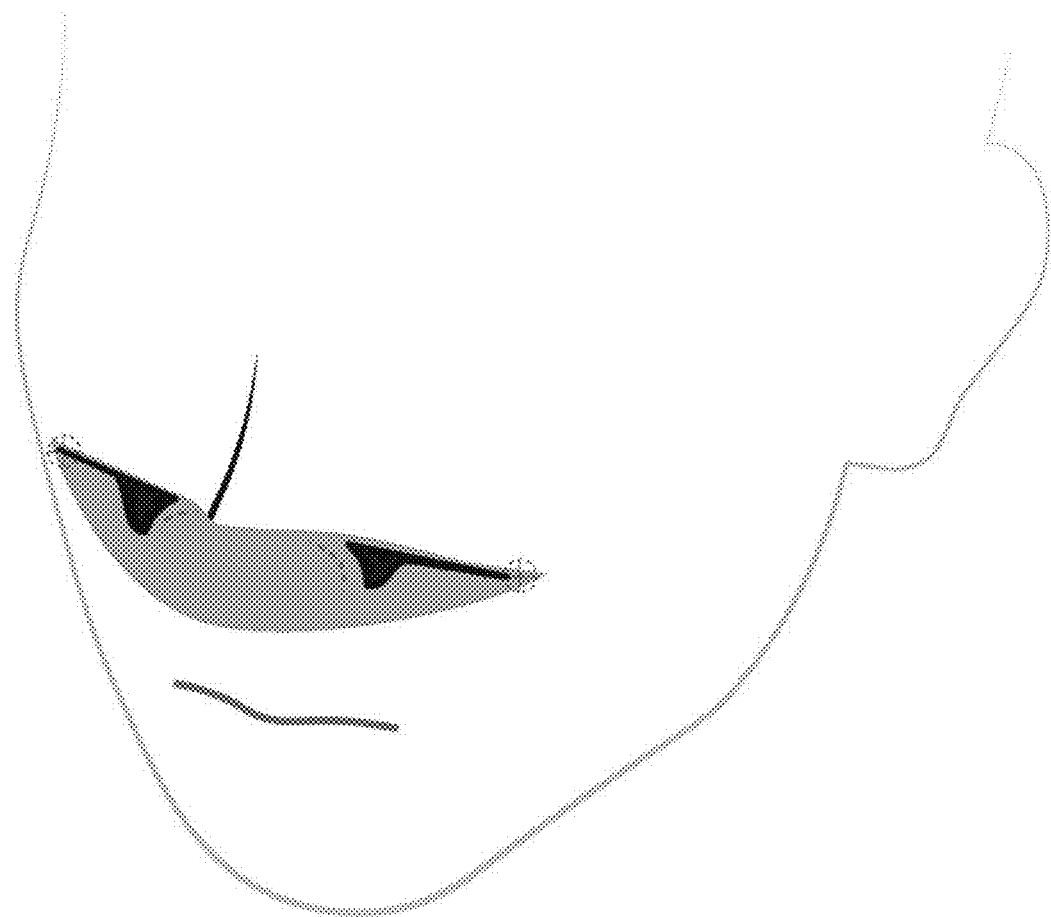

[FIG. 31]
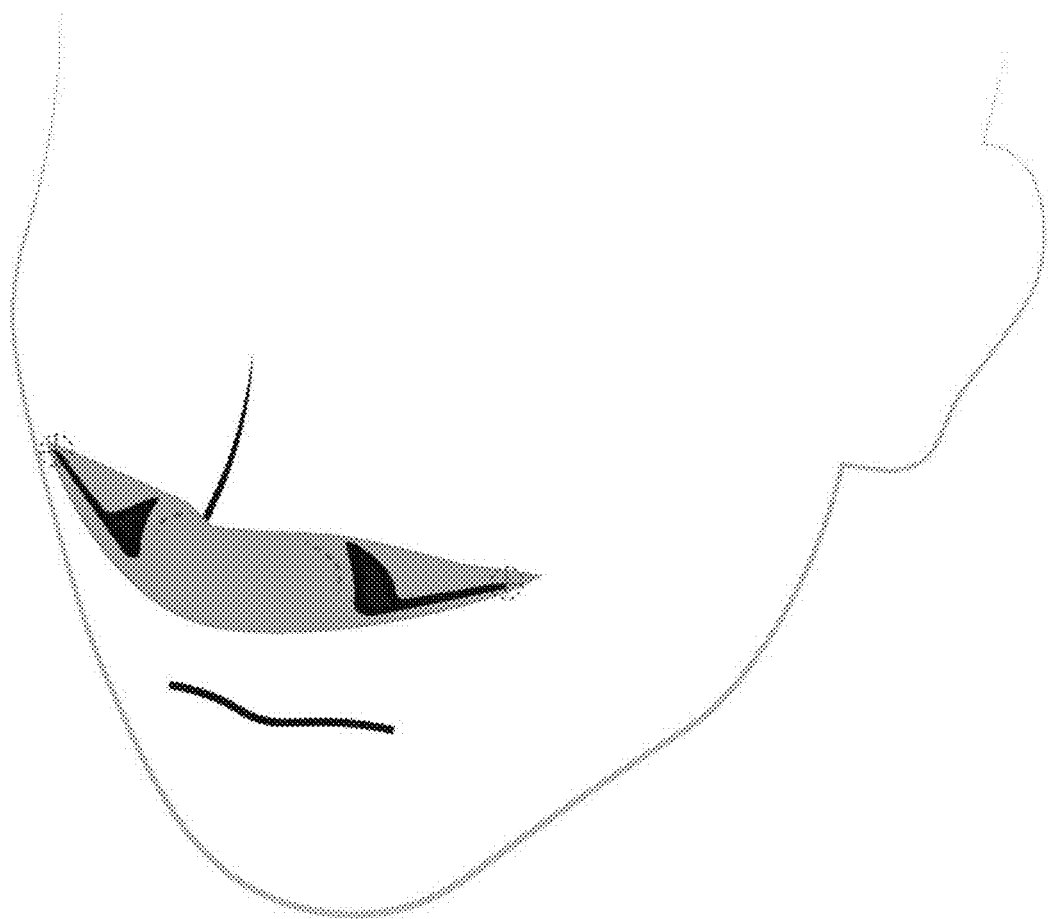

[FIG. 32]

[FIG. 33]

[FIG. 34]
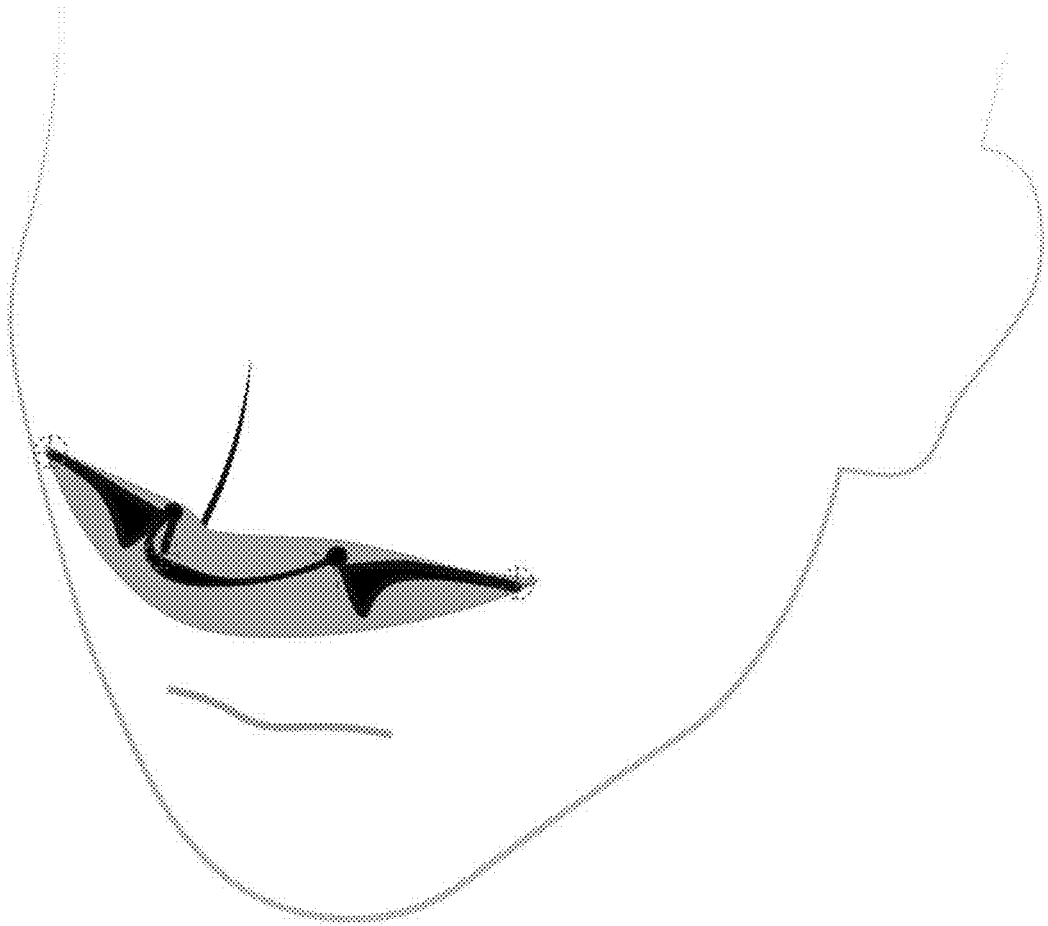

[FIG. 35]
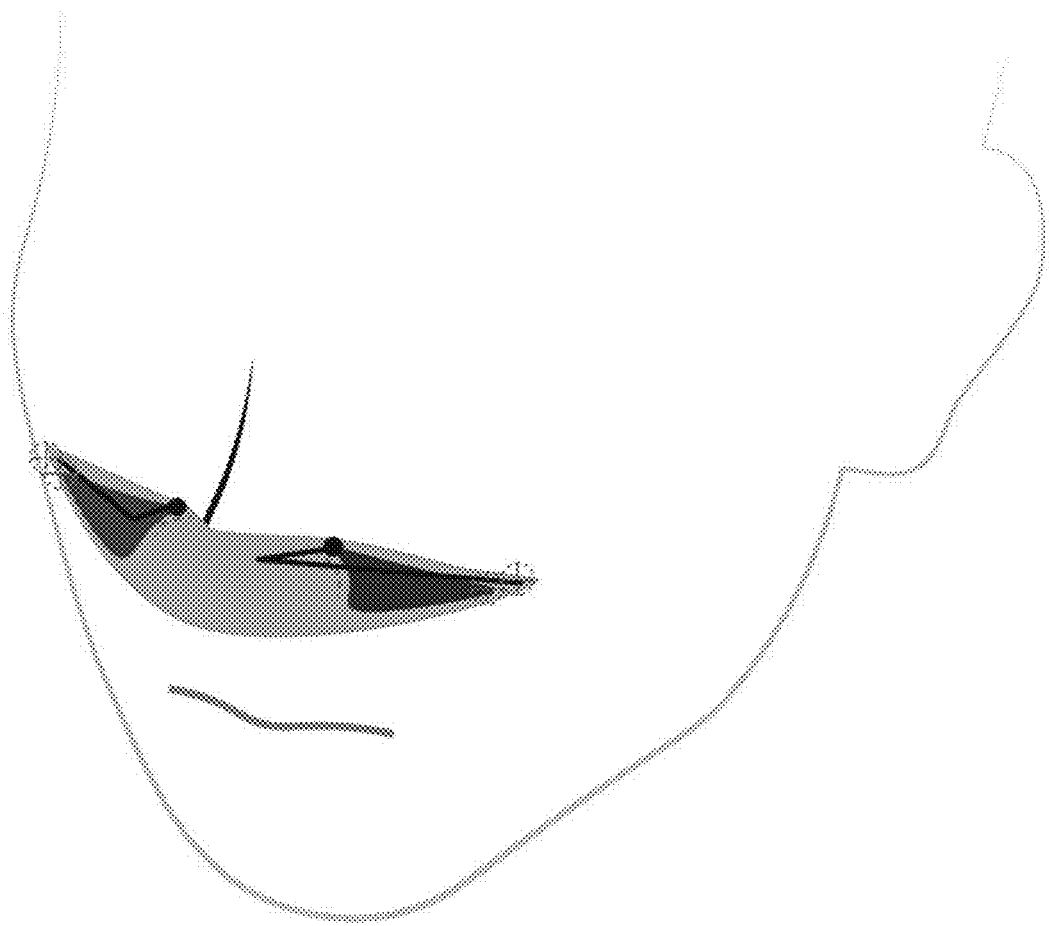

[FIG. 36]
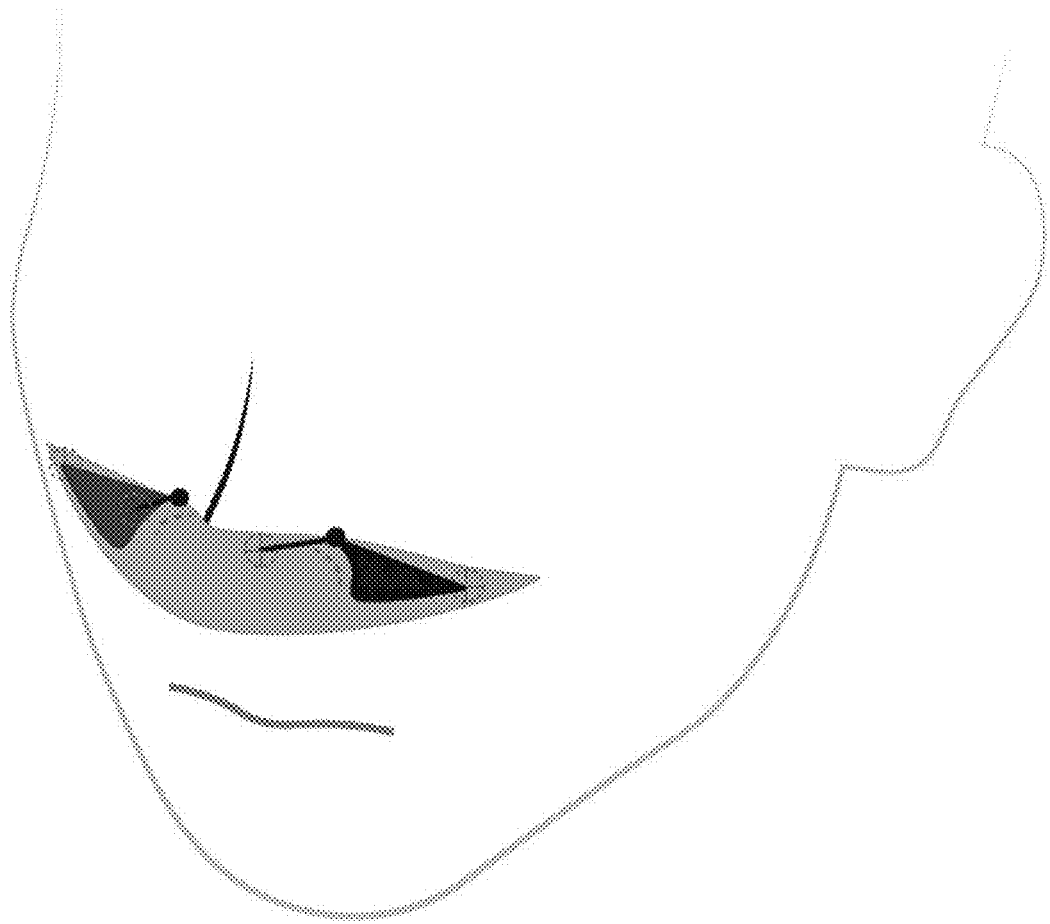

[FIG. 37]
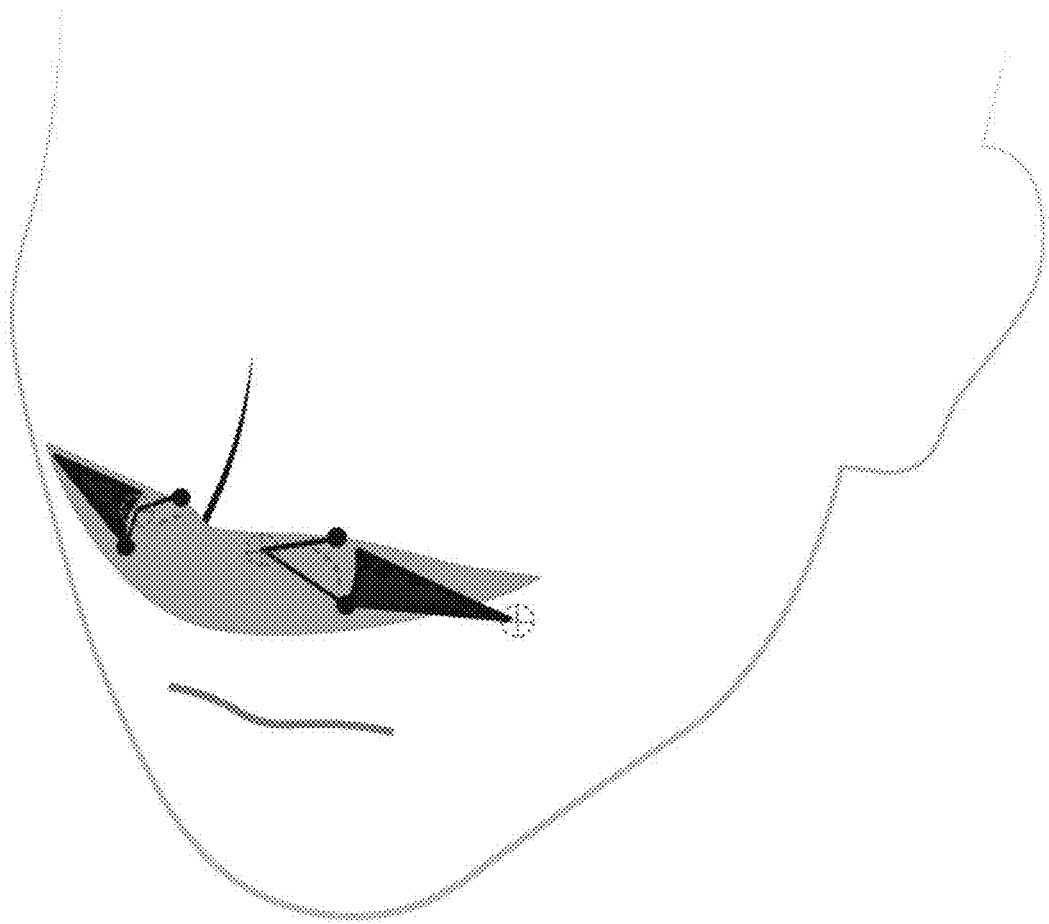

[FIG. 38]
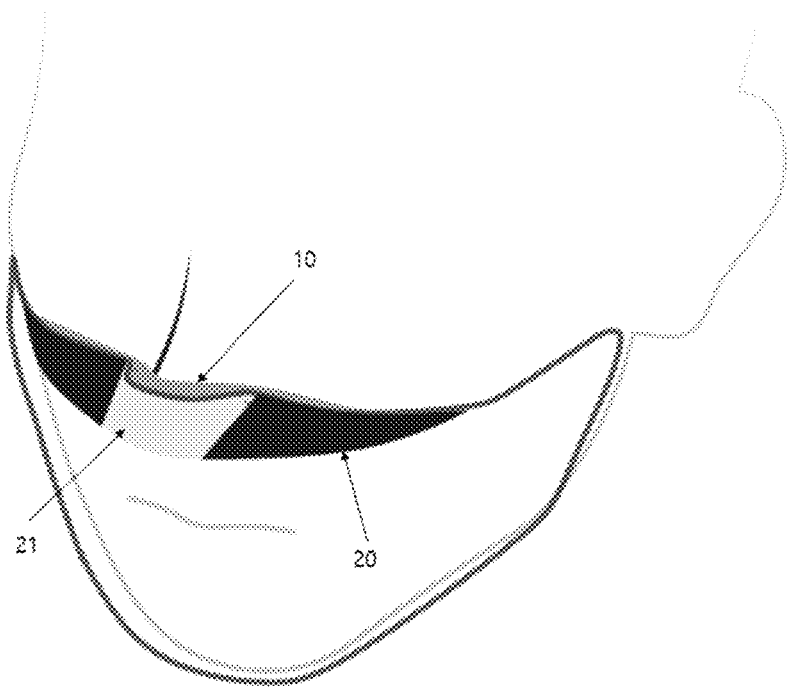

[FIG. 39]
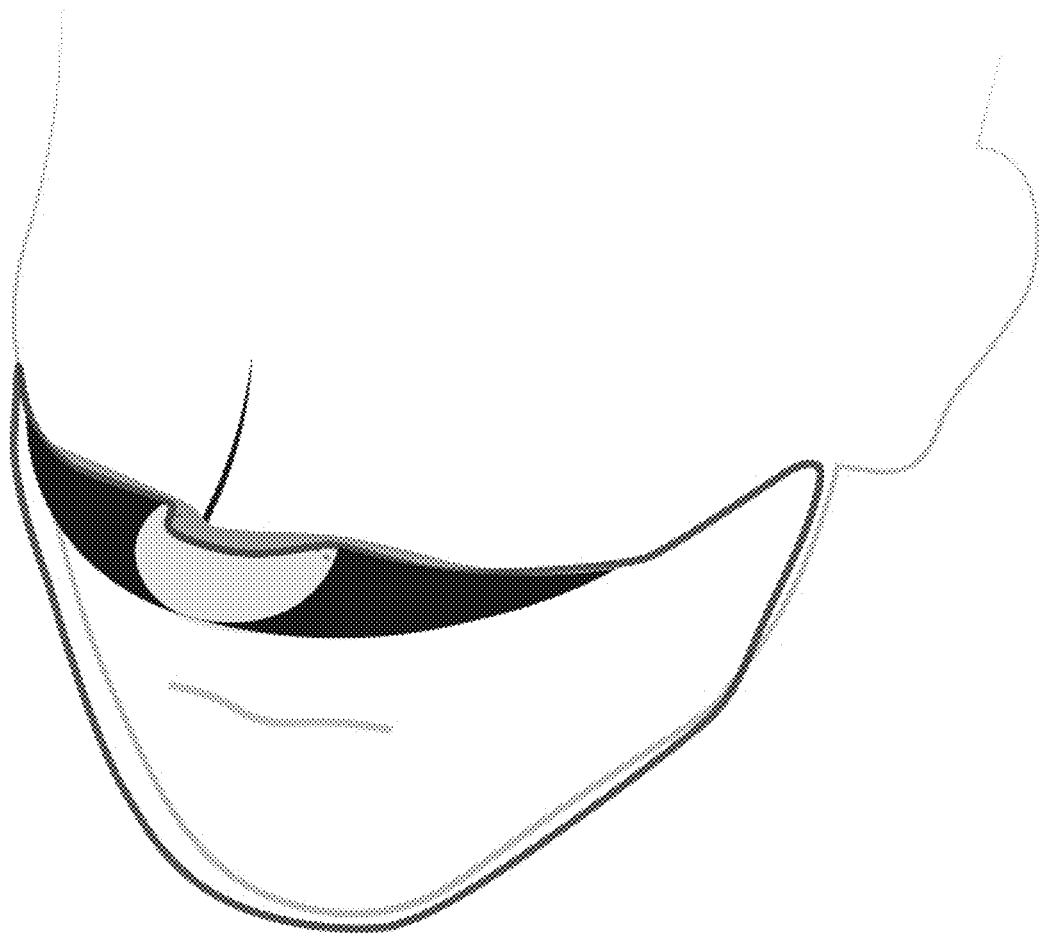

[FIG. 40]
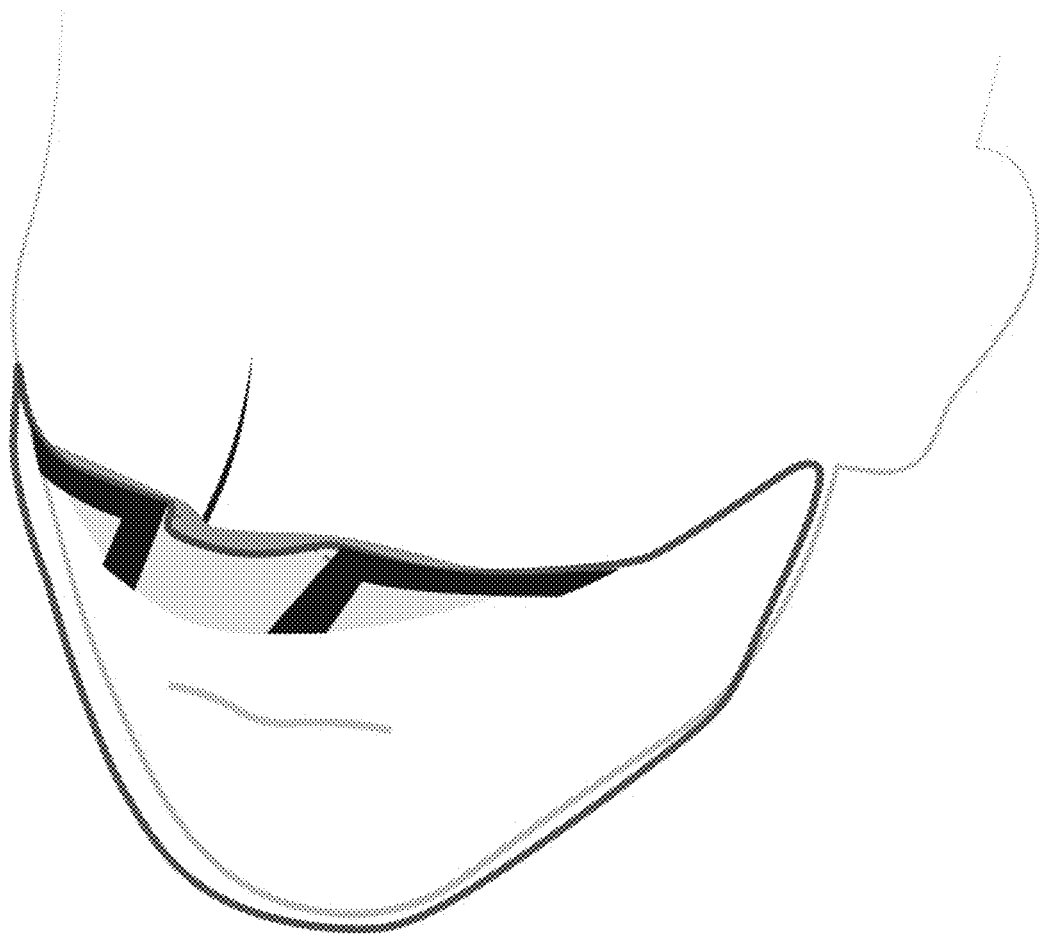

[FIG. 41]

[FIG. 42]
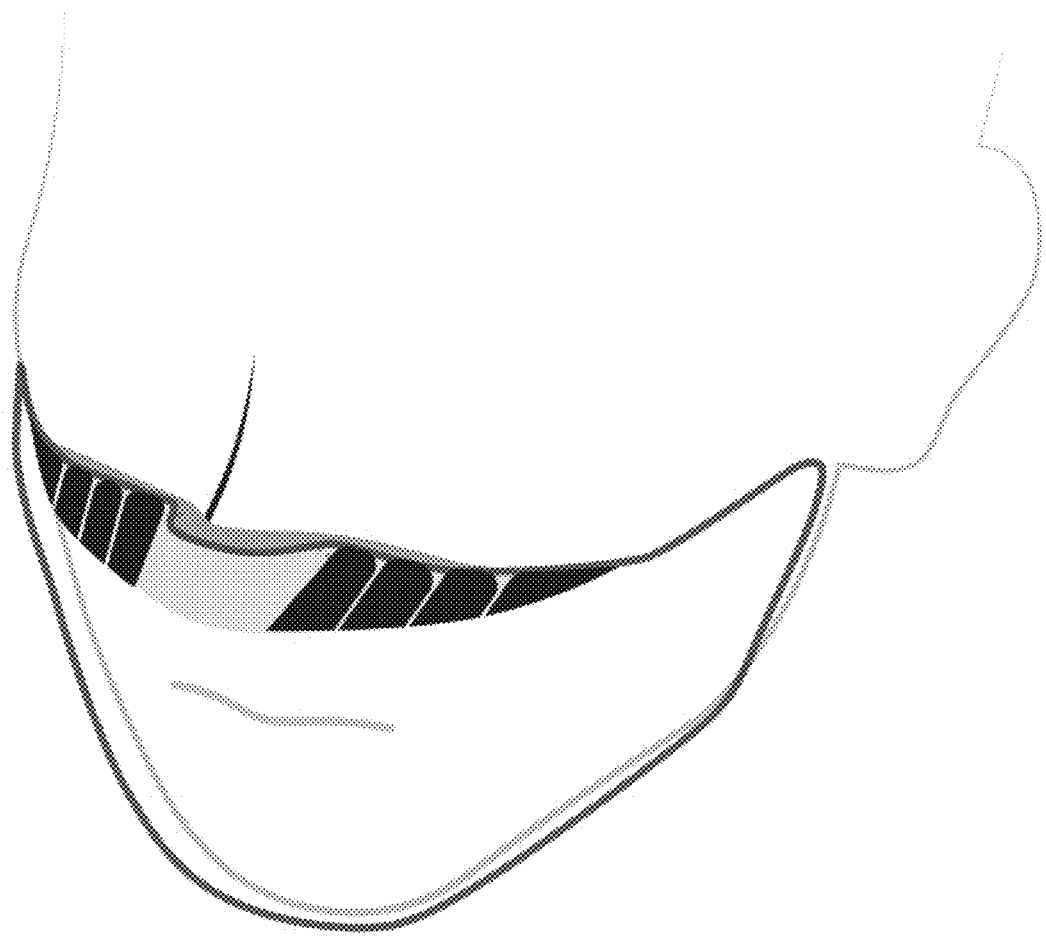

[FIG. 43]
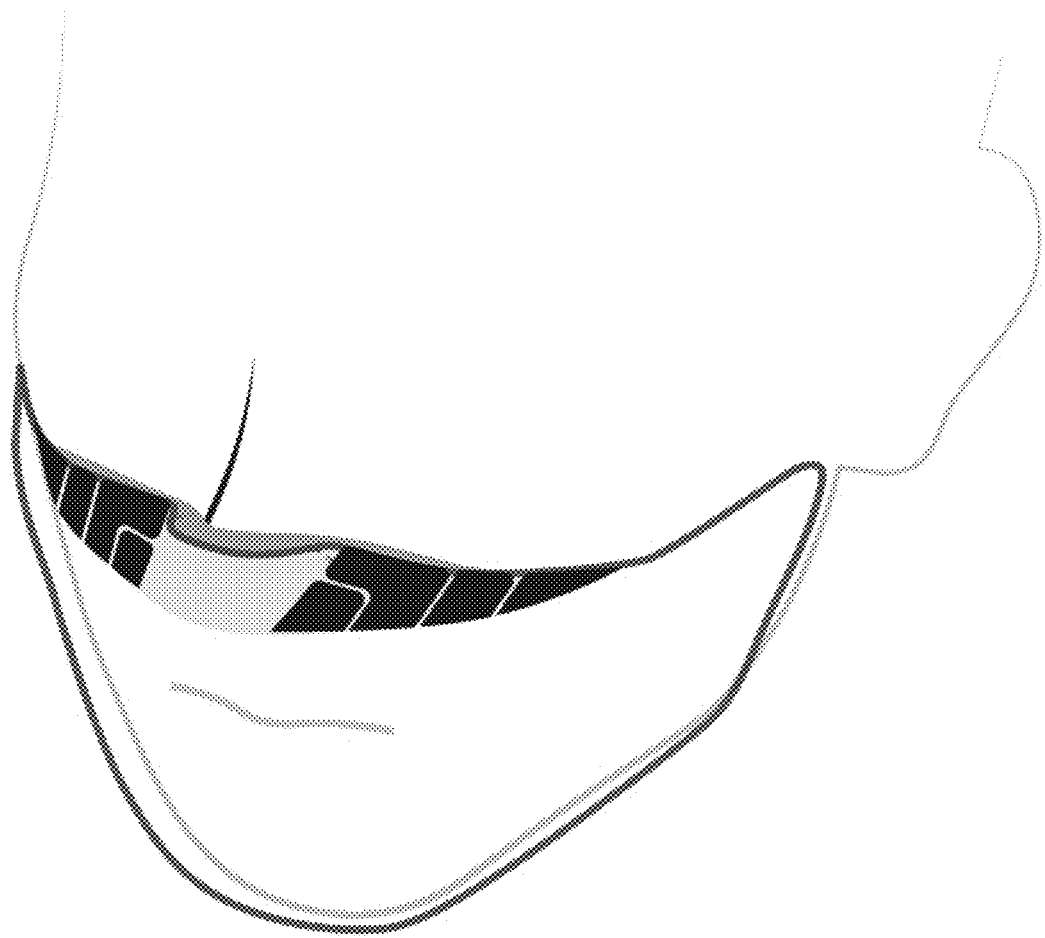

[FIG. 44]
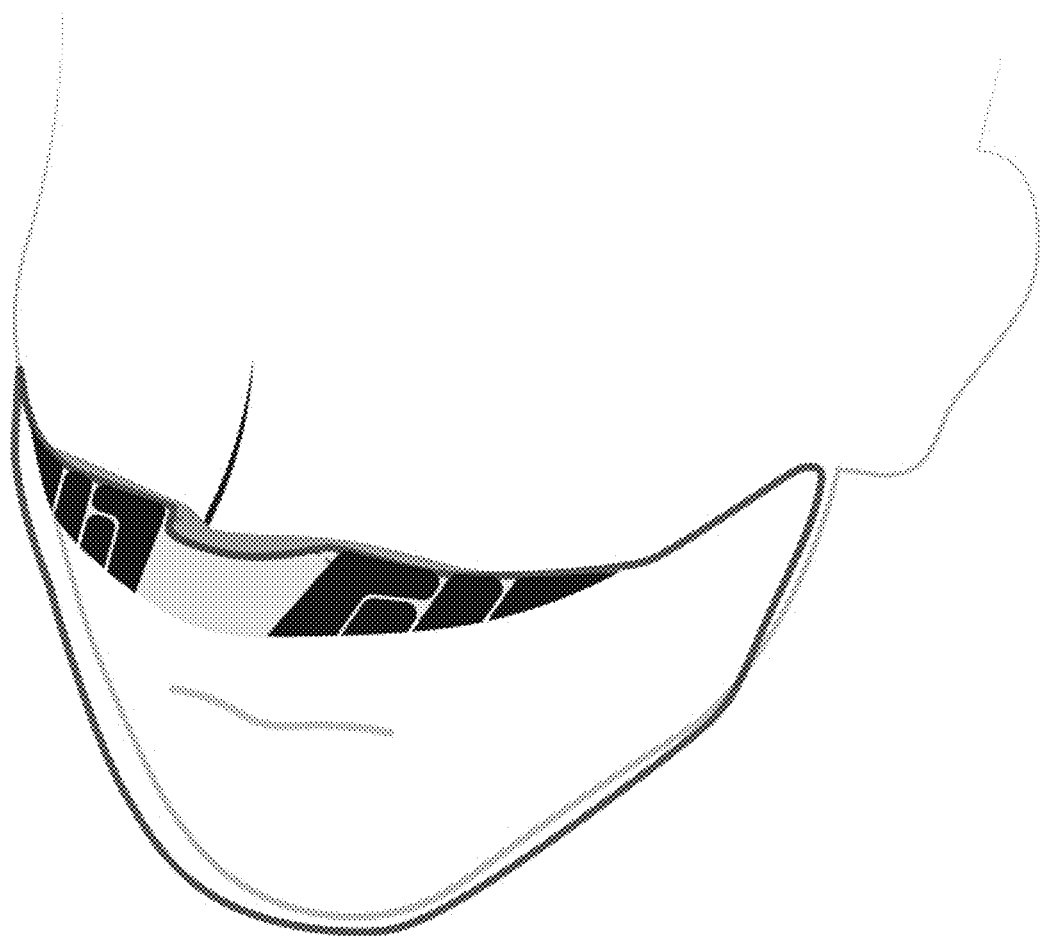

[FIG. 45]
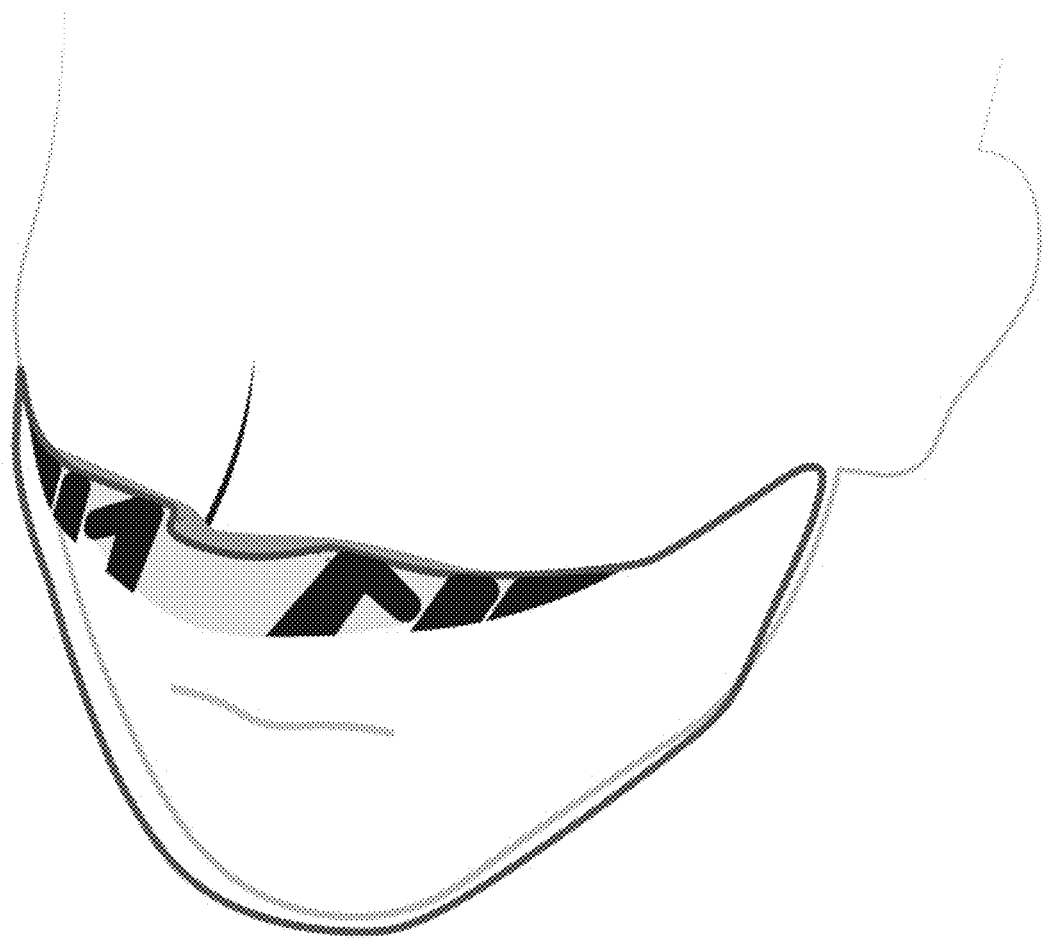

[FIG. 46]
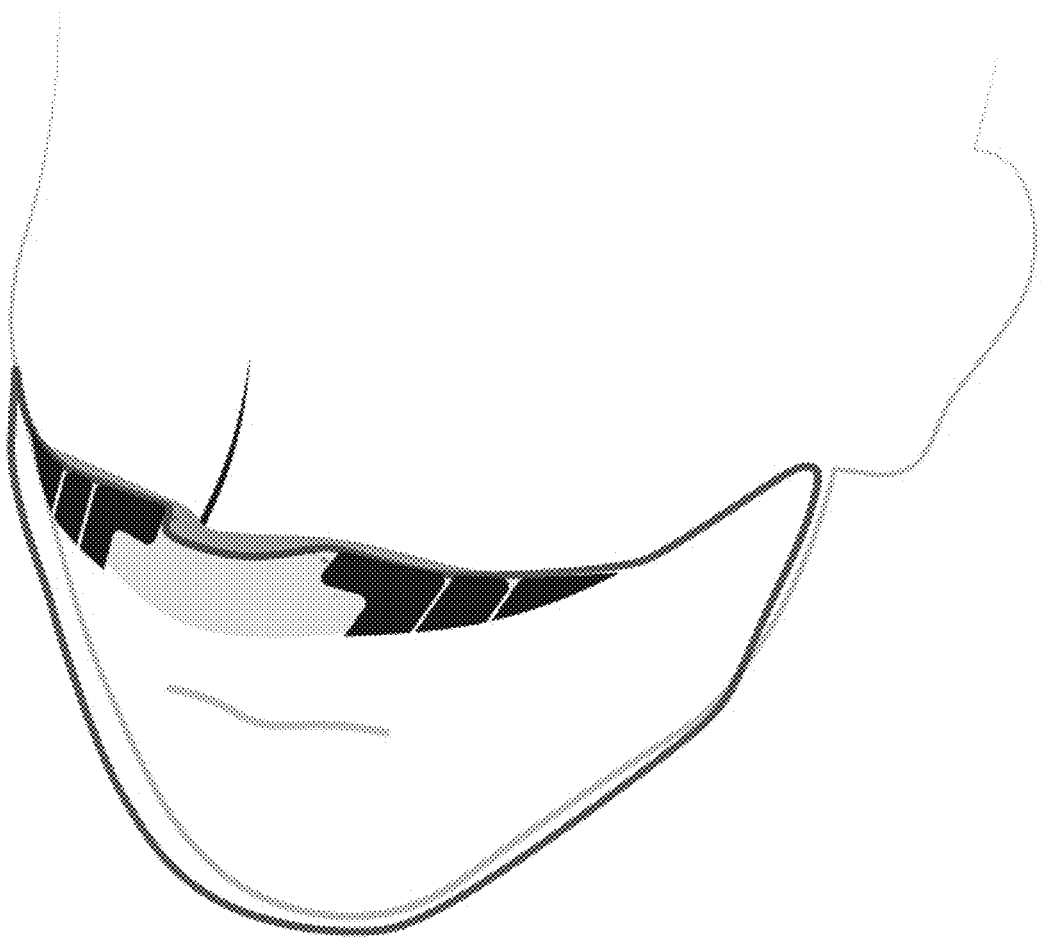

[FIG. 47]
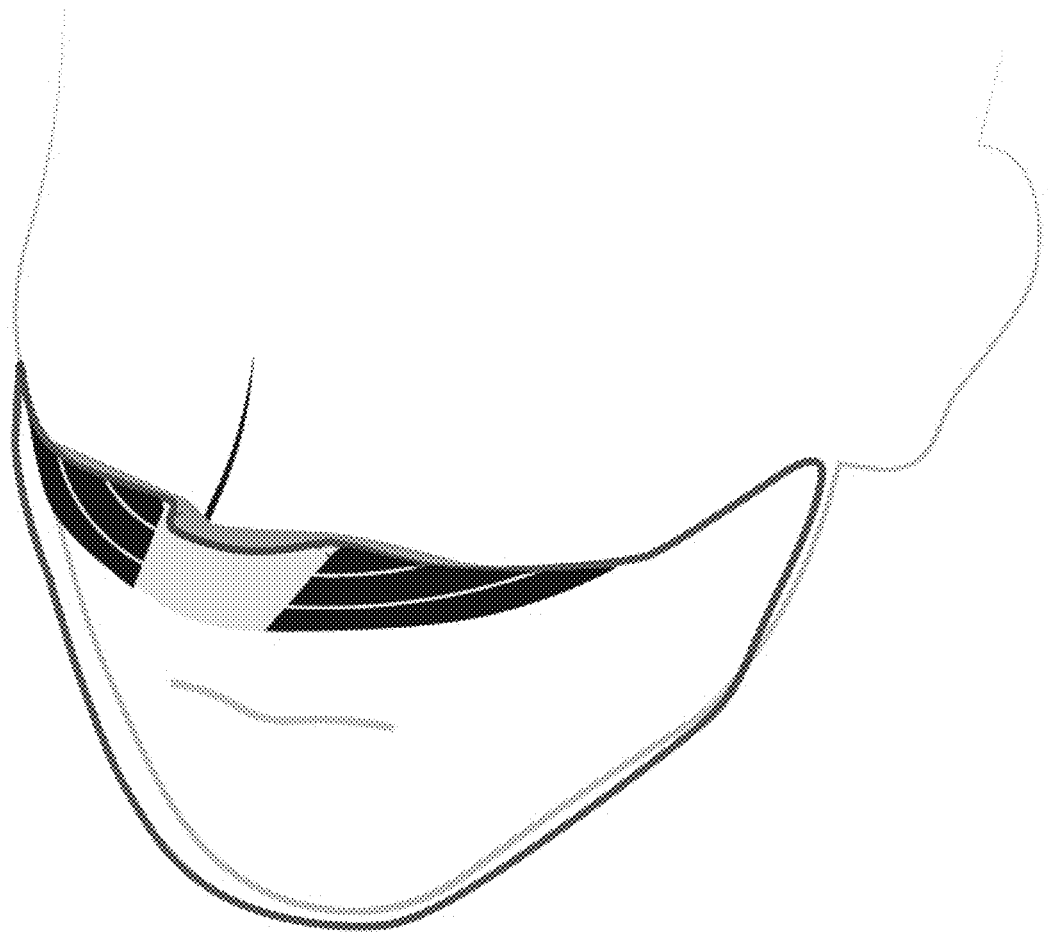

[FIG. 48]
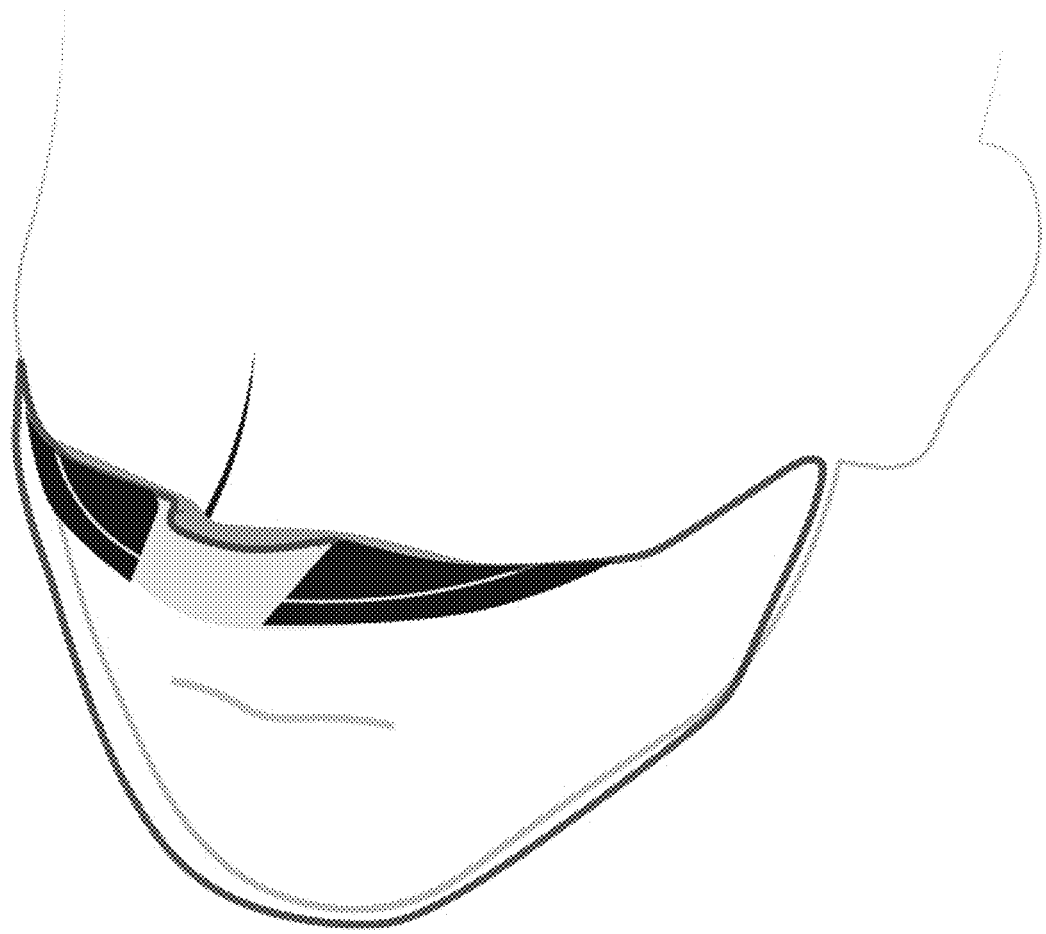

【FIG. 49】
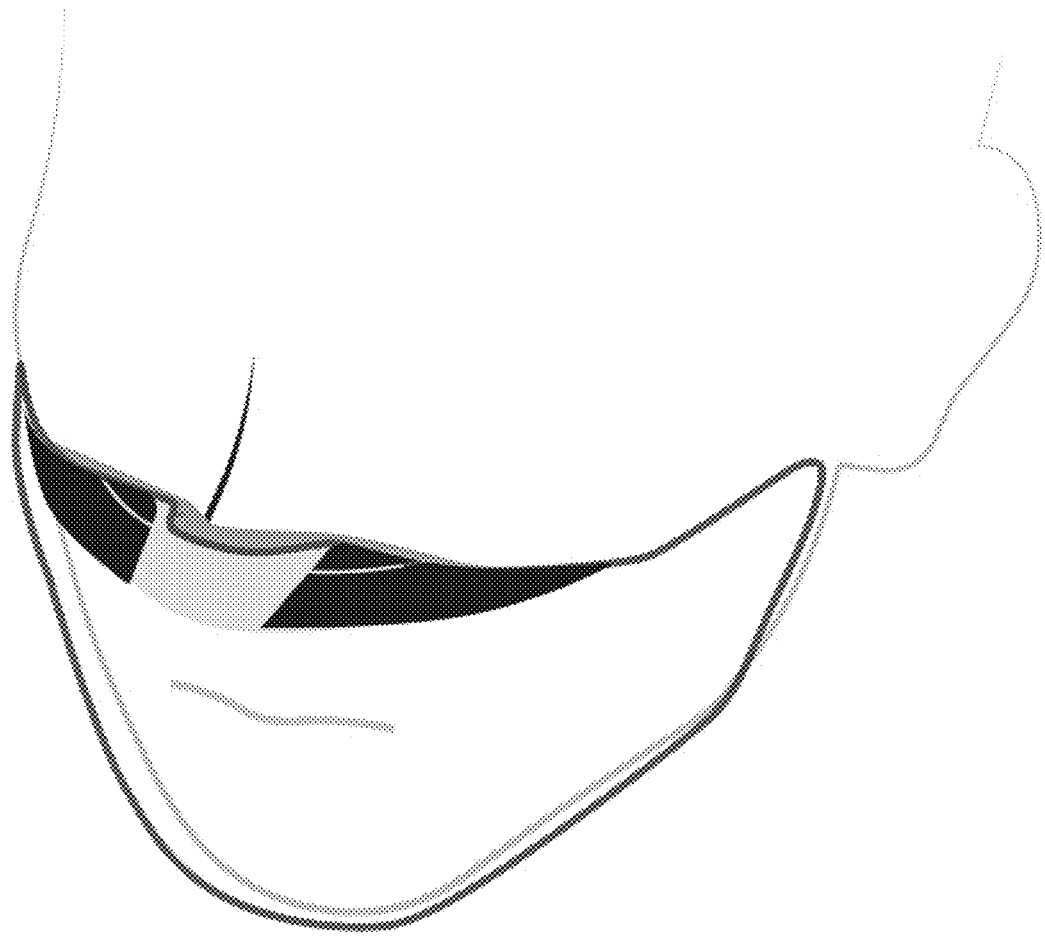

[FIG. 50]

[FIG. 51]
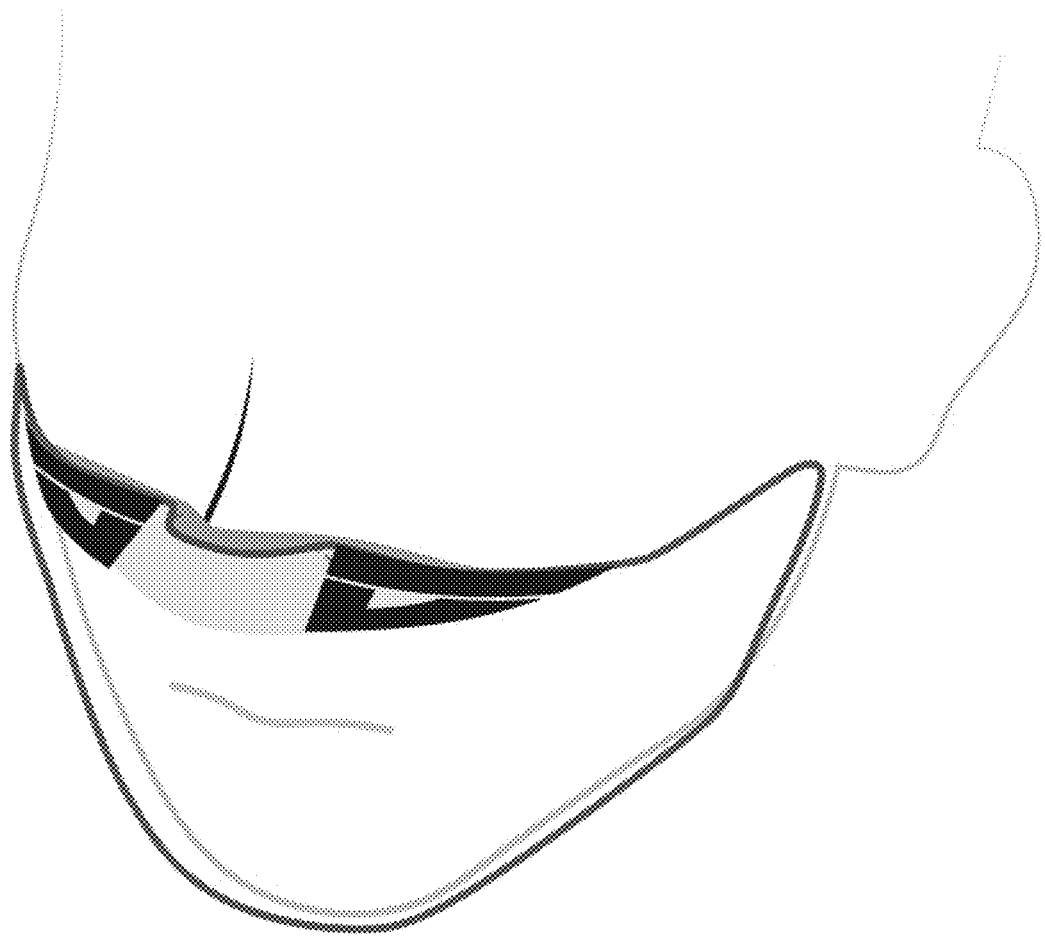

[FIG. 52]
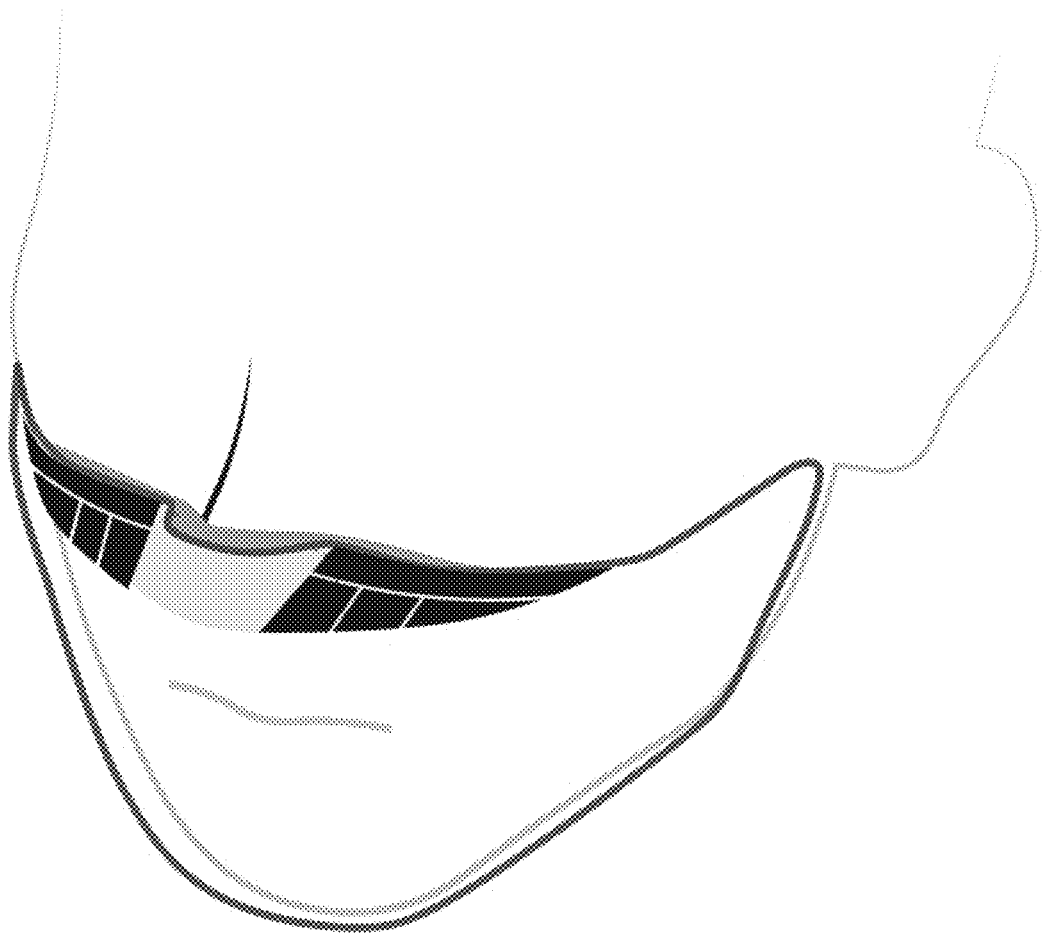

[FIG. 53]
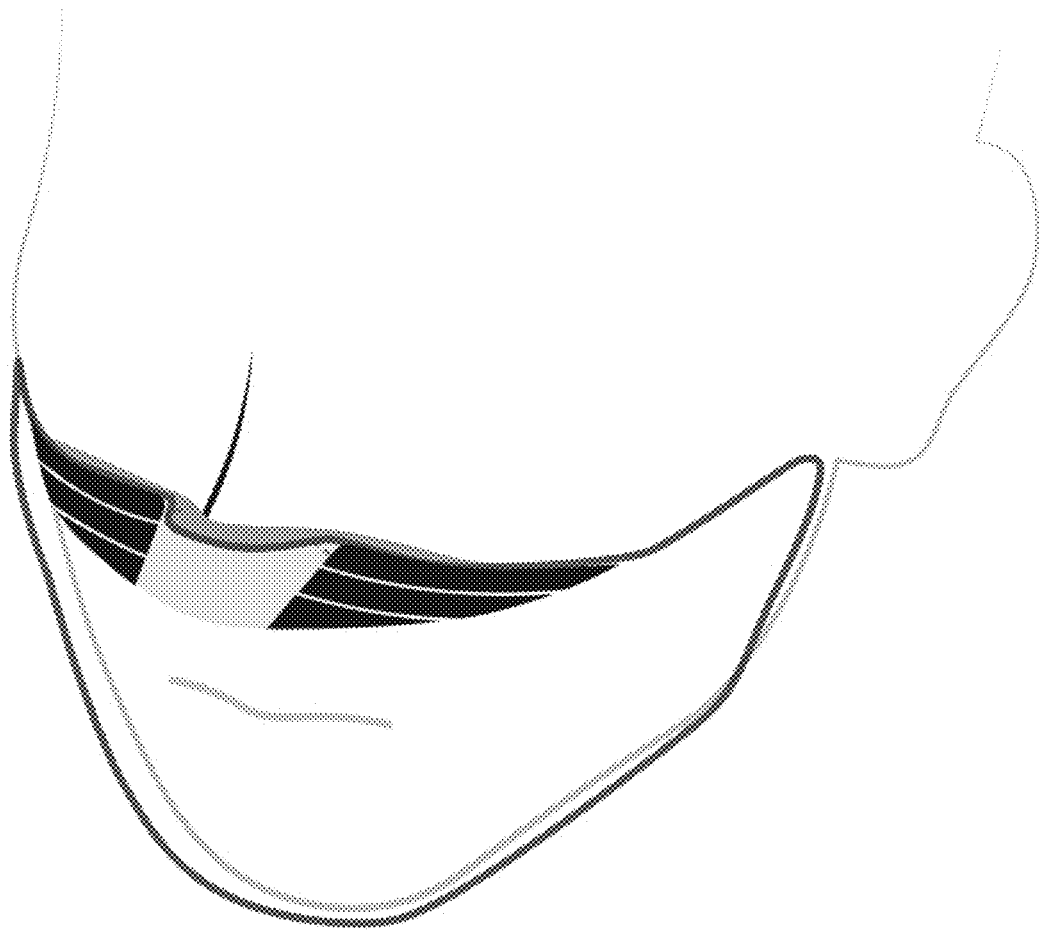

[FIG. 54]
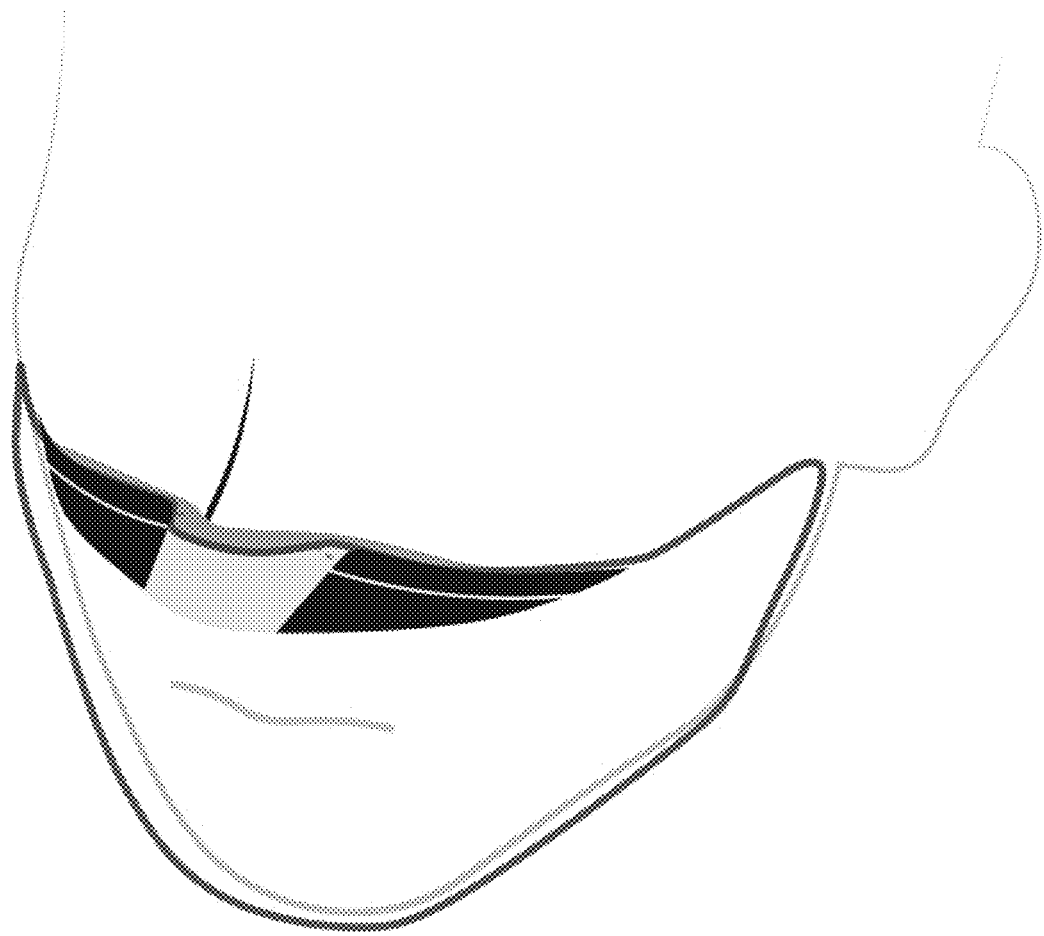

[FIG. 55]
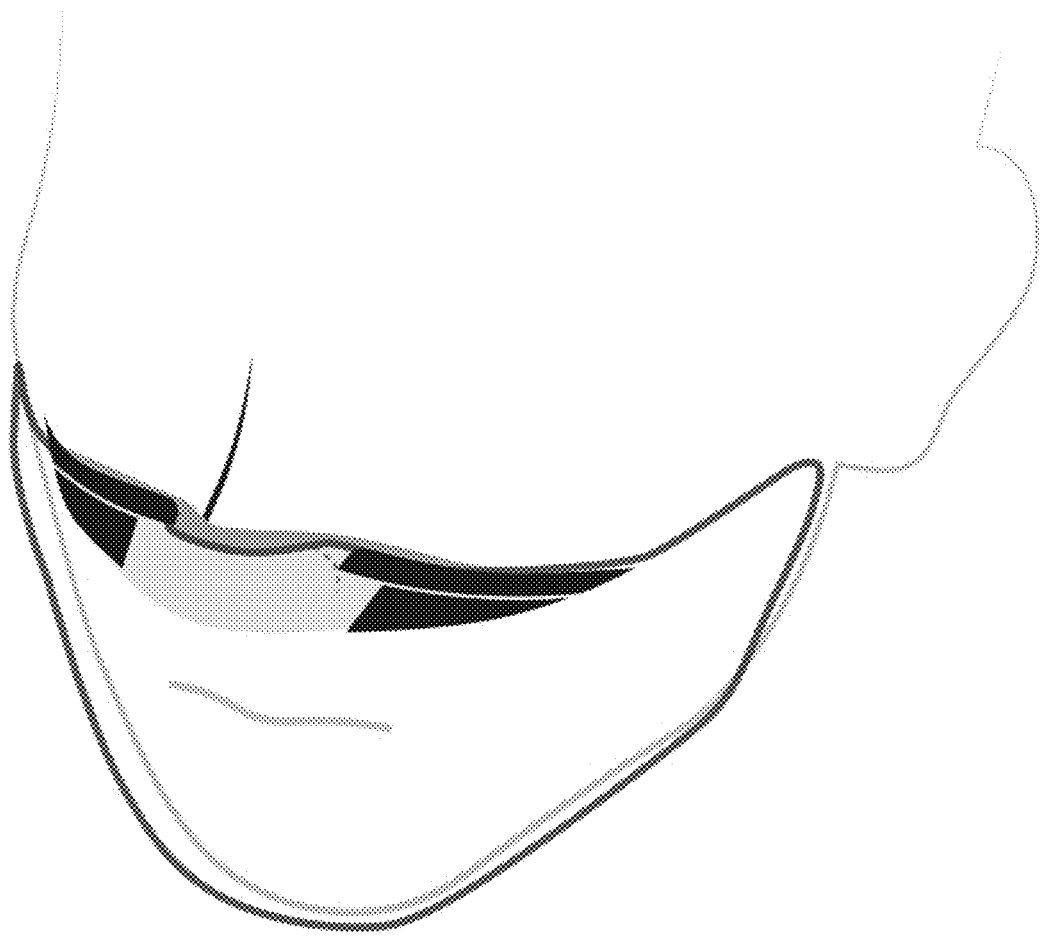

[FIG. 56]
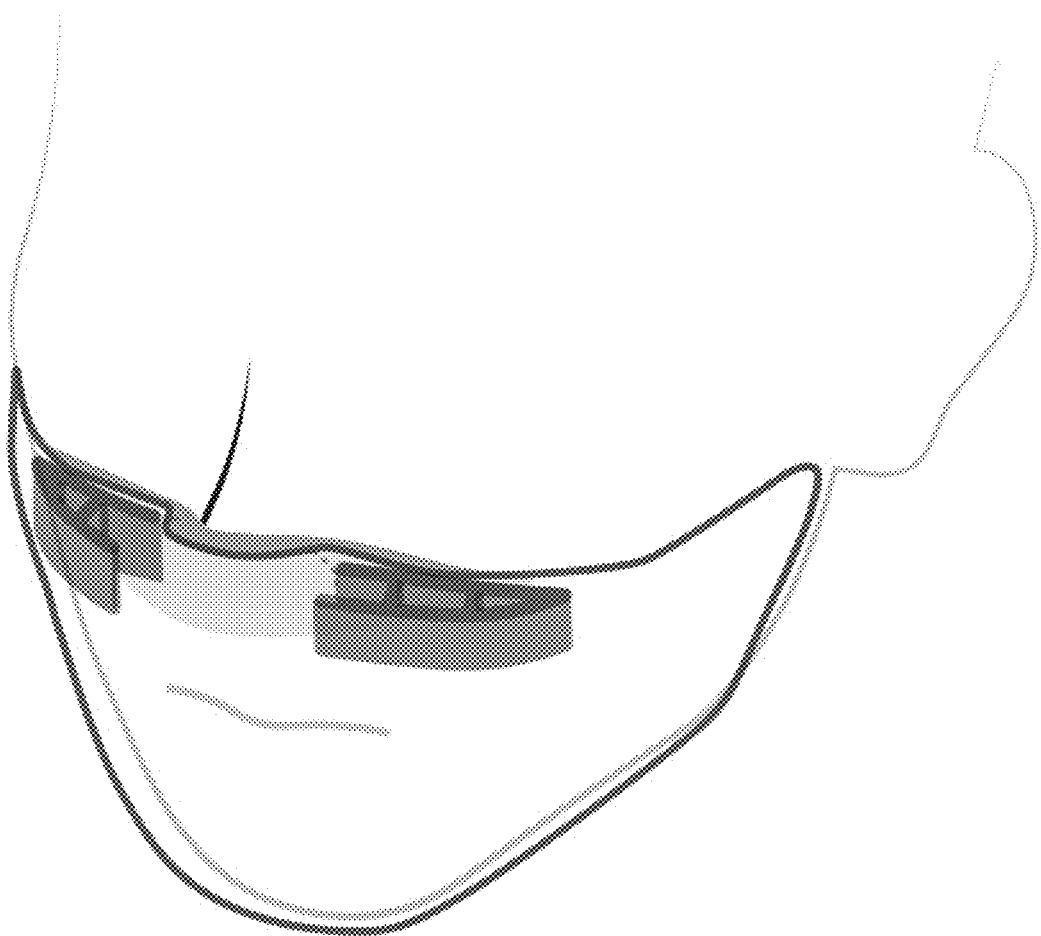

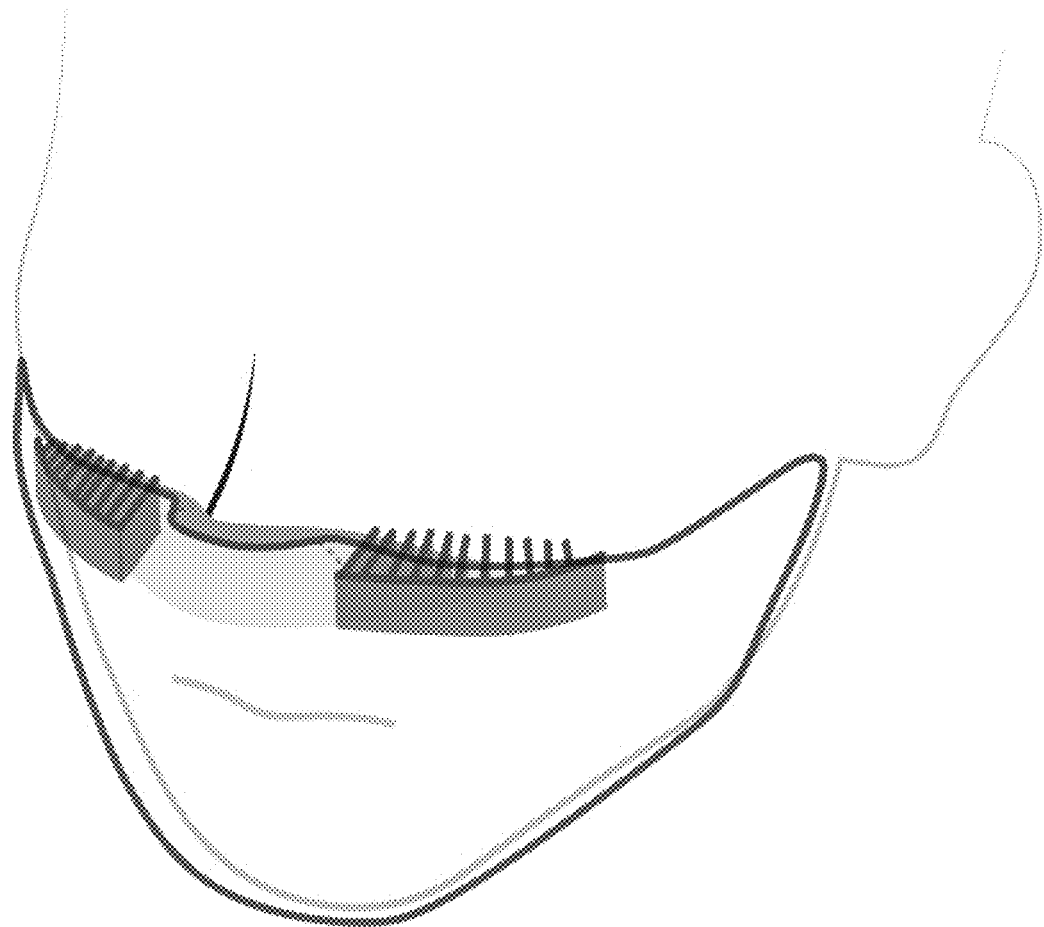
[FIG. 57]

[FIG. 58]
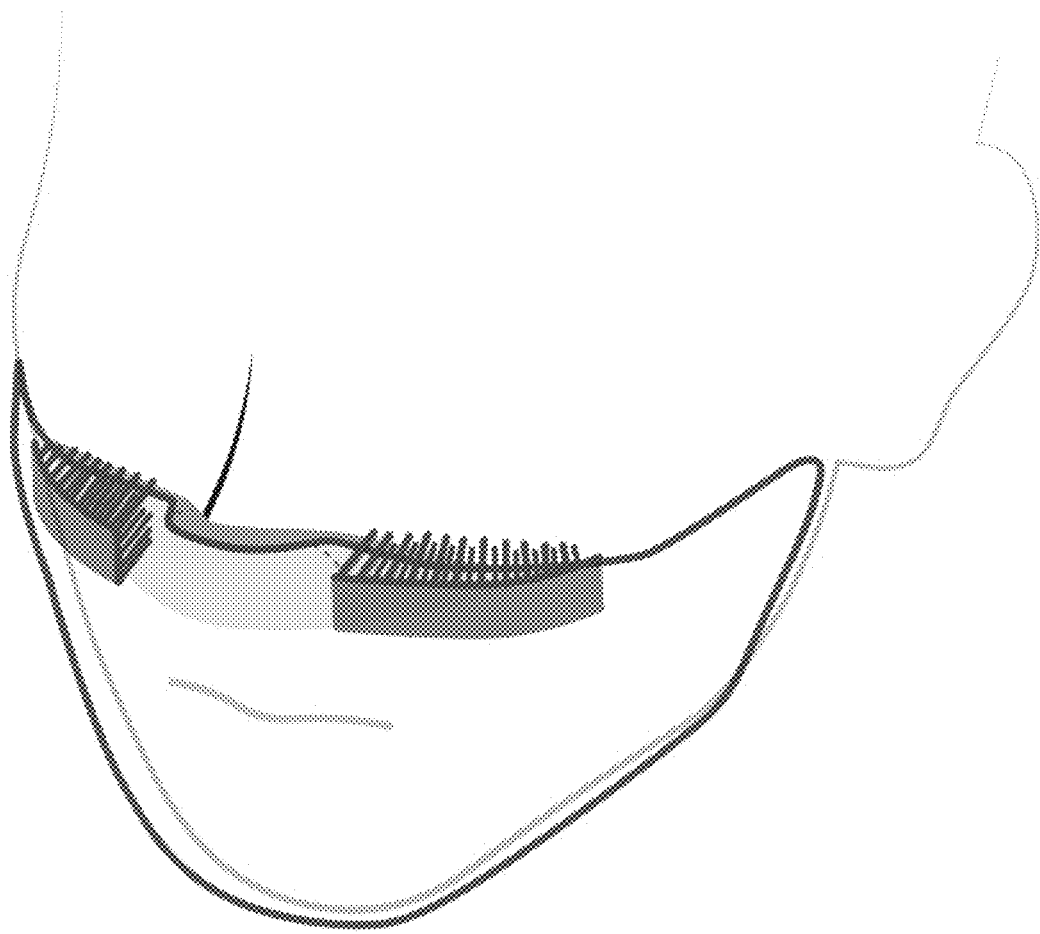

[FIG. 59]
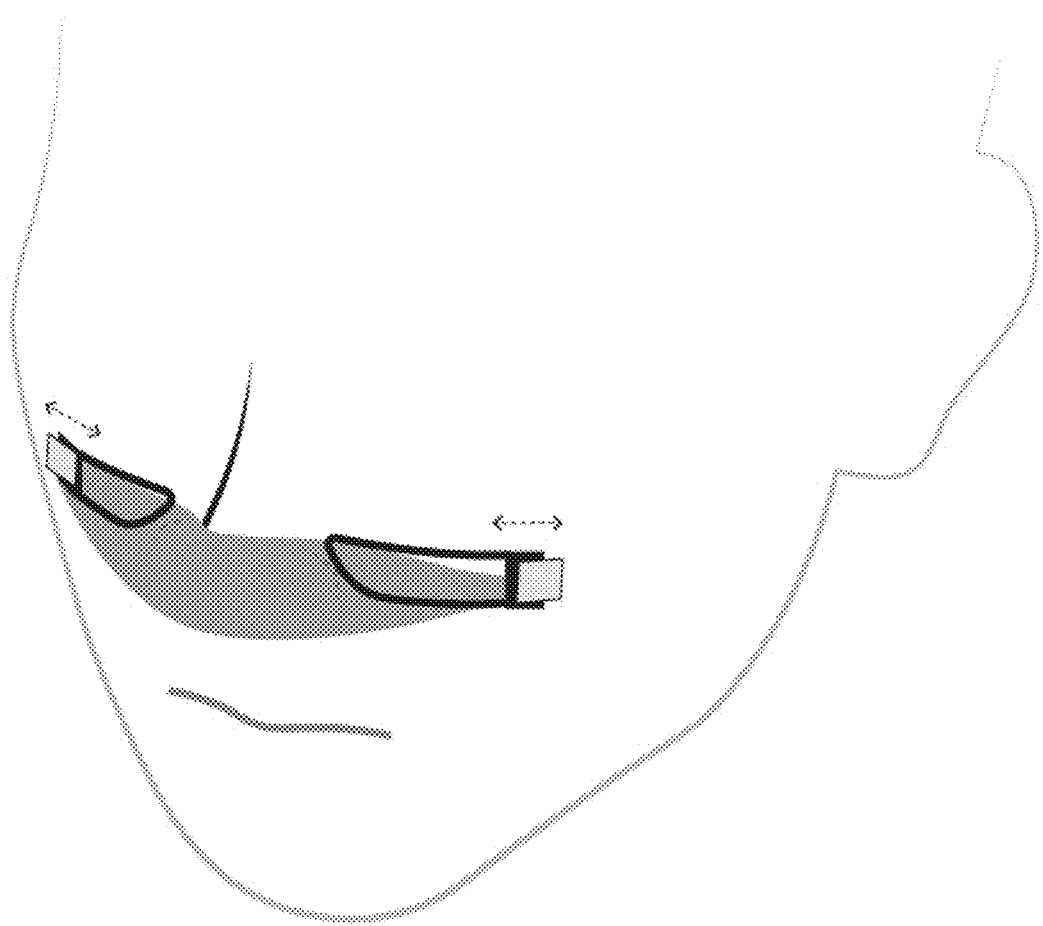

[FIG. 60]
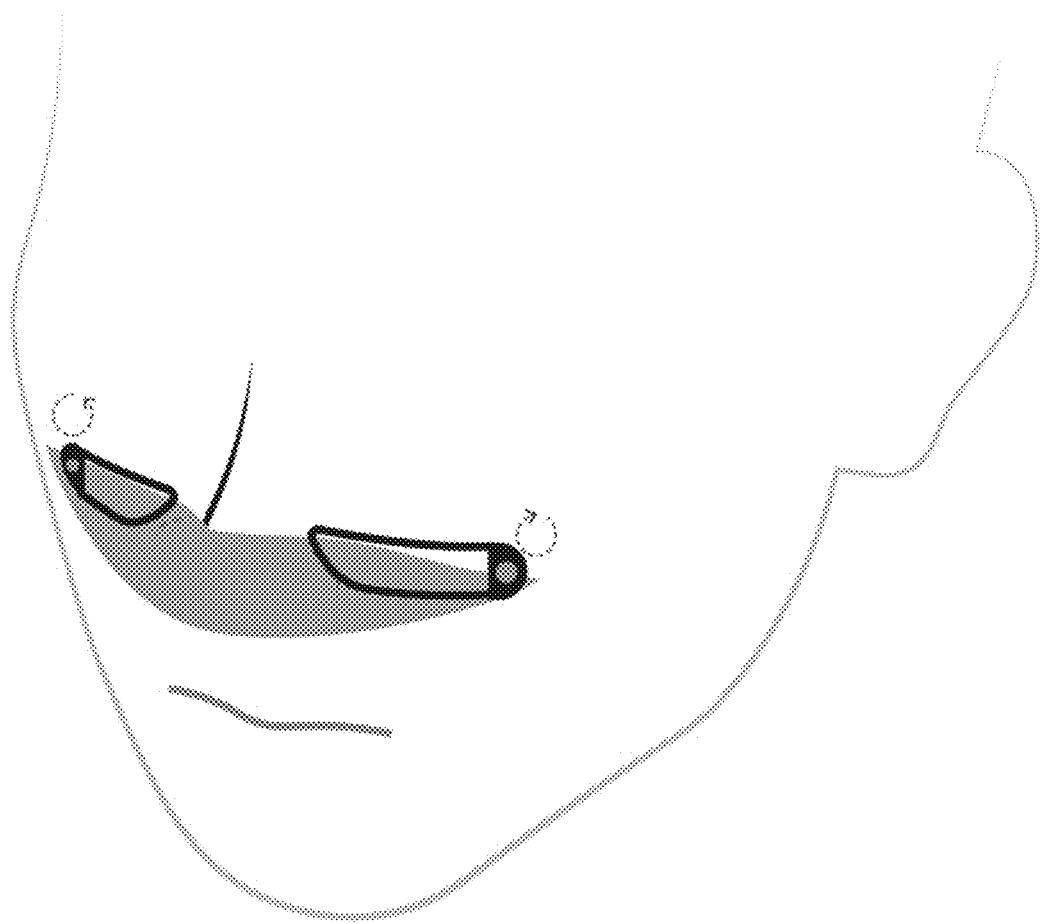

[FIG. 61]
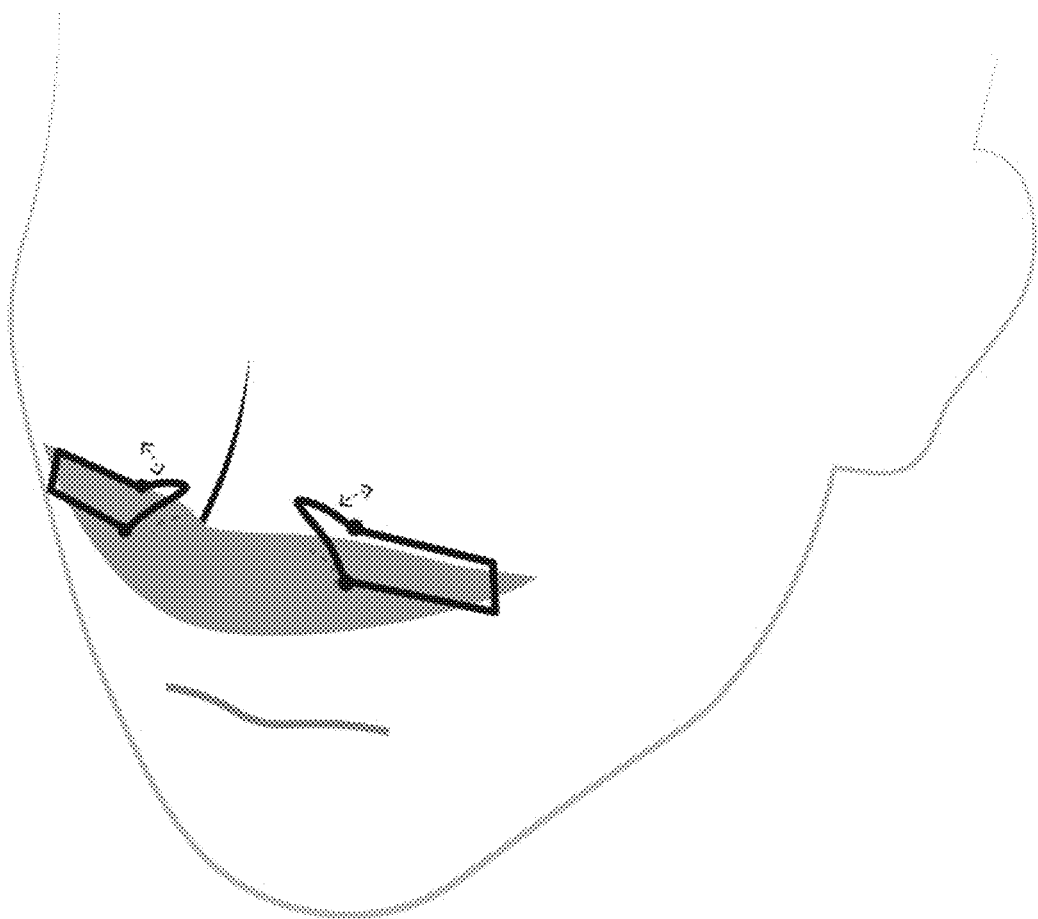

[FIG. 62]
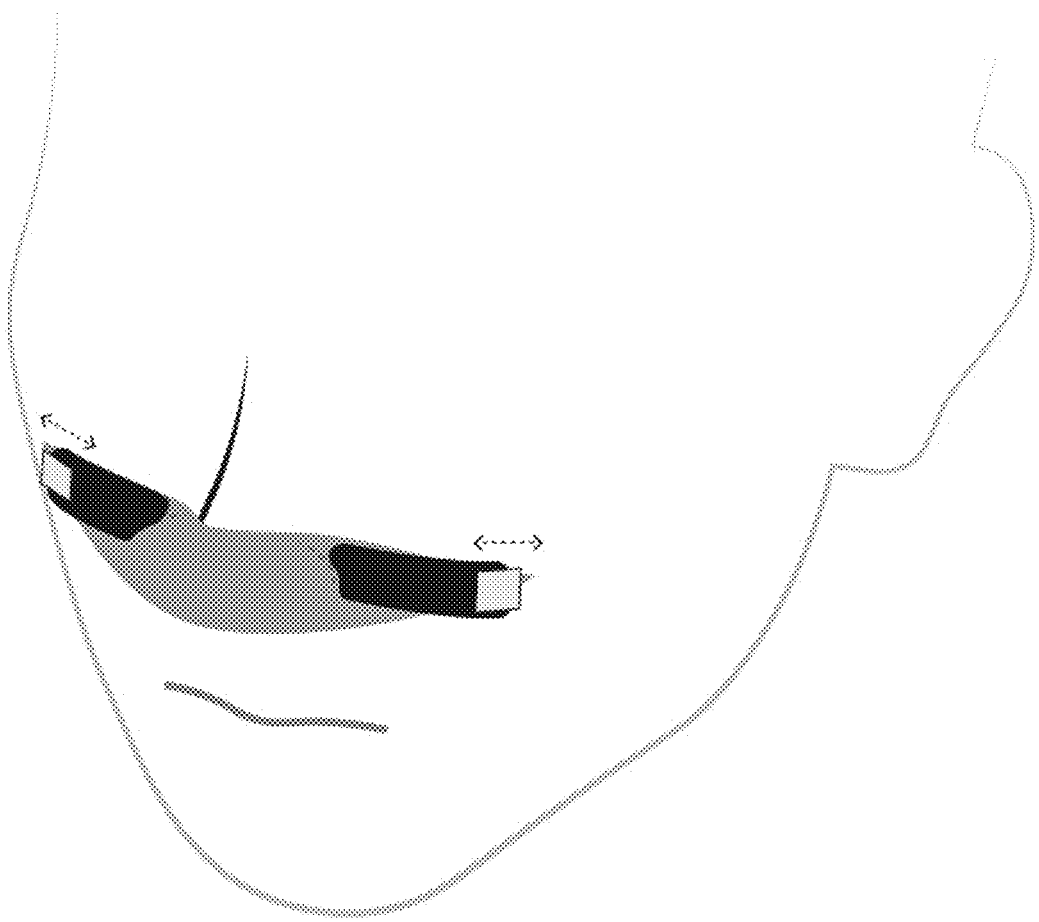

[FIG. 63]
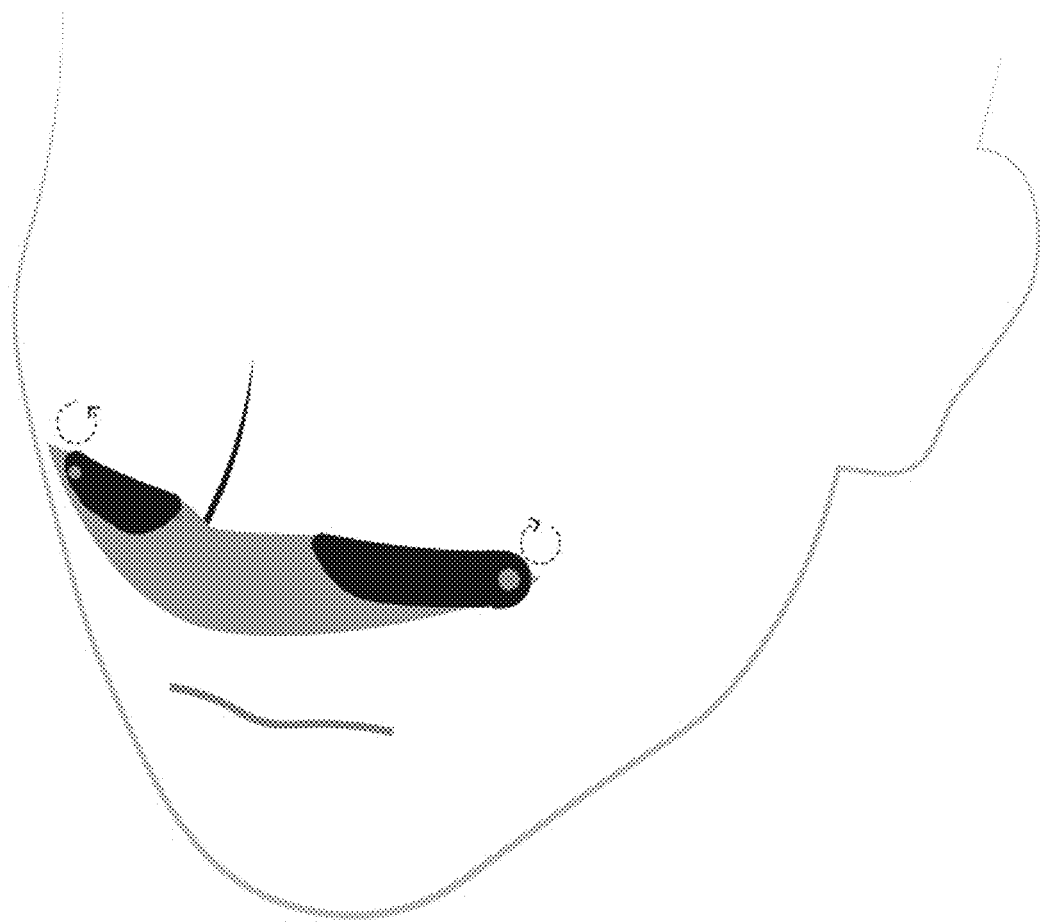

[FIG. 64]
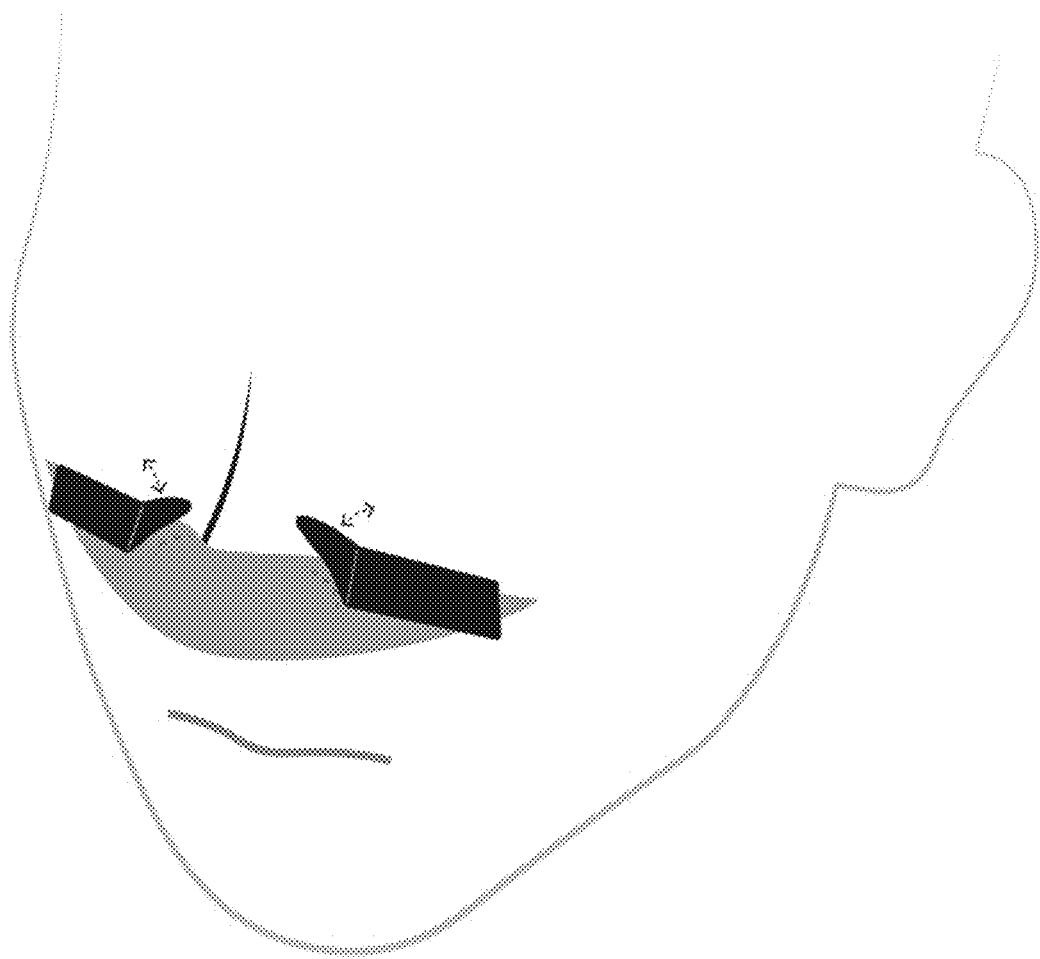

[FIG. 65]
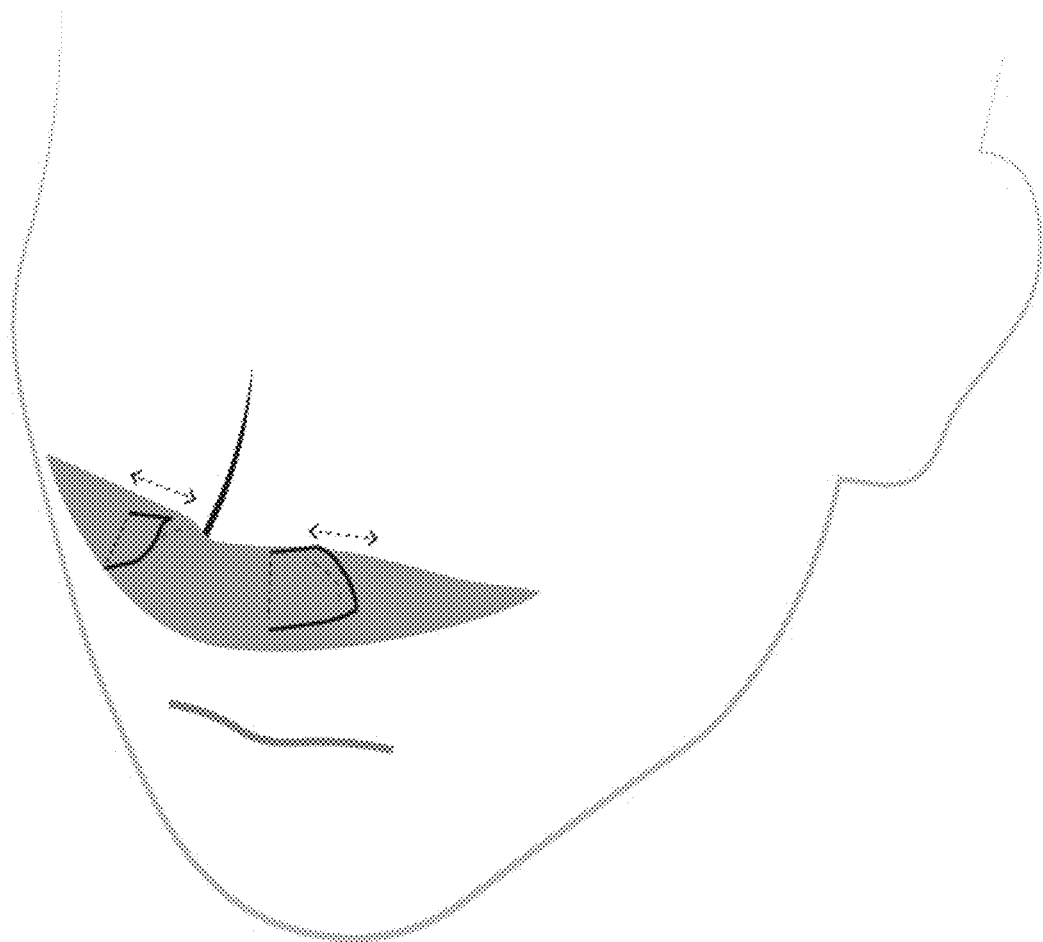

[FIG. 66]
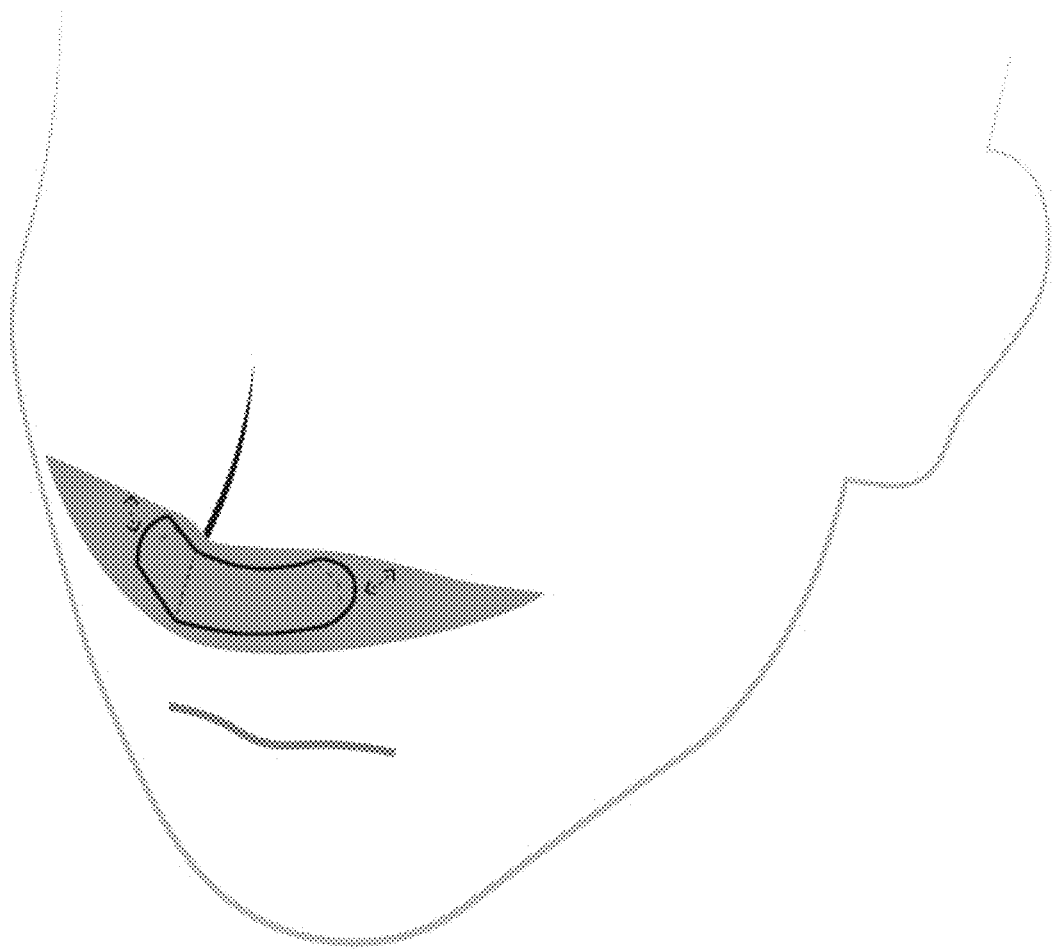

[FIG. 67]
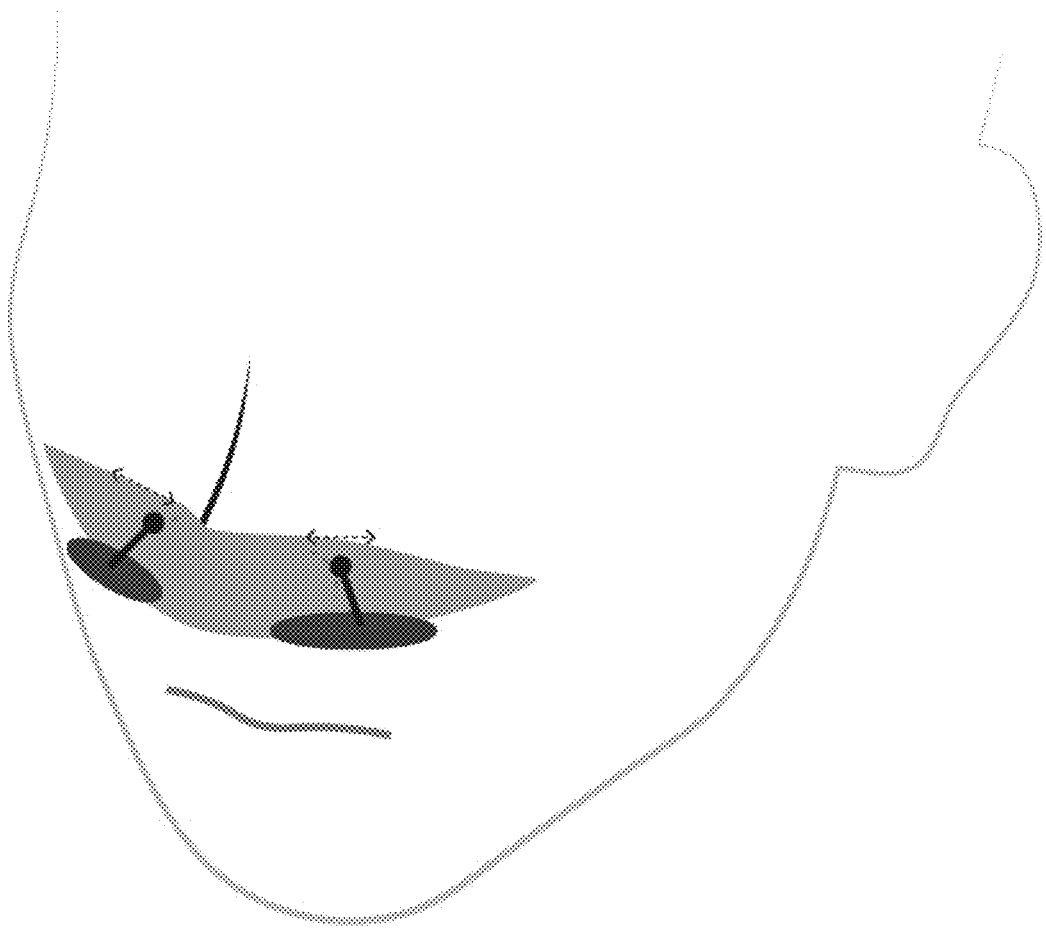

[FIG. 68]
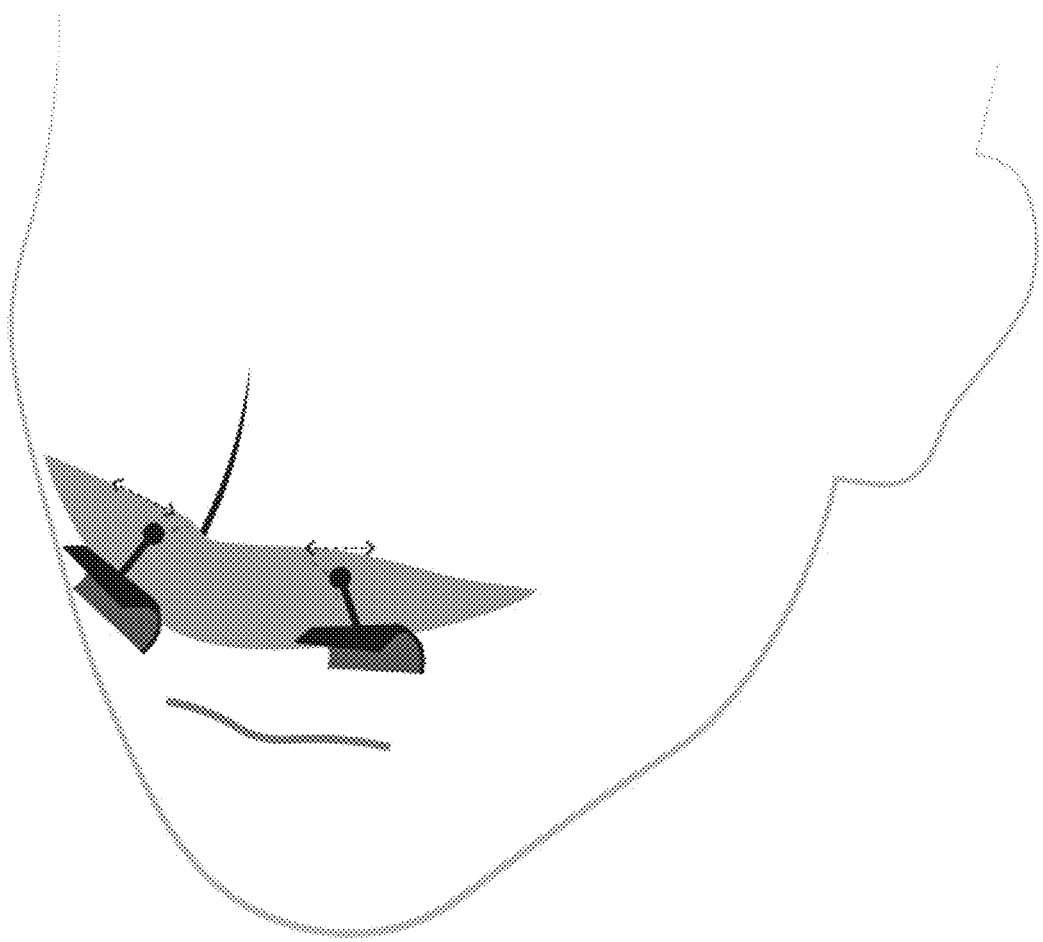

[FIG. 69]
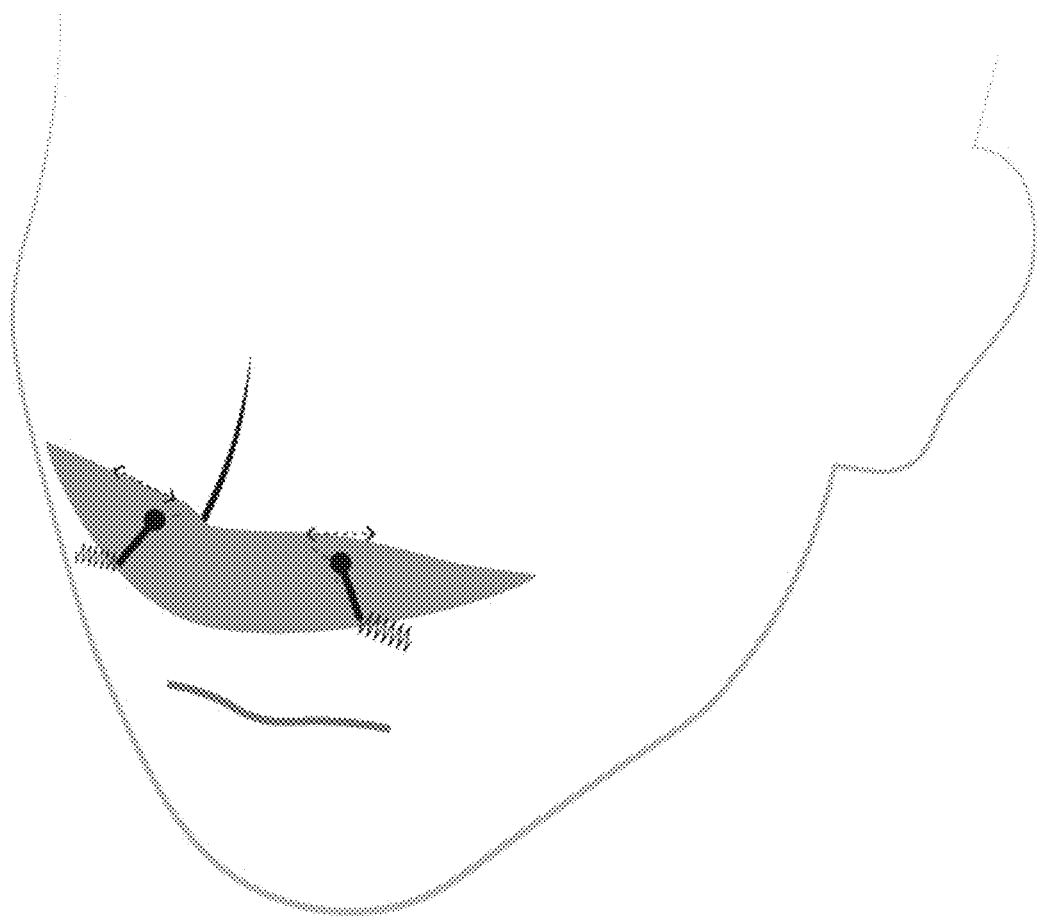

[FIG. 70]

[FIG. 71]

[FIG. 72]

[FIG. 73]
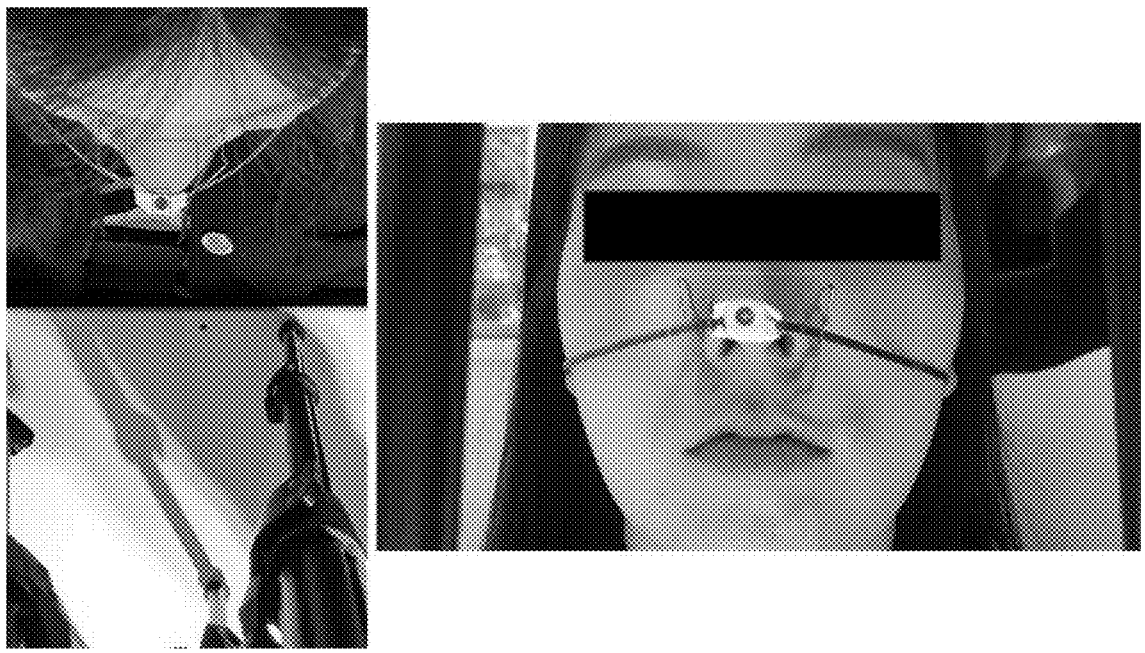

[FIG. 74]
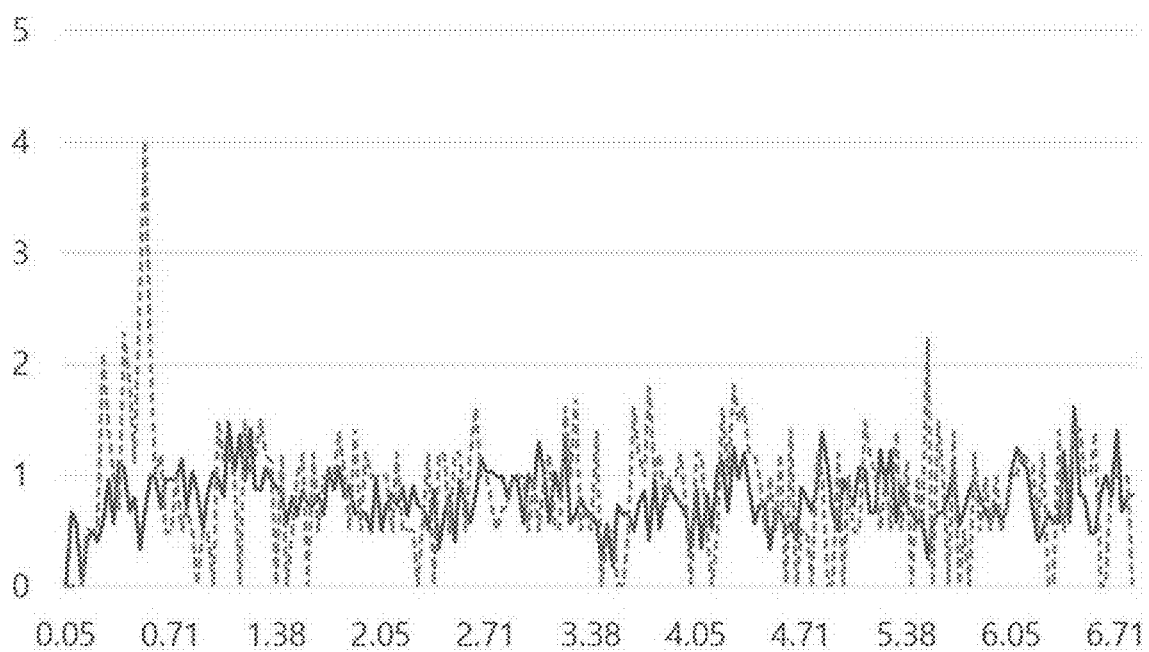

NOSE-FITTING ADJUSTER

TECHNICAL FIELD

This application is the National Phase of PCT International Application No. PCT/KR2020/018968, filed on Dec. 23, 2020, which claims priority under 35 U.S.C. 119(a) to U.S. patent application Ser. No. 10-2020-0010696, filed in the Republic of Korea on Jan. 29, 2020 and U.S. patent application Ser. No. 10-2020-0159634, filed in the Republic of Korea on Nov. 25, 2020, all of which are hereby expressly incorporated by reference into the present application.

The present invention relates to a nose-fitting adjuster. More particularly, the present invention relates to a nose-fitting adjuster, as an apparatus including a portion configured to be brought into tight contact with a nose region, such as a mask, goggles, a gas mask, or a VR headset, wherein the nose-fitting adjuster is configured to seal a nose and a peripheral portion thereof without directly and strongly pressing the nose and the peripheral portion thereof.

BACKGROUND ART

According to WHO standards, fine dust and ultra-fine dust mean particulate matter having a particle diameter of 2.5 μm and 1.0 μm, respectively. In order to block such fine dust, it is necessary to accurately wear a mask satisfying the standards.

A problem in that a mask is separated from a face without accurately being brought into tight contact with the face commonly arises from goggles, a gas mask, and a VR headset, including the mask. A nose and a peripheral portion thereof are further bent than other parts of the face, the skin at the nose and the peripheral portion thereof is thin, whereby almost no buffering action is performed, and the heights of the nose and the peripheral portion are large, whereby it is difficult for the mask to be accurately brought into tight contact with the face. In addition, when a user breathes or speaks, leakage more easily occurs from the nose and the peripheral portion thereof due to motion of facial muscles.

In order to solve the above problem, a deformable elastic member is inserted into the portion of the mask corresponding to the nose and the peripheral portion thereof or is attached to the surface of the portion of the mask. However, the mask is still accurately brought into tight contact with the face. Even though a metal, such as a wire, used for most masks is deformed such that the mask is temporarily brought into tight contact with the face, a gap is formed therebetween due to motion of facial muscles, since the mask has no supporting region. This problem is very simple and seems to have already been solved. In fact, however, this problem has remained unsolved for a long time.

Motion of facial muscles due to conversation causes motion of the mask. When the mask must be worn for a long time due to COVID-19, the skin is injured due to friction between the ridge of the nose and the mask. In order to prevent injury to the skin due to such frequent friction, medical staff, such as nurses, attach band-aids or plasters to the ridges of their noses and then wear masks thereon.

For a gas mask, an elastic sealing portion made of silicone strongly presses the nose and the peripheral portion thereof through a band configured to be disposed at the back of a head, whereby tight contact between the gas mask and the face is enhanced. However, force applied to the nose and the peripheral portion thereof is strong, whereby long-term wearing is difficult. In addition, a mask mark is left on the face, whereby women avoid wearing of gas masks, which is a problem to be solved.

The mask and the gas mask are apparatuses that blocks the flow of air, whereas blocking the flow of air and blocking the light are simultaneously required for a VR headset. If the nose and the peripheral portion thereof are not sealed when the VR headset is worn, concentration is lowered due to exposure to the light. All products released so far do not seriously consider such a problem and present incomplete technology of strongly pressing the face, like the gas mask, as a solution thereto.

Patent Document 1 relates to an inexpensive mask configured to prevent leakage of breathing gas, to select an optimum porous filter portion, to solve shortness of breath, and to provide a glasses spillage preventing function. The mask includes a fixing frame portion having excellent tight contact with the skin, a filter portion configured to be freely attached to and detached from the fixing frame, and a mounting portion configured to be fixed to the face, wherein the respective portions are made of different materials and have different functions. The part of the fixing frame portion that contacts the skin is provided with a notch, whereby the contact area of the fixing frame portion is increased by tensile force of the mounting portion, and a shape memory resin configured to contract due to the temperature of the skin or a skin adhesive resin is used as the material thereof. The upper side of the contact part is formed of an elastic resin configured to expand and contract in response to deformation of facial muscles and a skeleton due to conversation or change in facial expression. The filter portion may be separated from the fixing frame portion, and a mask capable of selecting a necessary material according to purpose is provided.

Patent Document 2 relates to a mask including a nose sealing portion, wherein breathing gas is supplied under a positive pressure, the mask has an improved nose sealing portion capable of covering at least one of a nose and a mouth of a user, and the mask is provided with a first paddle and a second paddle.

Patent Document 3 relates to a mask having a nose pad attached thereto, wherein the mask includes a mask main body, a nose pad, and inner layer wrinkles, the mask main body includes an outer layer surface, an intermediate layer surface, and an inner layer surface, the nose pad is disposed at the outer layer surface, the inner layer wrinkles extend and are folded in the inner layer surface, the inner layer wrinkles and the outer layer surface simultaneously cover the nose pad, and a protrusion corresponding to the nose pad is formed on the mask main body.

Patent Document 4 relates to a tight contact mask having an elastic band, wherein a secondary tight contact portion having elasticity and flexibility is formed along an edge of a mask main body, the mask main body is provided at an inner upper part thereof with a nose pad configured to be brought into tight contact with the ridge of a nose from above while wrapping the ridge of the nose, lateral lower films extend downwards from opposite sides of the nose pad in the form of a closed curve so as to wrap the vicinities of the nose and a mouth, a primary tight contact portion made of an elastic and flexible material so as to be brought into tight contact with the skin is provided at an edge of each of the lateral lower films, and a separate elastic band having elasticity is provided at a position above one side of the secondary tight contact portion, whereby the force of tight contact of the nose pad 40 with the ridge of the nose is increased, and therefore it is possible to prevent upward outflow of internal air.

Patent Document 5 relates to a mask, wherein a cover is provided at an inner upper part thereof with a receiving recess configured to receive the ridge of a nose as the result of the ridge of the nose being introduced thereinto, and a sealing means is provided with protrusions configured to be inserted into spaces defined between the ridge of the nose and opposite cheekbones under eyes of a face at opposite sides of the receiving recess so as to be brought into tight contact with a skin.

Patent Document 6 relates to a mask capable of preventing gas from being introduced into the mask without being filtered through a filter sheet, wherein the mask includes a nose clip and/or a nose pad.

Patent Document 7 relates to a dust mask configured to prevent introduction of fine dust into a respiratory system, wherein the dust mask includes an upper cover unit having nose support portions formed at upper and lower end inner surfaces and a lower cover unit provided with a jaw support portion having an air discharge portion formed therein, whereby, when a user wears the mask, the nose support portions formed at the upper cover unit are brought into tight contact with a nose without separate manipulation, and therefore it is possible to easily wear the mask.

Patent Document 8 relates to an environmentally friendly traditional Korean paper mask, the mask including a mask main body 100 formed so as to correspond to the curvature of a face in order to shield a mouth and a nose and fixing strings 200 formed at opposite sides of the mask main body 100 so as to be held at ears, wherein the inherent function of the Korean paper is provided, fine dust, contaminants, and various harmful bacteria are effectively filtered through adsorption, breathability, warmth, quick drying, and antibiosis of the mask are excellent, whereby a comfortable state is maintained for a long time, and in particular the mask is less harmful to the human body, and therefore children or the elderly and weak can use the mask in a relaxed state.

As described above, Patent Documents 1 to 8 disclose various means for tight contact between the mask and the nose including the peripheral portion thereof.

However, the conventional art has problems in that 1) the degree of tight contact is low even though the tight contact is temporarily achieved in the state in which the mask is worn, 2) the mask is disposed on the facial region in which the muscles of the user are inevitably moved, whereby the degree of tight contact is easily lowered due to motion of the facial muscles and the skin is injured due to frequent friction between the mask and the skin, such as the ridge of the nose, 3) the degree of tight contact is not lowered even due to vibration when the user moves in a state of wearing the mask or the VR headset without motion of the facial muscles, 4) the tight contact region, such as the nose pad, is configured to strongly press the nose region, whereby makeup of female users is removed, and therefore the female users avoid wearing of the masks, 5) for some gas masks, it is not possible to adjust the degree of pressure, and therefore only strong pressing is possible, and 6) the degree of tight contact is changed depending on the degree of skill of users, and therefore incomplete tight contact is achieved for users who are not accustomed to adjustment of an apparatus or a mechanism, such as the elderly and weak or children.

Japanese Patent Application Publication No. 2011-000430 ("Patent Document 1")

Japanese Patent Application Publication No. 2019-030698 ("Patent Document 2")

Japanese Registered Patent Publication No. 3222972 ("Patent Document 3")

Japanese Registered Patent Publication No. 5011294 ("Patent Document 4")

Korean Registered Patent Publication No. 10-2012157 ("Patent Document 5")

Korean Patent Application Publication No. 2011-0009652 ("Patent Document 6")

Korean Patent Application Publication No. 2017-0000048 ("Patent Document 7")

Korean Patent Application Publication No. 2017-0072094 ("Patent Document 8")

Korean Patent Application Publication No. 2019-0032897 ("Patent Document 9")

DISCLOSURE

Technical Problem

The present invention has been made in view of the above problems, and it is an object of the present invention to provide a nose-fitting adjuster configured such that 1) the degree of tight contact is high, 2) tight contact is continuously maintained and friction with a face is minimized even when facial muscles are moved, 3) the degree of tight contact is not lowered due to vibration generated when a user moves in a state of wearing a mask, 4) the region that is pressed for tight contact is minimized, 5) the degree of pressure is easily adjusted depending on the height of a nose of the user, and 6) a predetermined level of tight contact can be provided to users who are not accustomed to adjustment of an apparatus or a mechanism, such as the elderly and weak or children, whereby it is possible to seal the nose and a peripheral portion thereof.

Technical Solution

In order to accomplish the above object, the present invention provides a nose-fitting adjuster including a cover unit configured to cover at least a part of a nasal cartilage of a user (including lateral nasal cartilage, major alar cartilage, and minor alar cartilages in FIG. 1) and a peripheral portion thereof and at least one of a first fixing unit to a third fixing unit, wherein 1) the first fixing unit is configured to press a first pressing portion, which is at least a part of a nasolabial fold of the user, at an outer surface of the cover unit such that the cover unit is brought into tight contact with a skin of the user, 2) the second fixing unit is configured to press a second pressing portion, which is at least a part of levator labii superioris muscle (see FIGS. 2 and 3) or a levator labii superioris alaeque nasi muscle (see FIG. 2) of the user, at the outer surface of the cover unit such that the cover unit is brought into tight contact with the skin of the user, and 3) the third fixing unit is configured to press a third pressing portion, which is at least a part of an outer circumferential portion of an alar crease of the user, at the outer surface of the cover unit such that the cover unit is brought into tight contact with the skin of the user.

The nose-fitting adjuster according to the present invention may further include an additional fixing unit configured to press at least a part of the nasal cartilage of the user at the outer surface of the cover unit, wherein the degree of pressure applied by the fixing unit may be higher than the degree of pressure applied by the additional fixing unit.

A region pressed by the fixing unit or the additional fixing unit may be formed in the shape of at least one of a dot, a line, and a surface, and at least one region may be pressed by the fixing unit or the additional fixing unit.

Specifically, a region pressed by the additional fixing unit may be formed in the shape of micro-protrusions.

The fixing unit or the additional fixing unit may be formed in the shape of at least one of a dot, a line, a surface, and a solid.

The fixing unit may press an additional pressing portion at the outer surface of the cover unit, in addition to the first pressing portion to the third pressing portion, and the additional pressing portion may be formed in the shape of at least one of a dot, a line, and a surface. The additional pressing portion may be formed at any region at which the cover unit may be disposed, excluding the first pressing portion to the third pressing portion, and a plurality of additional pressing portions may be selected.

The direction in which the fixing unit and the additional fixing unit presses the cover unit at the outer surface of the cover unit may be the direction perpendicular to the skin of the user, the extension direction of wrinkles formed at a face of the user, the direction perpendicular to the wrinkles formed at the face of the user, the direction along an outer periphery of a nose of the user, the inward or outward direction of the outer periphery of the nose of the user, the extension direction of muscles around the nose of the user, or a composite combination of the directions.

The maximum range within which the cover unit is capable of being disposed may be from above tip-defining points to a lower end of a nasal bone as an upward-downward range and may be between opposite cheekbones of the face of the user as a leftward-rightward range.

When the cover unit is brought into tight contact with the skin by at least one of the first fixing unit to the third fixing unit, 1) the relative position of the cover unit pressed by the fixing unit may be fixed and the cover unit may be stretched, whereby the cover unit may be brought into tight contact with the skin, 2) the relative position of the cover unit pressed by the fixing unit may not be fixed and the cover unit may be deformed along the external shape of a nose, whereby the cover unit may be brought into tight contact with the skin, or 3) the relative position of the cover unit pressed by the fixing unit may not be fixed and the cover unit may be stretched, whereby the cover unit may be brought into tight contact with the skin.

The fixing unit and/or the additional fixing unit may be fixed by a separate support unit provided outside the cover unit. At least one region of the fixing unit and/or the additional fixing unit fixed by the support unit may be formed in the shape of at least one of a dot, a line, and a surface. In addition, the fixing unit and/or the additional fixing unit may be configured to perform motion including rotation, movement, and twisting while being fixed by the support unit.

As a concrete shape, the region of the fixing unit and/or the additional fixing unit that presses the cover unit and the region of the fixing unit and/or the additional fixing unit fixed by the support unit may be connected to each other via an elastic material that may have a bent portion.

Each of the cover unit and the support unit may be made of an elastic material or an inelastic material.

The nose-fitting adjuster according to the present invention is not limited to only a mask, and is applicable to any apparatus configured to be worn on the front of the face, such as a conventional mask, goggles, a gas mask, or a VR headset.

The present invention may provide arbitrary combinations of the above solving means.

DESCRIPTION OF DRAWINGS

FIGS. 1 to 3 are anatomical schematic views showing a face on which a fixing unit of a nose-fitting adjuster according to the present invention may be disposed.

FIGS. 4 to 69 are views showing various examples of the nose-fitting adjuster according to the present invention.

FIGS. 70 to 72 are photographs showing that a first fixing unit to a third fixing unit according to the present invention, which are capable of being brought into tight contact with a face of a user in the state in which a fitting function of a conventional mask (KF94) is not used, are manufactured in the shape of a metal clip and are then worn in order to measure an official leakage rate based on the nose-fitting adjuster according to the present invention.

FIG. 73 is a photograph showing that an elastic member configured to be fixed to only left and right parts of a face of a user in order to check displacement depending on whether the nose-fitting adjuster according to the present invention is provided and then the elastic member is worn in order to track change in position of the elastic member at a peripheral portion of a nose using a motion sensor.

FIG. 74 is a view showing results of observation of positional displacement.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described in more detail with reference to embodiments. However, the embodiments are provided merely to illustratively describe the present invention, and therefore the scope of the present invention is not limited by the embodiments.

A nose-fitting adjuster according to the present invention is an apparatus configured to seal a nose and a peripheral portion thereof. For a mask, goggles, a gas mask, or a VR headset, it is not possible to completely seal the nose and the peripheral portion thereof, and therefore improvement thereon is necessary.

A cover unit according to the present invention covers at least a part of a nasal cartilage of a user (including lateral nasal cartilage, major alar cartilage, and minor alar cartilages in FIG. 1) and a peripheral portion thereof. The remaining surface of the cover unit excluding the portion of the cover unit that directly abuts a face may be coupled to a face attachment apparatus, such as a mask, goggles, a gas mask, or a VR headset, or may be coupled to a support unit.

FIG. 4 shows a mask to which the nose-fitting adjuster according to the present invention is added by way of example. The cover unit 10 according to FIG. 4 is indicated in light gray. Dark gray indicates the portion of the cover unit 10 that is exposed outside, and light gray indicates the portion that is hidden by a main body of the mask and thus is not visible. At least a part of a lower-end bent line of the cover unit 10, excluding an upper-end bent line abutting a face, is coupled to the mask.

In FIG. 4, a black solid line that entirely surrounds a periphery of the face indicates the outermost contour of the mask. The cover unit of FIG. 4 may be elastic cloth. The cover unit is configured such that the at least a part of the lower-end bent line, excluding the upper-end bent line abutting the face, is coupled to the mask. The cover unit presses a region including an outer circumferential portion of alar creases (indicated by a vertical hatch line) from the outside of the cover unit such that the cover unit is brought into tight contact with the skin. In the case of FIG. 4, the outer circumferential portions of opposite alar creases of the nose are pressed, whereby the cover unit may be stretched or deformed and may then be brought into tight contact with the nose without the nasal cartilage being particularly pressed.

In FIG. 4, the apparatus attached to the face is the mask, and therefore the cover unit becomes an upper-end interface, and a lower interface becomes the main body of the mask. When the nose-fitting adjuster according to the present invention is applied to an apparatus that is attached to regions around eyes, such as a VR headset, the cover unit may form a lower-end interface.

FIGS. 5 to 28 show in detail that a region pressed by a fixing unit 20 is formed in the shape of dots or a line.

FIGS. 5 to 16 schematize only the cover unit and the fixing unit configured to fix the same. The portion indicated by gray is an illustration of the cover unit according to the present invention. The cover unit may cover the alar creases and peripheral portions thereof (FIGS. 5 to 7 and 11 to 13), or may cover an upper end part of cartilage and a peripheral portion thereof (FIGS. 8 to 10 and 14 to 16).

In FIGS. 5 to 16, black dots indicate the portion of the fixing unit 20 that presses the cover unit 10 toward the face of the user at the outer surface of the cover unit 10. Dotted circles indicate the portions of the fixing unit 20 that are fixed to the support unit. A black line or a curved line at the center thereof and a hatch line at the peripheral portion thereof indicate that the pressing portion is formed in the shape of a line. FIG. 4 also shows that the pressing portion is formed in the shape of a line. The positions of the black dots that press the cover unit 10 may be changed due to elasticity thereof.

The fixing unit 20 presented by way of example in FIGS. 5 to 16 is formed in the shape of an elastic spring, wherein one end of the fixing unit 20 is fixed to the support unit, and the other end of the fixing unit 20 presses the cover unit 10 toward the face of the user at the outer surface of the cover unit 10. A straight line (FIGS. 5, 6, 8, 9, 12, and 160 or a bent portion (FIGS. 7, 10, 11, 13, and 14) is formed between the region at which the fixing unit 20 presses the cover unit 10 and the region at which the fixing unit 20 is fixed by the support unit. A singe bent portion may be provided, or several bent portions (FIGS. 11 and 13) may be provided.

The shape having the straight line or the bent portion may be changed in design depending on the direction in which the fixing unit applies pressure. The direction in which the fixing unit presses the cover unit at the outer surface of the cover unit may be the direction perpendicular to the skin of the user (FIGS. 5, 6, 8, and 11), the extension direction of wrinkles formed at the face of the user, the direction perpendicular to the wrinkles formed at the face of the user (FIG. 11), the direction along the outer periphery of the nose of the user (FIG. 12), the inward or outward direction of the outer periphery of the nose of the user (FIGS. 6, 7, and 13), the extension direction of muscles around the nose of the user (FIGS. 9 and 14), or a composite combination of the above directions (FIGS. 10 and 15).

Meanwhile, the relative position of the cover unit that is pressed by the fixing unit may or may not be fixed. In FIGS. 5 to 16, in connection with the relative position of the cover unit that is pressed by the fixing unit, the positions of the black dots of the portion that is pressed by the fixing unit may be changed by elasticity of the fixing unit.

In FIGS. 5 to 7 and 11 to 13, the fixing unit corresponds to a first fixing unit, a second fixing unit, or a third fixing unit, and in FIGS. 8 to 10 and 14 to 16, the fixing unit corresponds to the second fixing unit. In FIGS. 5 to 16, the fixing unit is disposed in symmetry with respect to the nose. In an illustration of FIGS. 5 to 16, one fixing unit is configured such that one pressing region is formed in the shape of a dot. However, one fixing unit may be fixed to the support unit at one region (FIGS. 5 to 12, 14, and 15) or two regions (FIGS. 13 and 16).

In FIGS. 17 to 22, a connection unit configured to connect the fixing unit disposed in symmetry with respect to the nose is added, in addition to the construction of FIGS. 5 to 16. Even in the construction of FIGS. 17 to 19, however, the central part of the elastic spring does not still directly press the nose. In this case, the spring that forms the fixing unit is constituted as a single body.

FIGS. 23 to 28 show various embodiments in which, in the construction of FIGS. 5 to 16, two or more regions are fixed to the support unit and two or more bent portions are provided. This structure may be changed in design depending on the shape of the apparatus that is attached to the face or the region to be pressed. Various shapes of FIGS. 23 to 28 may be configured by deforming a single body.

This shape may also be deformed depending on the position of the support unit. When the support unit is formed near the face, the fixing unit is disposed along the face. When the support unit is formed spaced apart from the face, the fixing unit is configured so as to be spaced apart from the face. In this way, the spring-shaped elastic member may be variously deformed using three axes, i.e. x, y, and z axes.

FIGS. 29 to 37 show in detail that the region that is pressed by the fixing unit is formed in the shape of a surface.

In FIGS. 29 to 37, a diagram filled with a black color indicates that the portion of the fixing unit that presses the cover unit at the outer surface of the cover unit is formed in the shape of a surface. FIGS. 29 to 31 show that two fixing units, to which the cartilage is not connected, are disposed in a symmetrical fashion, and FIGS. 32 to 34 show that an intermediate unit is connected. FIGS. 35 to 37 show that the pressing portion includes a dot, a line, and a surface. Even in this case, the fixing unit may be integrally formed using an elastic material, such as an elastic metal.

FIGS. 38 to 55 show the case in which the portion that is pressed by the fixing unit 20 or an additional fixing unit 21 is formed in the shape of a surface and the fixing unit 20 or the additional fixing unit 21 is three-dimensional. In FIGS. 38 to 55, the black surface indicates the side surface of the fixing unit 20 when the lower part of the face of the user is viewed from above the upper part of the face of the user. Gray at the peripheral portion of the nasal cartilage indicates the additional fixing unit 21, wherein the additional fixing unit 21 is also three-dimensional. The fixing unit 20 defined in FIGS. 38 to 55 is an elastic solid made of foam, which may be constituted by a single body or several bodies. The portion of the fixing unit 20 that presses the cover unit 10 is a surface, and the portion of the fixing unit 20 that is fixed to the support unit is also a surface.

FIGS. 56 to 58 show other three-dimensional shapes of the fixing unit, wherein the fixing unit is made of an elastic material, such as foam or silicone, and the region of the fixing unit that applies pressure is formed in the shape of a surface or micro-protrusions. The region of the fixing unit that is fixed to the support unit is formed in the shape of a surface, and FIGS. 56 to 58 show various shapes capable of dispersing pressure applied to the face of the user as illustrations.

FIGS. 59 to 69 show various illustrations in which the fixing unit and/or the additional fixing unit is capable of performing motion, including rotation, movement, and twisting, while being fixed to the support unit. Various mechanical motions, such as sliding, rotation, and hinged folding, may be applied as unrestricted examples of the concrete motion of the fixing unit.

FIGS. 67 to 69 are illustrations in which an object, the shape of which is changeable, such as foam, an air cap, silicone, or a spring, is fixed to the support unit, and the fixing unit is connected, whereby non-mechanical motion is applied thereto.

Examples

FIGS. 70 to 72 are photographs showing that a first fixing unit to a third fixing unit according to the present invention, which are capable of being brought into tight contact with the face of the user in the state in which a fitting function of a conventional mask (KF94) is not used, are manufactured in the shape of a metal clip and are then worn in order to measure an official leakage rate based on the nose-fitting adjuster according to the present invention.

An official leakage rate when the clips according to FIGS. 70 to 72, i.e. the third fixing unit (Example 1), the second fixing unit (Example 2), and the first fixing unit (Example 3) according to the present invention, were brought into tight contact with the face of the user was measured.

Comparative Examples

A disposable KF94 mask, which is a conventional mask, was used as Comparative Examples. The mask is configured such that iron capable of being deformed in order to seal the peripheral portion of the nose is inserted into the portion of the mask corresponding to the peripheral portion of the nose. An official leakage rate was measured using the mask. In Comparative Examples 1, 2, and 3, the leakage rate was measure using the conventional KF94 mask at the position at which the leakage rate was measured in Examples 1, 2, and 3.

<Measurement of Official Leakage Rate>

The leakage rate was measured according to a leakage rate test method stated in "guidelines on standards of health masks (civil service guideline)" guideline-0349-04 of the National Institute of Food and Drug Safety Evaluation in Korea. The leakage rate results of according to the present invention are leakage rate results obtained by performing tests after a test apparatus and method were certified by the National Institute of Food and Drug Safety Evaluation in Korea.

In the result values in the table below related to the leakage rate, a first behavior to a fifth behavior correspond respectively to (A) walking for two minutes without moving the head or speaking, (B) moving the head from side to side 15 times for about two minutes as if investigating the wall of a tunnel, (C) moving the head up and down 15 times for about two minutes as if investigating the roof and the floor, (D) speaking out loud Korean text for two minutes, and (E) walking for two minutes without moving the head or speaking, stated in "guidelines on standards of health masks (civil service guideline)" guideline-0349-04.

For each behavior, a test was performed for about two minutes, tests were performed a total of five times, and the average was obtained.

<Comparison in Official Leakage Rate Results>

Tables 1, 3, and 5 show official leakage rates when the third fixing unit (Example 1), the second fixing unit (Example 2), and the first fixing unit (Example 3) according to the present invention were brought into tight contact with the face of the user, and Tables 2 and 4 show official leakage rate results in Comparative Example 1 and Comparative Example 2. In Comparative Example 3, tight contact was impossible, and therefore it was not possible to measure the leakage rate. When the leakage rate was measured by force, a value of 40% or more was measured, and therefore a substantially meaningful value was not derived.

Table 6 shows official leakage rate results of Example 4 when the same experiment was performed in the state in which the nose-fitting adjuster according to the present invention was disposed only on the nasal cartilage without pressing the regions of Examples 1, 2, and 3.

TABLE 1

| Tester | Koreatech |
|---|---|
| Test date | Oct. 28, 2020 |
| Mask wearer | Joony |
| Mask manufacturer | Sample 2 |
| Mask model name | NFA_Medium |
| Mask serial number | 002 |
| Test round | 2 |
| Mask leakage rate judgment criterion (%) | 11 |
| Mask leakage rate (%) | 2.05 |
| Correction value before mask measurement (V) | 0.0000024329 |
| Correction value before mask measurement (mg/m$^2$) | 0.00 |
| In-chamber measurement value (V) | 0.0072946996 |
| In-chamber measurement value (mg/m$^2$) | 11.46 |
| In-chamber measurement value after test (V) | 0.0052187303 |
| In-chamber measurement value after test (mg/m$^2$) | 8.19 |
| In-mask measurement value (V) | 0.000 |
| In-mask measurement value (mg/m$^2$) | 0.09 |
| Inspiratory time (1 second) | 253 |
| Expiratory time (1 second) | 347 |
| Zero offset (V) | 0 |
| Average leakage rate during first behavior (%) | 2.462 (pass) |
| Average leakage rate during second behavior (%) | 2.061 (pass) |

TABLE 1-continued

| | |
|---|---|
| Average leakage rate during third behavior (%) | 1.244 (pass) |
| Average leakage rate during fourth behavior (%) | 1.723 (pass) |
| Average leakage rate during fifth behavior (%) | 2.682 (pass) |

TABLE 2

| | |
|---|---|
| Tester | Koreatech |
| Test date | Oct. 28, 2020 |
| Mask wearer | Joony |
| Mask manufacturer | Sample 2 |
| Mask model name | Noseclip Medium |
| Mask serial number | 002 |
| Test round | 4 |
| Mask leakage rate judgment criterion (%) | 11 |
| Mask leakage rate (%) | 4.12 |
| Correction value before mask measurement (V) | 0.0000040403 |
| Correction value before mask measurement (mg/m$^2$) | 0.00 |
| In-chamber measurement value (V) | 0.0067938882 |
| In-chamber measurement value (mg/m$^2$) | 10.67 |
| In-chamber measurement value after test (V) | 0.0051466752 |
| In-chamber measurement value after test (mg/m$^2$) | 8.08 |
| In-mask measurement value (V) | 0.000 |
| In-mask measurement value (mg/m$^2$) | 0.18 |
| Inspiratory time (1 second) | 246 |
| Expiratory time (1 second) | 354 |
| Zero offset (V) | 0 |
| Average leakage rate during first behavior (%) | 3.452 (pass) |
| Average leakage rate during second behavior (%) | 2.354 (pass) |
| Average leakage rate during third behavior (%) | 4.454 (pass) |
| Average leakage rate during fourth behavior (%) | 3.708 (pass) |
| Average leakage rate during fifth behavior (%) | 6.814 (pass) |

TABLE 3

| | |
|---|---|
| Tester | Koreatech |
| Test date | Oct. 28, 2020 |
| Mask wearer | Joony |
| Mask manufacturer | Sample1 |
| Mask model name | NFA_Upper |
| Mask serial number | 001 |
| Test round | 1 |
| Mask leakage rate judgment criterion (%) | 11 |
| Mask leakage rate (%) | 0.36 |
| Correction value before mask measurement (V) | 0.0000027466 |
| Correction value before mask measurement (mg/m$^2$) | 0.00 |
| In-chamber measurement value (V) | 0.0072424736 |
| In-chamber measurement value (mg/m$^2$) | 11.37 |
| In-chamber measurement value after test (V) | 0.0051501300 |
| In-chamber measurement value after test (mg/m$^2$) | 8.08 |

TABLE 3-continued

| | |
|---|---|
| In-mask measurement value (V) | 0.000 |
| In-mask measurement value (mg/m$^2$) | 0.01 |
| Inspiratory time (1 second) | 249 |
| Expiratory time (1 second) | 351 |
| Zero offset (V) | 0 |
| Average leakage rate during first behavior (%) | 0.755 |
| Average leakage rate during second behavior (%) | 0.336 (pass) |
| Average leakage rate during third behavior (%) | 0.428 (pass) |
| Average leakage rate during fourth behavior (%) | 0.130 (pass) |
| Average leakage rate during fifth behavior (%) | 0.143 (pass) |

TABLE 4

| | |
|---|---|
| Tester | Koreatech |
| Test date | Oct. 28, 2020 |
| Mask wearer | Joony |
| Mask manufacturer | Sample1 |
| Mask model name | Noseclip_Upper |
| Mask serial number | 001 |
| Test round | 4 |
| Mask leakage rate judgment criterion (%) | 11 |
| Mask leakage rate (%) | 1.57 |
| Correction value before mask measurement (V) | 0.0000022869 |
| Correction value before mask measurement (mg/m$^2$) | 0.00 |
| In-chamber measurement value (V) | 0.0068224883 |
| In-chamber measurement value (mg/m$^2$) | 10.71 |
| In-chamber measurement value after test (V) | 0.0050919662 |
| In-chamber measurement value after test (mg/m$^2$) | 7.99 |
| In-mask measurement value (V) | 0.000 |
| In-mask measurement value (mg/m$^2$) | 0.06 |
| Inspiratory time (1 second) | 238 |
| Expiratory time (1 second) | 362 |
| Zero offset (V) | 0 |
| Average leakage rate during first behavior (%) | 1.575 (pass) |
| Average leakage rate during second behavior (%) | 1.547 (pass) |
| Average leakage rate during third behavior (%) | 0.826 (pass) |
| Average leakage rate during fourth behavior (%) | 1.796 (pass) |
| Average leakage rate during fifth behavior (%) | 2.050 (pass) |

TABLE 5

| | |
|---|---|
| Tester | Koreatech |
| Test date | Oct. 28, 2020 |
| Mask wearer | Joony |
| Mask manufacturer | Sample 3 |
| Mask model name | NFA_Lower |
| Mask serial number | 003 |
| Test round | 3 |
| Mask leakage rate judgment criterion (%) | 11 |

TABLE 5-continued

| | |
|---|---|
| Mask leakage rate (%) | 2.04 |
| Correction value before mask measurement (V) | 0.0000031152 |
| Correction value before mask measurement (mg/m$^2$) | 0.00 |
| In-chamber measurement value (V) | 0.0068813179 |
| In-chamber measurement value (mg/m$^2$) | 10.81 |
| In-chamber measurement value after test (V) | 0.0051730185 |
| In-chamber measurement value after test (mg/m$^2$) | 8.12 |
| In-mask measurement value (V) | 0.000 |
| in-mask measurement value (mg/m$^2$) | 0.09 |
| Inspiratory time (1 second) | 260 |
| Expiratory time (1 second) | 340 |
| Zero offset (V) | 0 |
| Average leakage rate during first behavior (%) | 2.609 (pass) |
| Average leakage rate during second behavior (%) | 2.104 (pass) |
| Average leakage rate during third behavior (%) | 2.068 (pass) |
| Average leakage rate during fourth behavior (%) | 1.629 (pass) |
| Average leakage rate during fifth behavior (%) | 1.785 (pass) |

TABLE 6

| | |
|---|---|
| Tester | Koreatech |
| Test date | Oct. 28, 2020 |
| Mask wearer | Joony |
| Mask manufacturer | Sample5 |
| Mask model name | Modi_nasal bone |
| Mask serial number | 5 |
| Test round | 4 |
| Mask leakage rate judgment criterion (%) | 11 |
| Mask leakage rate (%) | 0.71 |
| Correction value before mask measurement (V) | 0.0000024432 |
| Correction value before mask measurement (mg/m$^2$) | 0.00 |
| In-chamber measurement value (V) | 0.0059834309 |
| In-chamber measurement value (mg/m$^2$) | 9.39 |
| In-chamber measurement value after test (V) | 0.0049673023 |
| In-chamber measurement value after test (mg/m$^2$) | 7.80 |
| In-mask measurement value (V) | 0.000 |
| In-mask measurement value (mg/m$^2$) | 0.02 |
| Inspiratory time (1 second) | 244 |
| Expiratory time (1 second) | 356 |
| Zero offset (V) | 0 |
| Average leakage rate during first behavior (%) | 0.685 (pass) |
| Average leakage rate during second behavior (%) | 0.641 (pass) |
| Average leakage rate during third behavior (%) | 0.807 (pass) |
| Average leakage rate during fourth behavior (%) | 0.648 (pass) |
| Average leakage rate during fifth behavior (%) | 0.770 (pass) |

Table 7 below shows the official leakage rates of Examples 1 to 4 according to the present invention and Comparative Examples 1 and 3 for comparison therebetween.

TABLE 7

| | Official leakage rate | Remarks |
|---|---|---|
| Example 1 | 2.05% | Third fixing unit |
| Example 2 | 0.36% | Second fixing unit |
| Example 3 | 2.04% | First fixing unit |
| Example 4 | 0.71% | Second fixing unit |
| Comparative Example 1 | 4.12% | Less 11% based on KF94 satisfied |
| Comparative Example 2 | 1.57% | Less 11% based on KF94 satisfied |
| Comparative Example 3 | — | Not fixed and measurement impossible |

When the official leakage rates were measured, Examples 1, 2, 3, and 4 according to the present invention and Comparative Examples satisfied the criterion of KF94; however, all examples of the present invention had lower leakage rates than Comparative Examples. <Compared to jaw motion results>

Tables 8, 10, and 12 show the results obtained by performing "(D) speaking out loud Korean text for two minutes," in which jaws were moved, among the above leakage rate test methods, five times in the state in which masks including the nose-fitting adjusters according to Example 1 to Example 3 of the present invention were worn, and Tables 9 and 11 show the results of Comparative Examples 1 and 2. In the case of (D), much leakage actually occurs; however, the leakage is not clearly recognized within the regulation of an official test, and therefore additional experiments were performed thereon.

As can be seen from Table 8, the mask including the nose-fitting adjuster according to Example 1 has a leakage rate of 1.87%, which is an excellent value, even for test (D). Referring to Table 9, when the conventional KF94 mask was used at the same position, the leakage rate was 8.02%, which satisfied the criteria of less than 11%, however, the leakage rate was four or more times the leakage rate of Example 1.

TABLE 8

| | |
|---|---|
| Mask model name | NN003 |
| Mask serial number | 003 |
| Test round | 5 |
| Mask leakage rate judgment criterion (%) | 11 |
| Mask leakage rate (%) | 1.87 |
| Correction value before mask measurement (V) | 0.0000024509 |
| Correction value before mask measurement (mg/m$^2$) | 0.00 |
| In-chamber measurement value (V) | 0.0072987548 |
| In-chamber measurement value (mg/m$^2$) | 11.46 |
| In-chamber measurement value after test (V) | 0.0048150216 |
| In-chamber measurement value after test (mg/m$^2$) | 7.56 |
| In-mask measurement value (V) | 0.000 |
| In-mask measurement value (mg/m$^2$) | 0.09 |

TABLE 8-continued

| | |
|---|---|
| Inspiratory time (1 second) | 282 |
| Expiratory time (1 second) | 318 |
| Zero offset (V) | 0 |
| Average leakage rate during first behavior (%) | 2.312 (pass) |
| Average leakage rate during second behavior (%) | 3.379 (pass) |
| Average leakage rate during third behavior (%) | 2.066 (pass) |
| Average leakage rate during fourth behavior (%) | 0.628 (pass) |
| Average leakage rate during fifth behavior (%) | 1.075 (pass) |

TABLE 9

| | |
|---|---|
| Mask model name | NN002 |
| Mask serial number | 002 |
| Test round | 5 |
| Mask leakage rate judgment criterion (%) | 11 |
| Mask leakage rate (%) | 8.02 |
| Correction value before mask measurement (V) | 0.0000025650 |
| Correction value before mask measurement (mg/m$^2$) | 0.00 |
| In-chamber measurement value (V) | 0.0069551891 |
| In-chamber measurement value (mg/m$^2$) | 10.92 |
| In-chamber measurement value after test (V) | 0.0045803887 |
| In-chamber measurement value after test (mg/m$^2$) | 7.19 |
| In-mask measurement value (V) | 0.000 |
| In-mask measurement value (mg/m$^2$) | 0.40 |
| Inspiratory time (1 second) | 282 |
| Expiratory time (1 second) | 318 |
| Zero offset (V) | 0 |
| Average leakage rate during first behavior (%) | 9.486 (pass) |
| Average leakage rate during second behavior (%) | 8.483 (pass) |
| Average leakage rate during third behavior (%) | 8.208 (pass) |
| Average leakage rate during fourth behavior (%) | 9.129 (pass) |
| Average leakage rate during fifth behavior (%) | 5.096 (pass) |

As can be seen from Table 10, the mask including the nose-fitting adjuster according to Example 2 has a leakage rate of 0.41%, which is an excellent value. Referring to Table 11, when the conventional KF94 mask was used at the same position, the leakage rate was 1.41%, which satisfied the criteria, however, the leakage rate was four or more times the leakage rate of Example 2.

TABLE 10

| | |
|---|---|
| Tester | Koreatech |
| Test date | Jul. 30, 2020 |
| Mask wearer | YI |
| Mask manufacturer | KF94 |
| Mask model name | Modi_Upper |
| Mask serial number | 001 |
| Test round | 1 |
| Mask leakage rate judgment criterion (%) | 11 |
| Mask leakage rate (%) | 0.41 |
| Correction value before mask measurement (V) | 0.0000017391 |
| Correction value before mask measurement (mg/m$^2$) | 0.00 |
| In-chamber measurement value (V) | 0.0067575390 |
| In-chamber measurement value (mg/m$^2$) | 10.61 |
| In-chamber measurement value after test (V) | 0.0044641244 |
| In-chamber measurement value after test (mg/m$^2$) | 7.01 |
| In-mask measurement value (V) | 0.000 |
| In-mask measurement value (mg/m$^2$) | 0.01 |
| Inspiratory time (1 second) | 281 |
| Expiratory time (1 second) | 319 |
| Zero offset (V) | 0 |
| Average leakage rate during first behavior (%) | 0.702 (pass) |
| Average leakage rate during second behavior (%) | 0.275 (pass) |
| Average leakage rate during third behavior (%) | 0.496 (pass) |
| Average leakage rate during fourth behavior (%) | 0.359 (pass) |
| Average leakage rate during fifth behavior (%) | 0.209 (pass) |

TABLE 11

| | |
|---|---|
| Tester | Koreatech |
| Test date | Jul. 30, 2020 |
| Mask wearer | YI |
| Mask manufacturer | KF94 |
| Mask model name | Nor_upper |
| Mask serial number | 002 |
| Test round | 1 |
| Mask leakage rate judgment criterion (%) | 11 |
| Mask leakage rate (%) | 1.41 |
| Correction value before mask measurement (V) | 0.0000015896 |
| Correction value before mask measurement (mg/m$^2$) | 0.00 |
| In-chamber measurement value (V) | 0.0066951225 |
| In-chamber measurement value (mg/m$^2$) | 10.51 |
| In-chamber measurement value after test (V) | 0.0047870668 |
| In-chamber measurement value after test (mg/m$^2$) | 7.51 |
| In-mask measurement value (V) | 0.000 |
| In-mask measurement value (mg/m$^2$) | 0 |
| Inspiratory time (1 second) | 293 |
| Expiratory time (1 second) | 307 |
| Zero offset (V) | 0 |
| Average leakage rate during first behavior (%) | 1.672 |
| Average leakage rate during second behavior (%) | 1.699 (pass) |
| Average leakage rate during third behavior (%) | 1.656 (pass) |
| Average leakage rate during fourth behavior (%) | 1.025 (pass) |
| Average leakage rate during fifth behavior (%) | 0.961 (pass) |

As can be seen from Table 12, the mask including the nose-fitting adjuster according to Example 3 has a leakage rate of 2.31%, which is an excellent value. In contrast, in Comparative Example 3, tight contact was impossible, and therefore it was not possible to measure the leakage rate. When the leakage rate was measured by force, a value of 40% or more was measured, and therefore a substantially meaningful value was not derived.

TABLE 12

| Mask model name | Modi_NFA_Low |
|---|---|
| Mask serial number | 001 |
| Test round | 1 |
| Mask leakage rate judgment criterion (%) | 11 |
| Mask leakage rate (%) | 2.31 |
| Correction value before mask measurement (V) | 0.0000025399 |
| Correction value before mask measurement (mg/m$^2$) | 0.00 |
| In-chamber measurement value (V) | 0.0082376058 |
| In-chamber measurement value (mg/m$^2$) | 12.94 |
| In-chamber measurement value after test (V) | 0.0049608726 |
| In-chamber measurement value after test (mg/m$^2$) | 7.79 |
| In-mask measurement value (V) | 0.000 |
| In-mask measurement value (mg/m$^2$) | 0.13 |
| Inspiratory time (1 second) | 278 |
| Expiratory time (1 second) | 322 |
| Zero offset (V) | 0 |
| Average leakage rate during first behavior (%) | 1.235 |
| Average leakage rate during second behavior (%) | 4.931 (pass) |
| Average leakage rate during third behavior (%) | 2.474 (pass) |
| Average leakage rate during fourth behavior (%) | 1.484 (pass) |
| Average leakage rate during fifth behavior (%) | 1.339 (pass) |

Table 13 below shows the official leakage rates of Examples 1 to 3 according to the present invention and Comparative Examples 1 and 2 measured through the tests having the highest leakage rates for comparison therebetween. In many cases, users work for a long time while wearing masks, and most of the users talk with each other. Referring to Table 13 below, even in this case, Examples 1 to 3 according to the present invention show leakage rates similar to Table 7, from which it can be seen that uniform sealing is guaranteed even when jaw muscles or facial muscles are moved. In addition, low leakage rates are maintained irrespective of position and whether muscles are used, and therefore it is possible to always obtain excellent results even though users are not accustomed to mask wearing.

TABLE 13

| | Leakage rate due to jaw motion | Remarks |
|---|---|---|
| Example 1 | 1.87% | Third fixing unit |
| Example 2 | 0.41% | Second fixing unit |
| Example 3 | 2.31% | First fixing unit |
| Comparative Example 1 | 8.02% | Less 11% based on KF94 satisfied |
| Comparative Example 2 | 1.41% | Less 11% based on KF94 satisfied |
| Comparative Example 3 | — | Not fixed and measurement impossible |

In contrast, the conventional mask shows a great difference in leakage rate between when the jaw muscles or facial muscles of the user are stopped and when the jaw muscles or facial muscles of the user are moved, and the difference in leakage rate is increased by four times or more depending on position. There is a shortcoming in that the leakage rate is not uniform depending on whether the users are accustomed to mask wearing and whether the users talk with each other. Meanwhile, the results of measurement of the leakage rates on the nasal cartilage of the user without pressing the regions of Examples 1, 2, and 3 when the nose-fitting adjuster according to the example of the present invention and when KF94 of the comparative example through the same experiment are shown in Table 10 and Table 11, which show similar results. Even in this case, the result according to the present invention shows a leakage rate equivalent to about ¼ of the leakage rate of the comparative example.

<Displacement Experiment>

In order to check displacement of the apparatus fixed to the face depending on whether the nose-fitting adjuster according to the present invention is provided, an elastic member fixed to only left and right parts of the face of the user was manufactured, and change in position of the elastic member around the nose was observed using a motion sensor.

FIG. 73 is a photograph showing that the user wears the elastic member having the nose-fitting adjuster according to Example 2 added thereto in order to perform a displacement experiment. In FIG. 73, displacement of the portion indicated by a tip point of the nose was observed. In the state in which the user wears the elastic member having the nose-fitting adjuster according to Example 2 added thereto or the elastic member having the nose-fitting adjuster according to Example 2 not added thereto, displacement of the point was observed while the user said "a-e-i-o-u". Coordinates from a reference point were calculated, and the distances therefrom were measured. The measurement results over time are shown in FIG. 74. The x axis indicates minute, and the y axis indicates displacement.

Even when the conventional mask is brought into tight contact with the peripheral portion of the nose of the user as the result of bending the portion of the mask corresponding to the peripheral portion of the nose, tight contact is lowered due to contraction and relaxation of facial muscles occurring as the user speaks. The dotted line indicated in FIG. 74 shows the result when the elastic member having the nose-fitting adjuster according to Example 2 not added thereto was worn, as the result similar thereto. When the nose-fitting adjuster according to the present invention is added, displacement of the relevant region (see the solid line of FIG. 74) is small even in the case in which the user has a conversation, and therefore it can be indirectly checked that tight contact can be continuously maintained.

In the present invention, positional change is small, friction against the skin due to displacement is small. Consequently, there is an advantage in that, when the mask must be worn for a long time due to COVID-19, it is possible to prevent injury to the skin due to friction between the ridge of the nose and the mask.

INDUSTRIAL APPLICABILITY

The present invention may provide a nose-fitting adjuster including a cover unit configured to cover at least a part of a nasal cartilage of a user and a peripheral portion thereof and at least one of a first fixing unit to a third fixing unit, wherein the nose-fitting adjuster is configured such that 1) the degree of tight contact between the cover unit and a skin of the user is high, 2) tight contact is continuously maintained and friction is minimized even when facial muscles are moved, 3) the degree of tight contact is not lowered due to vibration generated when the user moves in a state of wearing a mask, 4) the region that is pressed for tight contact is minimized, 5) the degree of pressure is easily adjusted depending on the height of a nose of the user, and 6) a predetermined level of tight contact can be provided to users who are not accustomed to adjustment of an apparatus or a mechanism, such as the elderly and weak or children, whereby it is possible to seal the nose and a peripheral portion thereof.

The invention claimed is:

1. A nose-fitting adjuster comprising:
a cover unit configured to cover at least a part of a nasal cartilage of a user and a peripheral portion thereof; and
a fixing unit configured to press, at an outer surface of the cover unit, only
i) a nasolabial fold of the user,
ii) a levator labii superioris muscle or a levator labii superioris alaeque nasi muscle of the user, and
iii) areas in which an outer circumferential portion of an alar crease of the user all overlaps, such that the cover unit is brought into tight contact with a skin of the user,
wherein the fixing unit does not directly press a nose of the user,
wherein the fixing unit is fixed by a separate support unit provided outside the cover unit,
wherein a region of the fixing unit fixed by the support unit is located at a front of a face of the user,
wherein a maximum range within which the cover unit is capable of being disposed is from above tip-defining points to a lower end of a nasal bone as an upward-downward range and is between opposite cheekbones of the face of the user as a leftward-rightward range, and
wherein, when the cover unit is brought into tight contact with the skin by the fixing unit, 1) a relative position of the cover unit pressed by the fixing unit is fixed and the cover unit is stretched, whereby the cover unit is brought into tight contact with the skin, 2) the relative position of the cover unit pressed by the fixing unit is not fixed and the cover unit is deformed along an external shape of the nose, whereby the cover unit is brought into tight contact with the skin, or 3) the relative position of the cover unit pressed by the fixing unit is not fixed and the cover unit is stretched, whereby the cover unit is brought into tight contact with the skin.

2. The nose-fitting adjuster according to claim 1, further comprising an additional fixing unit configured to press the at least a part of the nasal cartilage of the user at the outer surface of the cover unit, wherein the additional fixing unit is fixed by the support unit.

3. The nose-fitting adjuster according to claim 2, wherein a degree of pressure applied by the fixing unit is higher than a degree of pressure applied by the additional fixing unit.

4. The nose-fitting adjuster according to claim 2, wherein a region pressed by the additional fixing unit is formed in a shape of micro-protrusions.

5. The nose-fitting adjuster according to claim 2, wherein a region pressed by the the additional fixing unit is formed in a shape of at least one of a dot, a line, and a surface.

6. The nose-fitting adjuster according to claim 2, wherein at least one region is pressed by the additional fixing unit.

7. The nose-fitting adjuster according to claim 1, wherein a region pressed by the fixing unit is formed in a shape of at least one of a dot, a line, and a surface.

8. The nose-fitting adjuster according to claim 1, wherein at least one region is pressed by the fixing unit.

9. The nose-fitting adjuster according to claim 1, wherein the fixing unit is formed in a shape of at least one of a dot, a line, a surface, and a solid.

10. The nose-fitting adjuster according to claim 1, wherein the fixing unit is configured to press an additional pressing portion at the outer surface of the cover unit.

11. The nose-fitting adjuster according to claim 10, wherein the additional pressing portion is formed in a shape of at least one of a dot, a line, and a surface.

12. The nose-fitting adjuster according to claim 1, wherein a direction in which the fixing unit presses the cover unit at the outer surface of the cover unit is a direction perpendicular to the skin of the user, an extension direction of wrinkles formed at the face of the user, a direction perpendicular to the wrinkles formed at the face of the user, a direction along an outer periphery of the nose of the user, an inward or outward direction of the outer periphery of the nose of the user, an extension direction of muscles around the nose of the user, or a composite combination of the directions.

13. The nose-fitting adjuster according to claim 1, wherein at least one region of the fixing unit fixed by the support unit is formed in a shape of at least one of a dot, a line, and a surface.

14. The nose-fitting adjuster according to claim 13, wherein the fixing unit is configured to perform motion comprising rotation, movement, and twisting while being fixed by the support unit.

15. The nose-fitting adjuster according to claim 1, wherein a region of the fixing unit that presses the cover unit and the region of the fixing unit fixed by the support unit are connected to each other via an elastic material having a bent portion.

16. The nose-fitting adjuster according to claim 1, wherein the cover unit is made of an elastic material or an inelastic material.

17. The nose-fitting adjuster according to claim 1, wherein the support unit is made of an elastic material or an inelastic material.

18. The nose-fitting adjuster according to claim 1, wherein the support unit is not supported by the cover unit.

* * * * *